United States Patent [19]
Serizawa et al.

[11] Patent Number: 5,754,961
[45] Date of Patent: May 19, 1998

[54] RADIO COMMUNICATION SYSTEM INCLUDING SDL HAVING TRANSMISSION RATE OF RELATIVELY HIGH SPEED

[75] Inventors: Mutsumu Serizawa, Tokyo-to; Nobuyasu Nakajima, Kawasaki; Koji Ogura, Kawasaki; Minoru Namekata, Kawasaki; Takashi Wakutsu, Yokohama; Manabu Mukai, Kawasaki, all of Japan

[73] Assignee: Kabushiki Kaisha Toshiba, Kawasaki, Japan

[21] Appl. No.: 492,728

[22] Filed: Jun. 20, 1995

[30] Foreign Application Priority Data

Jun. 20, 1994 [JP] Japan .................................... 6-137621

[51] Int. Cl.$^6$ ................................................ H04B 7/26
[52] U.S. Cl. .................... 455/517; 455/5.1; 455/509; 370/343; 370/468
[58] Field of Search ............................... 455/34.1, 34.2, 455/54.1, 54.2, 103, 5.1, 6.3, 450, 455, 509, 516, 517, 524, 525; 370/319, 329, 343, 468

[56] References Cited

U.S. PATENT DOCUMENTS

| | | | |
|---|---|---|---|
| 4,918,746 | 4/1990 | Serizawa | 455/54 |
| 5,483,676 | 1/1996 | Mahany et al. | 455/67.4 |

OTHER PUBLICATIONS

Cook, "Development of Air interface Standards for PCS", IEEE Personal Communications, Fourth Quarter, (1994) pp. 30–34.

*Primary Examiner*—Chi H. Pham
*Attorney, Agent, or Firm*—Foley & Lardner

[57] ABSTRACT

A large amount of user information is transmitted with good efficiency by means of a high-speed downlink by making transmission rates of an uplink circuit and a downlink asymmetrical. The radio communication system includes a plurality of base stations, a plurality of terminals, an uplink established between each of the base stations and each of the terminals for the purpose of radio transmission of prescribed information from a terminal to a base station, and a downlink circuit established between each of the terminals and each of the base station for the purpose of radio transmission of prescribed data from a base station to a terminal. This radio communication system has a low-speed transmitting means, provided at the terminal, which transmits a radio signal at a relatively low transmission rate to an above-noted base station via the above-noted uplink, a low-speed receiving means, provided at the base station, which receives a radio signal sent at a relatively low transmission rate from the terminal via the uplink, a high-speed transmitting means, provided at the base station, which transmits a radio signal at a relatively high transmission rate to an above-noted terminal via the above-noted downlink, and a high-speed receiving means, provided at the terminal, which receives a radio sent at a relatively high transmission rate from the base station via the downlink.

13 Claims, 53 Drawing Sheets

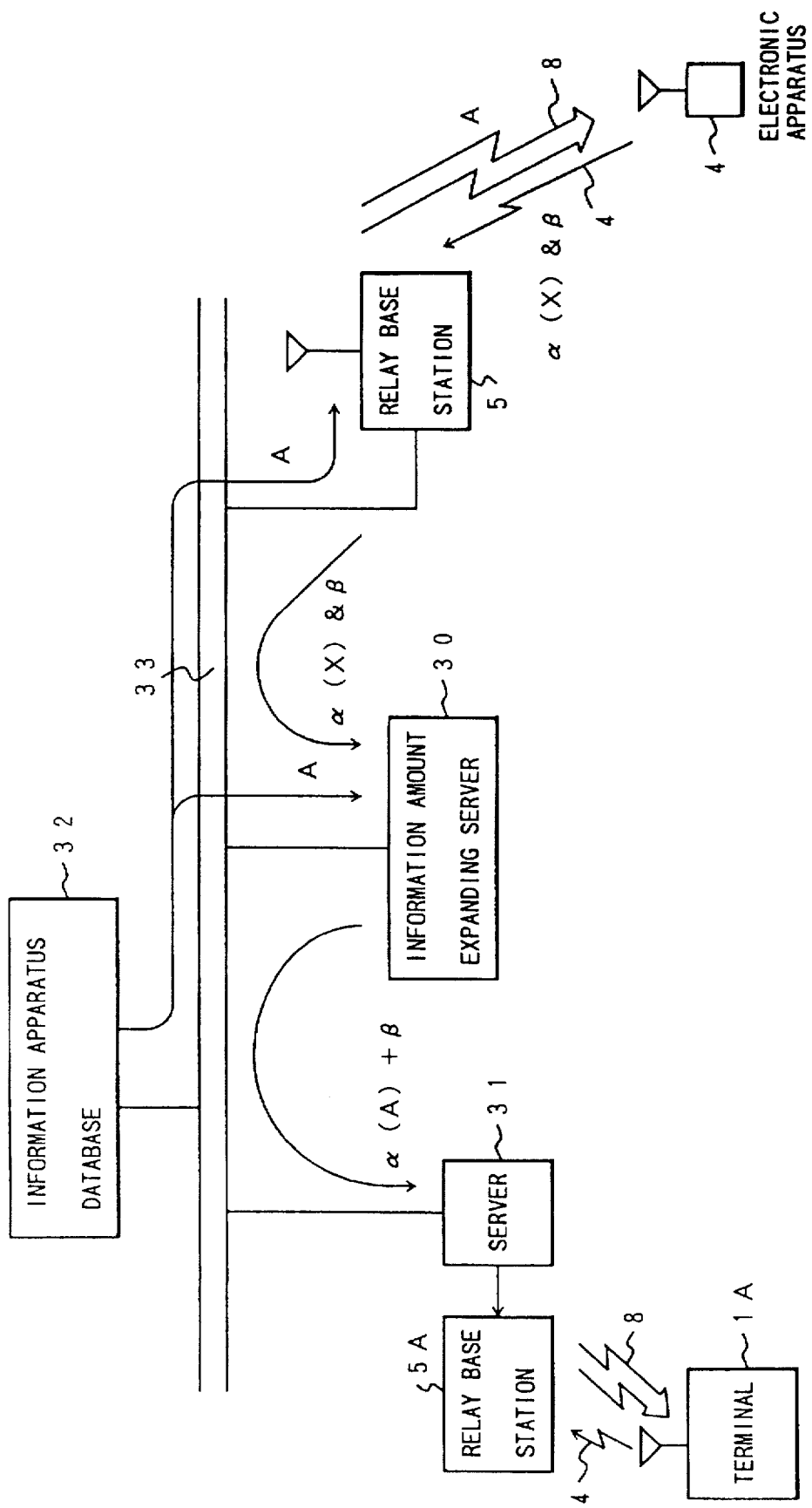
F I G. 7

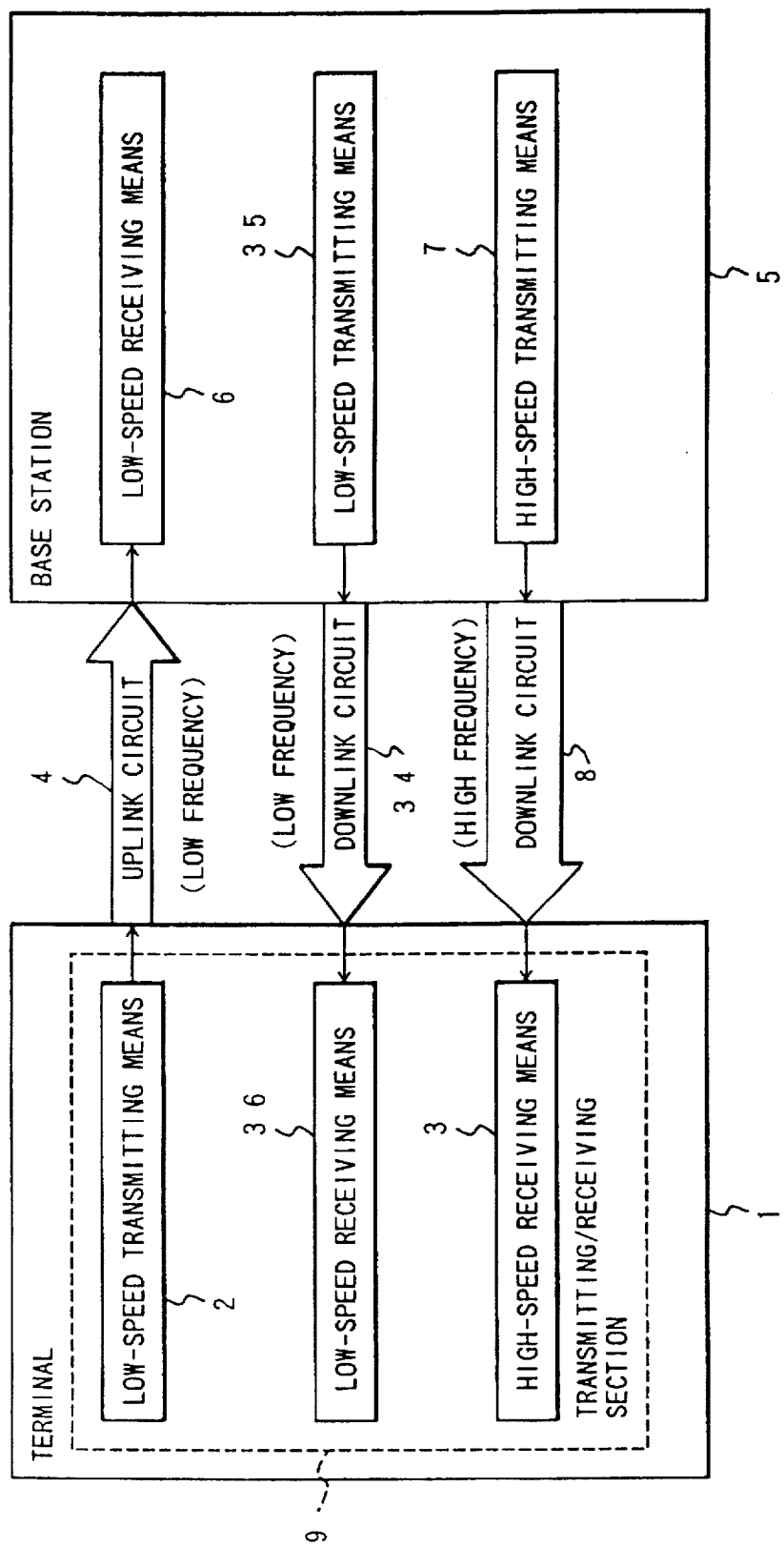
F I G. 10

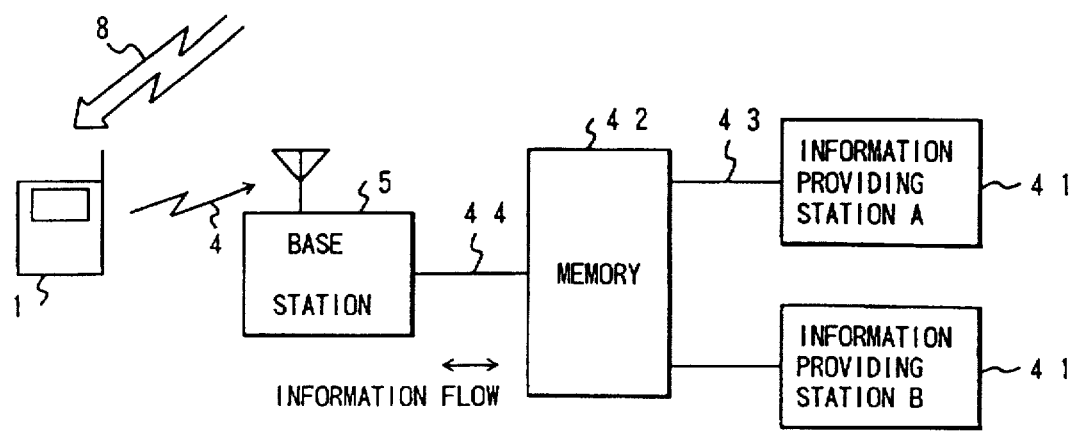
F I G. 1 1
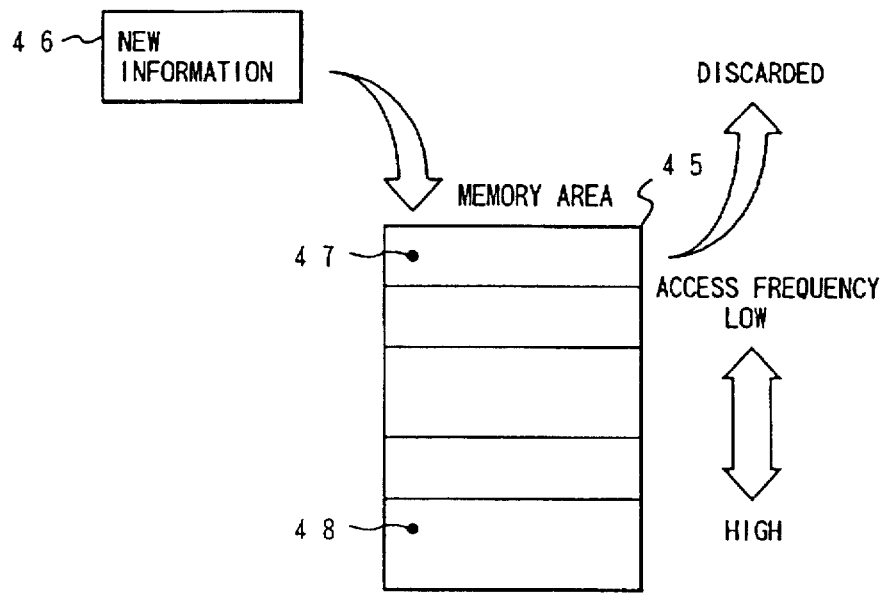
F I G. 1 2

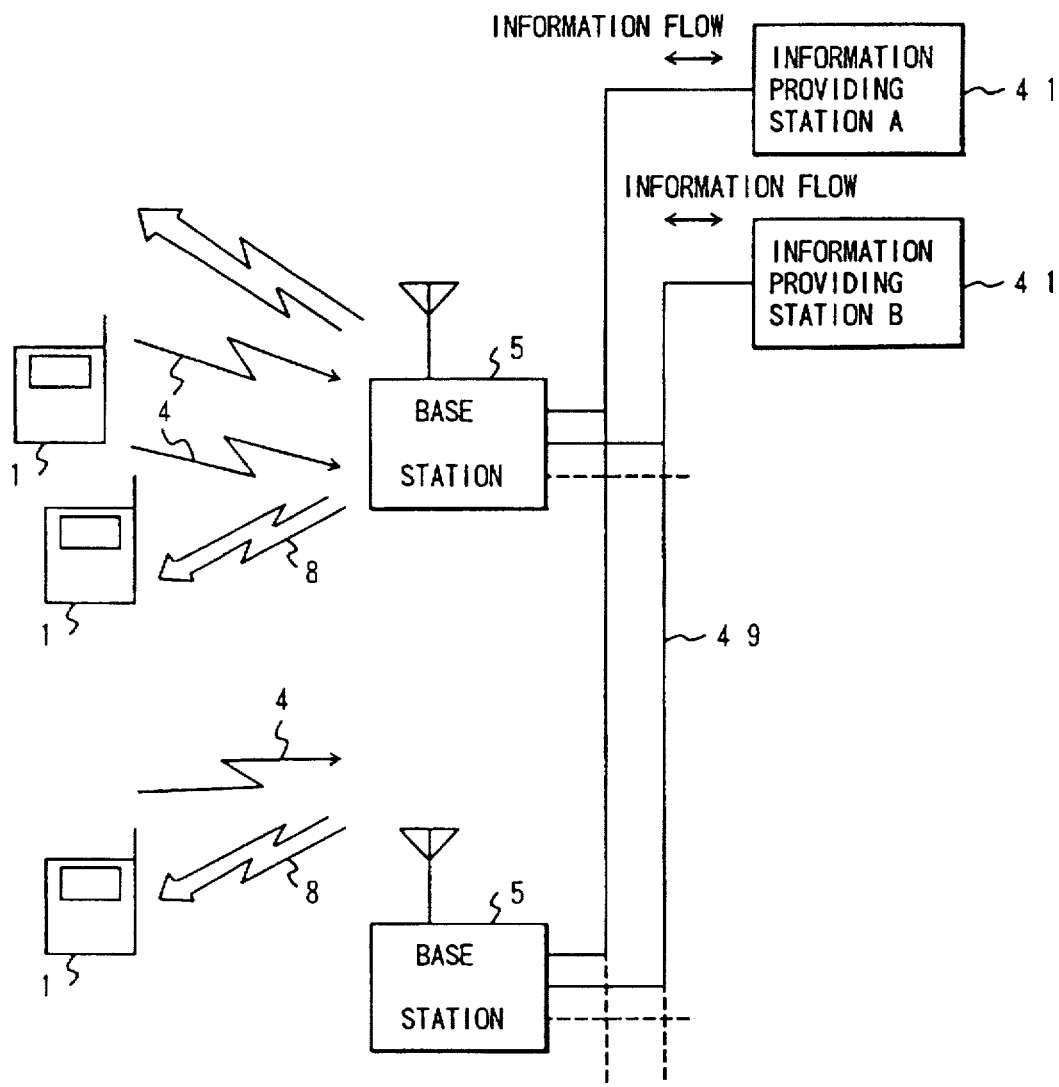
F I G. 1 3

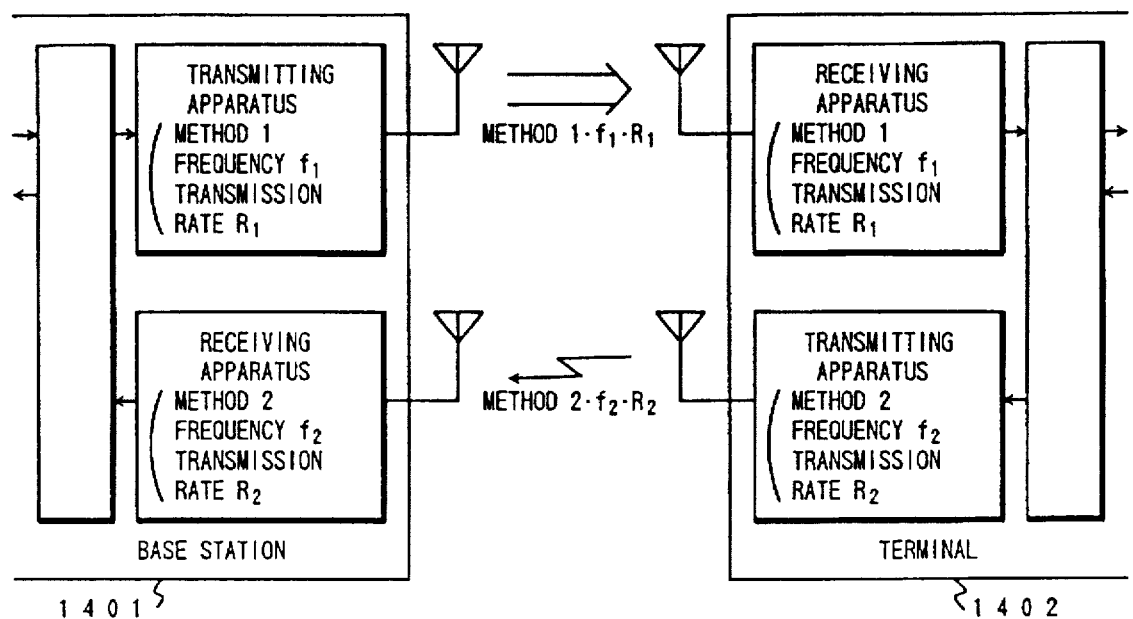
F I G. 28
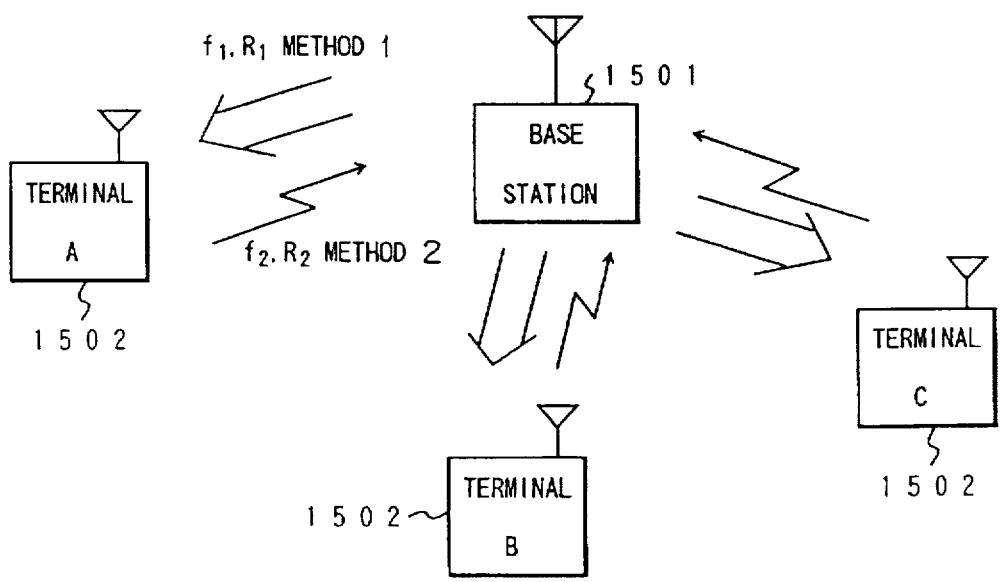
F I G. 29

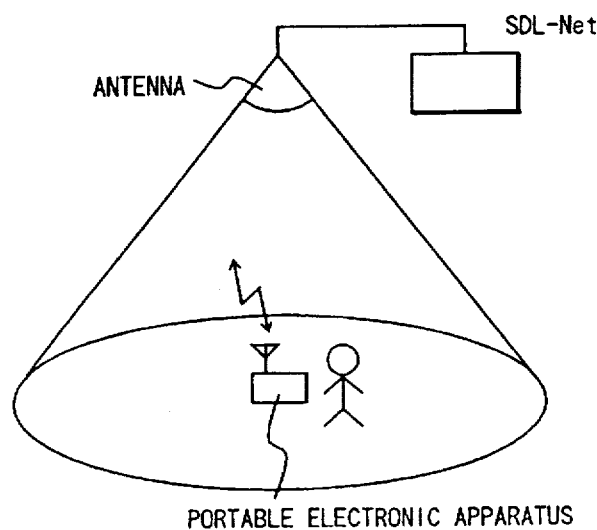
F I G. 3 2
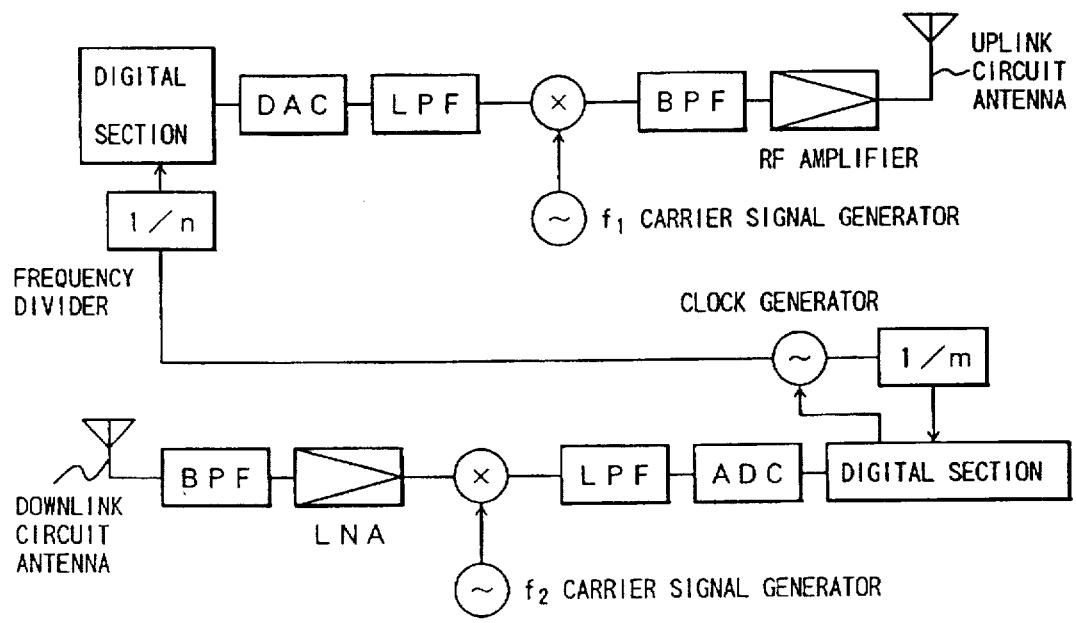
F I G. 3 3

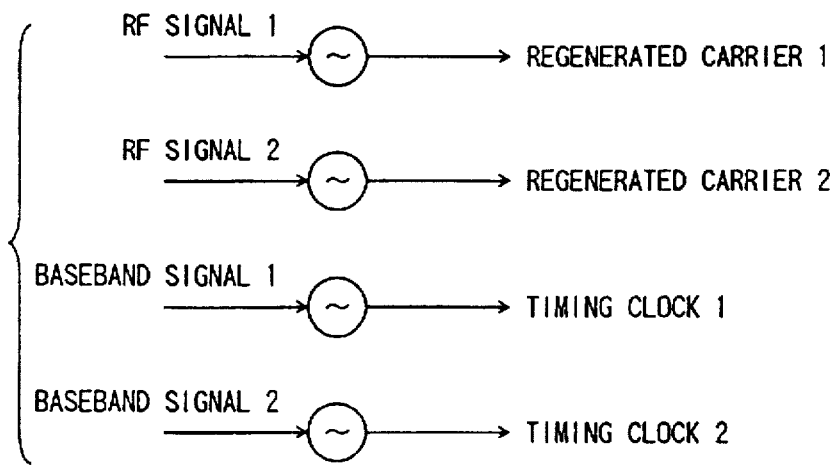
F I G. 4 0
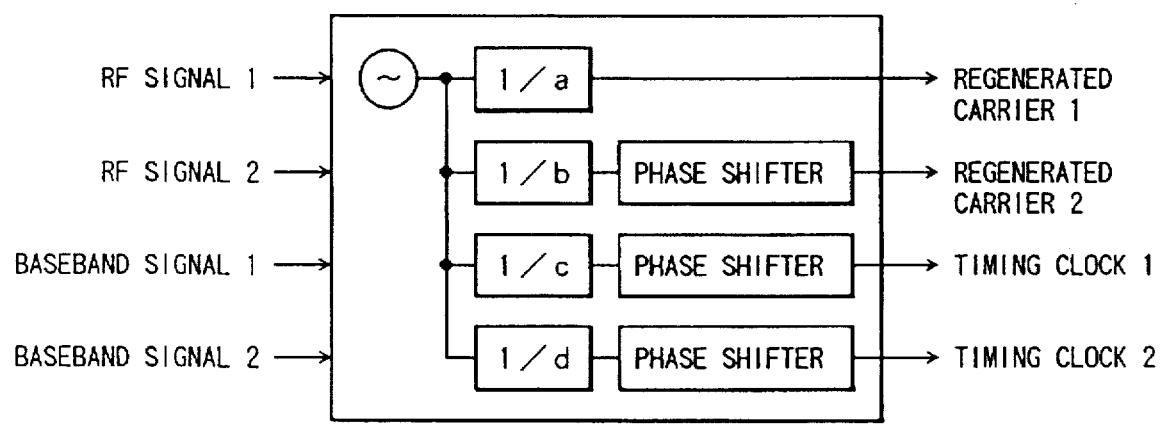
F I G. 4 1

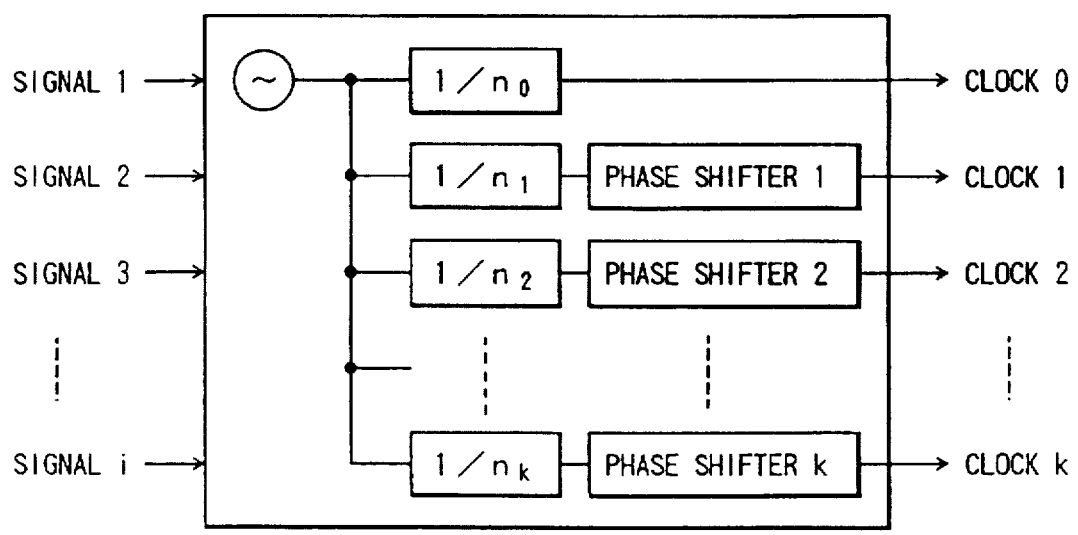
F I G. 4 4

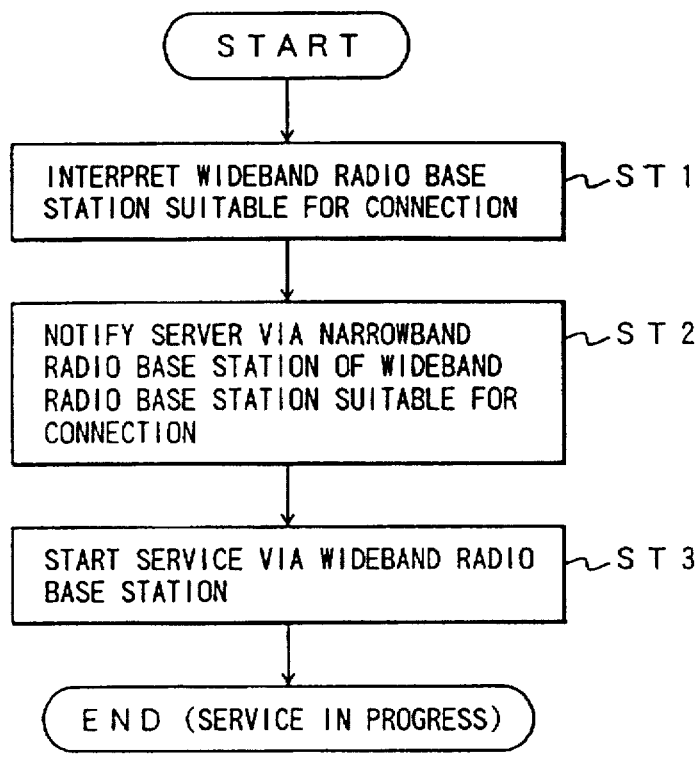
F I G. 5 1

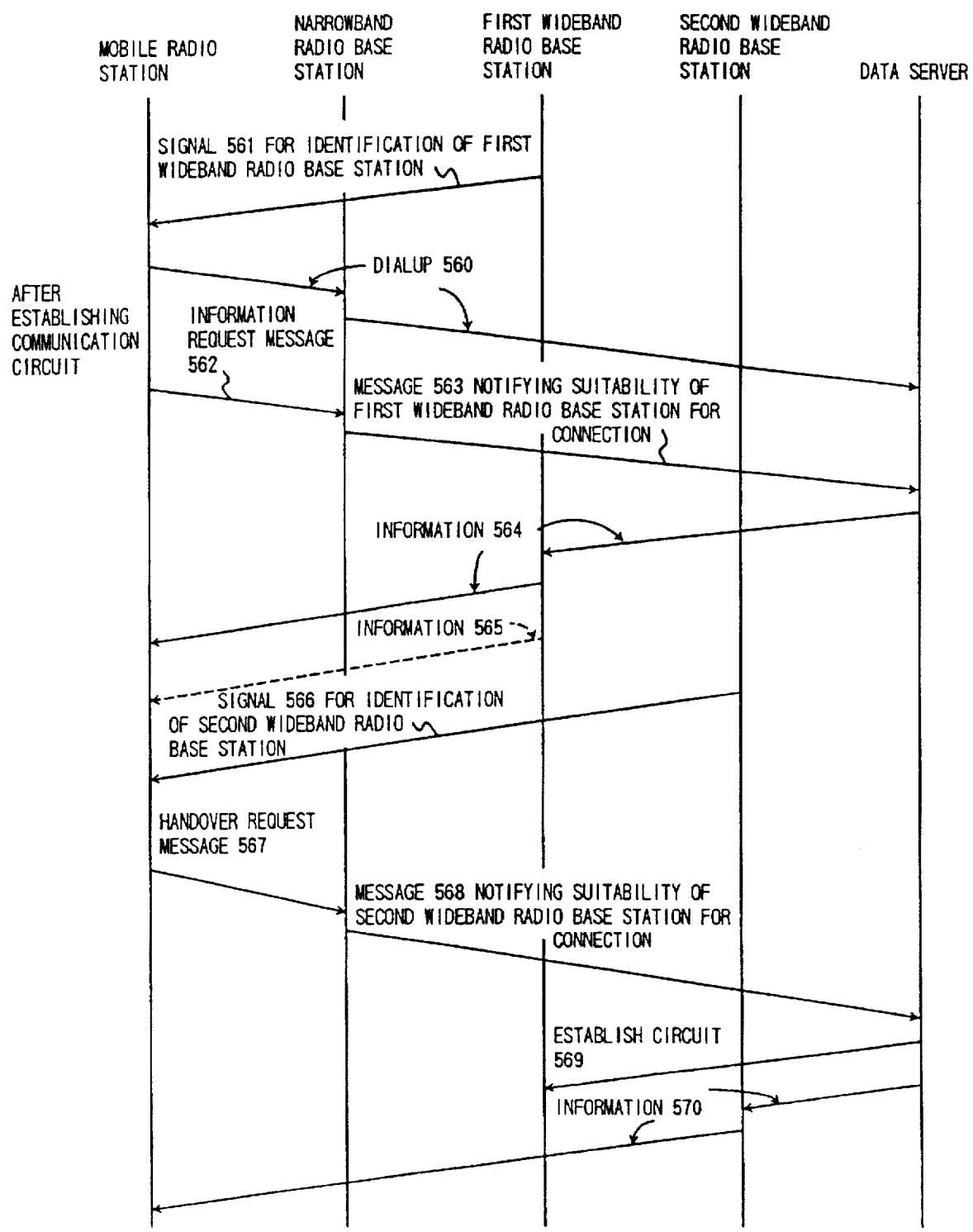
F I G. 5 8

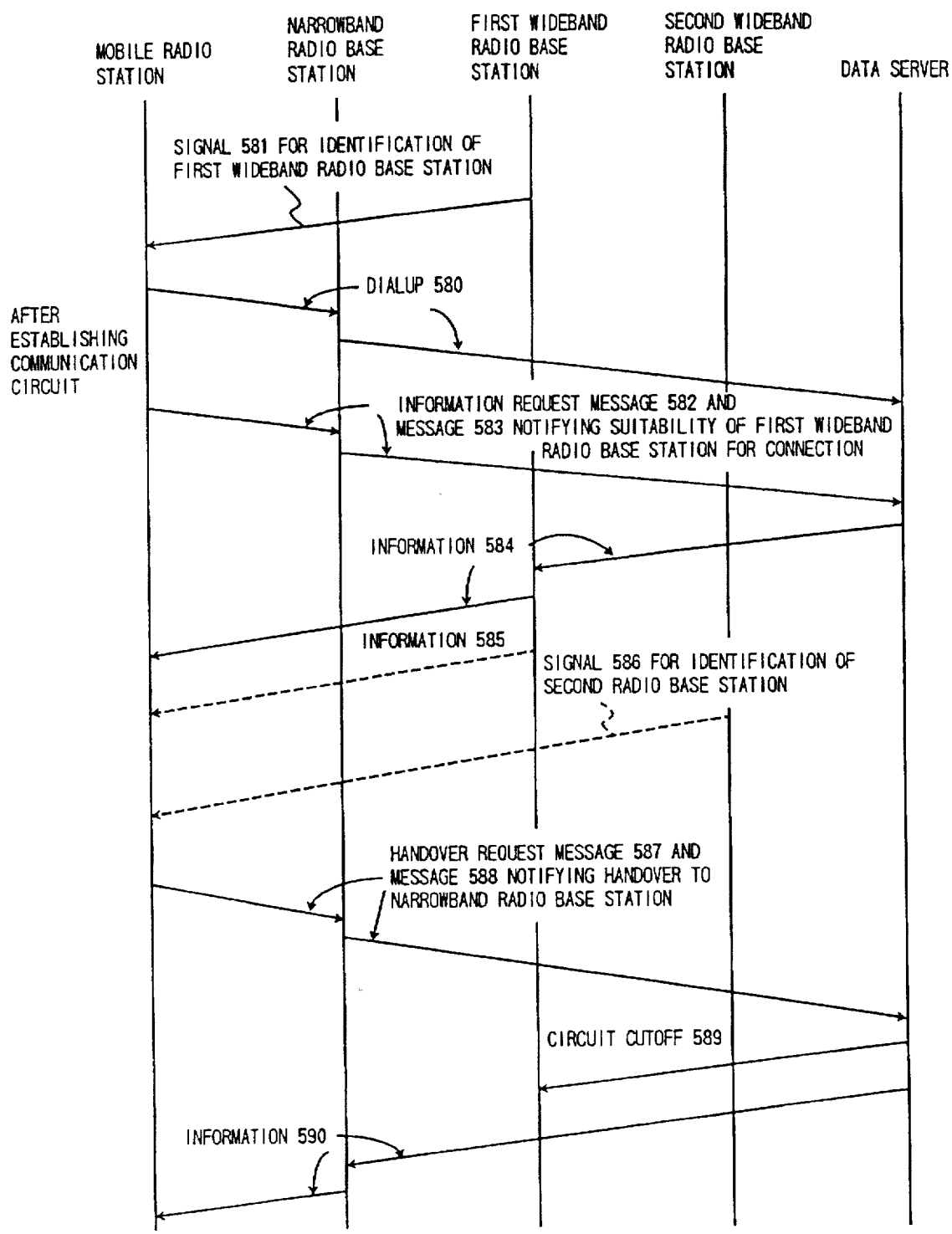
F I G. 6 0

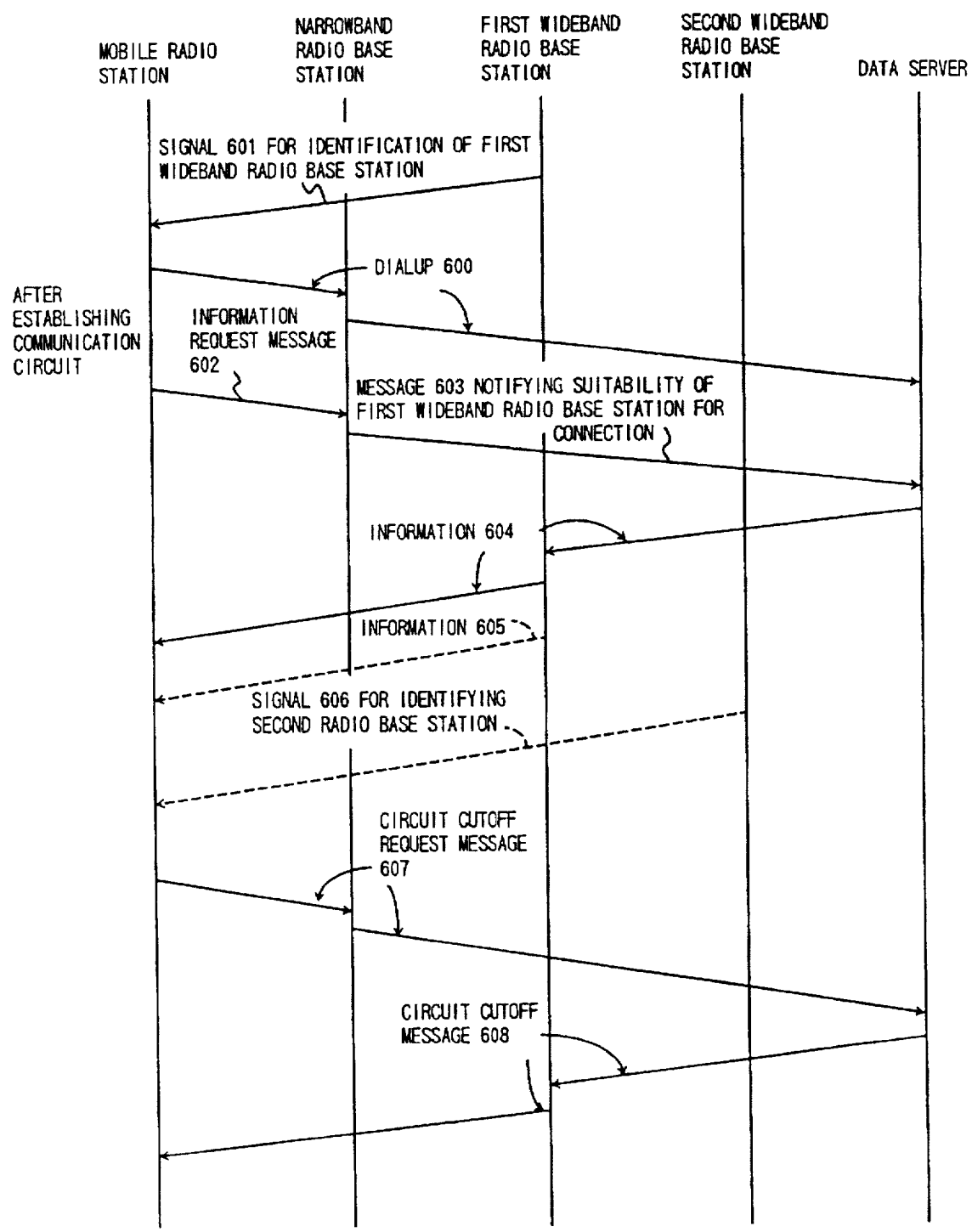
F I G. 6 2

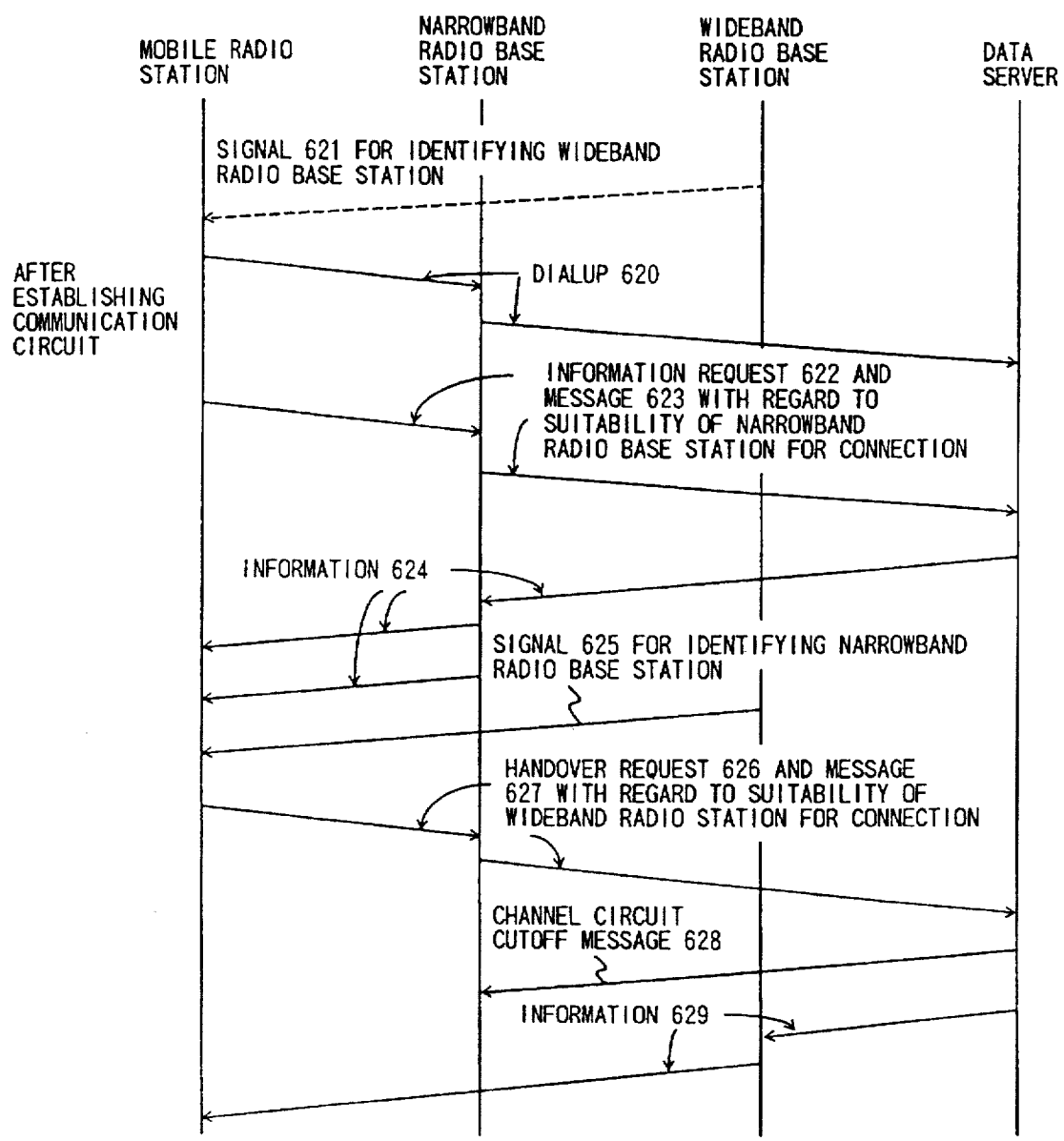
F I G. 6 4

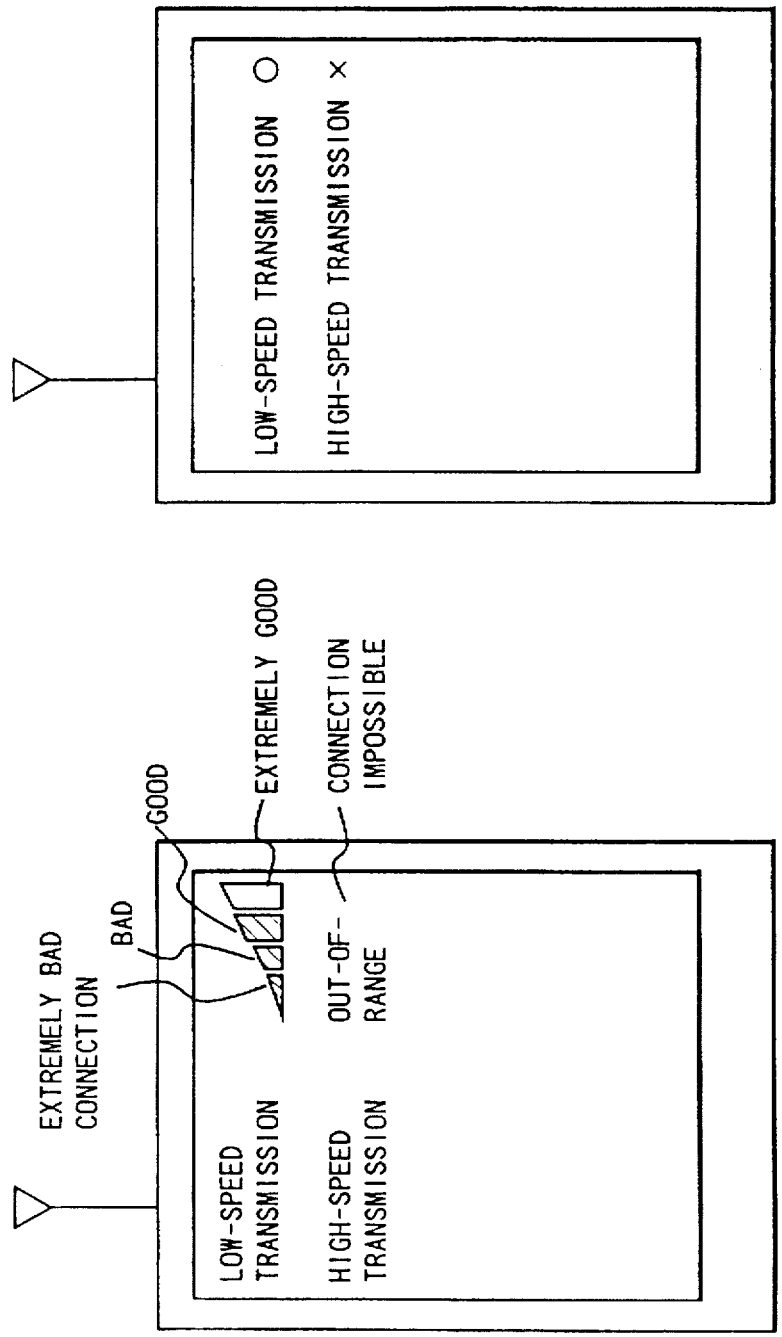

RADIO COMMUNICATION SYSTEM INCLUDING SDL HAVING TRANSMISSION RATE OF RELATIVELY HIGH SPEED

BACKGROUND OF THE INVENTION

The present invention relates to a radio communication system, and more specifically to a radio communication system for the purpose of performing super highspeed downlink (abbreviated SDL, this abbreviation used hereinafter), which has a relatively high transmission rate on the downlink, which is the radio transmission path from the base station to the terminal, in comparison with the transmission rate on the uplink, which is the radio transmission path from the terminal to the base station.

In recent years, with advances in communications and information processing technologies, an variety of types of radio communication systems such as a personal-use portable telephone (Personal Handyphone System (PHS)) and systems which make use of the above-noted SDL have been proposed.

Radio communication systems such as PHS or local area networks (LANs) which use radio are experiencing increasing demand, by virtue of advancements in various information media, and along with this increased demand comes an increasing necessity to perform radio communication over a variety of networks. In view of this type of necessity, a broadening of the transmission frequency bandwidth is desired in radio communication systems as it is cable communication systems. In radio communication systems of the past, the uplink for sending a radio signal from the terminal to the base station and the downlink for sending a radio signal from the base station to the terminal had transmission speeds which were matched for bi-directional radio communication. However, the actual situation is that the amount of transmission on the downlink, over which user information requested by the user is sent to the terminal is considerably larger than the amount of transmission on the uplink over which only control information or the like is sent.

This is a problem not only with mobile communication, but also with radio LANs and a variety of other radio services. However, because the frequency spectrum resources for radio are limited, it is difficult to widen the frequency bands for currently implemented services, making it desirable that higher, unused frequencies (such as sub-millimeter and millimeter bands) be developed.

FIG. 1 shows an example of the frequency placement in the past. This is the example of the Japanese digital system mobile telephone system RCR STD-27B(Research Center of Radio System STanDard 27B). In this system, the downlink and the uplink have the same transmission rate, there being systems that operate in the 800-MHz band and the 1.5-GHz band. In either of these frequency bands, the uplink and the downlink are in the same frequency band. In the 800-MHz band, the downlink is located in the range 810 MHz to 826 MHz, and the uplink is located in the range 940 MHz to 956 MHz. In previous systems, because an uplink and a downlink operating at the same transmission rate were assumed, transmission is performed in the same frequency band. However, problems arise with application to the SDL system.

In the SDL system, because a wideband downlink is assumed, in a low frequency band such as the 800-MHz band, it becomes difficult to assign this wide band and to achieve effective frequency usage. For example, in the case of trying to perform transmission at 100 MHz or so, it is obvious that it is impossible for the bandwidth to be found to allow one user 100 MHz bandwidth in the 800-MHz band. For this reason, it is necessary to perform transmission in the sub-millimeter band of several gigahertz, or in the millimeter band of several tens of gigahertz.

The US mobile telephone system can be cited as an example of a radio communication system of the past which had differing transmission rates. In this system, at the point at which a switch was being made from analog to digital, the mobile telephone handset was made to include both an analog and a digital mobile telephone, thereby enabling calling and receiving of calls in both areas. In this system, two completely different communication systems—analog and digital—are used, the handsets having few circuits in common, so that there were one each of the analog mobile telephone and the digital mobile telephone. For this reason, a problem existed in that the circuit was of a large scale.

Next, the previous method of synchronizing the signal source used as a reference will be described, using FIG. 2. FIG. 2 shows the configuration of a phase-locked loop (PLL) for the purpose of obtaining a frequency that is n/m times that of the oscillation frequency of a reference oscillator. A signal having the oscillation frequency x is frequency divided to 1/m by a frequency divider 201, and input to a phase comparator. A signal from a voltage-controlled oscillator (the oscillator frequency of which, y, is controlled by a voltage) is frequency divided to 1/n by a frequency divided 202, and input to the phase comparator. At the phase comparator, a voltage value is output which is responsive to the phase difference of these two signals. The phase comparator output is input to a loop filter which establishes the frequency tracking characteristics of the PLL. The loop filter output is input to the voltage-controlled oscillator. The PLL is controlled so that the phase difference between the two signals at the input of the phase comparator is zero. Therefore, the following equation (1)obtains.

$$x/m = y/n \qquad (1)$$

Therefore, the output y of the voltage-controlled oscillator is as follows.

$$y = xn/m \qquad (2)$$

From the above, by means of the frequency divider 201 and the frequency divider 202, the frequency becomes n/m times and is synchronized to the reference oscillator.

By using a PLL in this manner, it is possible to obtain a signal of n/m times the frequency of and synchronized to the reference signal source. However, the method of using a PLL requires a VCO (voltage-controlled oscillator), thereby requiring a separate oscillator.

While control data and user data has been transmitted on the same radio frequency, the amount of user data was much greater than the amount of control data. In addition, user data and control data are transmitted and received separately.

It was inefficient an uneconomical to send a small amount of data over a wide transmission path. And large amounts of data require a wide transmission path.

Unless a high transmission frequency is used, it is not possible to establish a wide transmission path, and if a small amount of data is sent over a wide transmission path, it is difficult to form a transmission path, because of jitter and the like, which is caused by frequency.

As described above, to handle the transmission of diverse and large amounts of information such as in the PHS and LANs, if the transmission speeds of the uplink from the terminal to the base station and the downlink from the base station to the terminal are the same, it was not possible to make effective use of the radio circuit.

In a millimeter band such as the 60-GHz band, because of the high frequency, the electromagnetic propagation loss becomes extremely high. For this reason, when performing communication over somewhat of a distance, the transmitting power must be made large. The portable terminal of the type used in the SDL system is used in the proximity of the human body, making it unsafe from a health standpoint to transmit with high power from the terminal. A portable terminal usually is powered by a battery, and transmission with a high power leads to the problem of a shortening of the period of use before recharging or replacement of the battery.

In addition, millimeter-band devices are extremely expensive, and the requirement to use millimeter-band transmitting devices in a terminal makes it difficult to meet requirements for reduction in price. From the standpoint of volume as well, the use of millimeter-band transmitting devices makes it difficult to reduce size.

The ideal method of modulation will differ, depending upon what items of the transmitting bandwidth (transmission rate), the frequency band, the size of the transmitting/receiving circuit, the devices selected, and frequency utilization efficiency is to be given priority. For example, in narrow band communication such as in a mobile telephone, if frequency utilization efficiency is to be given priority, π/4DQPSK or QAM is used. However, in the case of wideband radio communication, these types of linear modulation require radio components that operate linearly over a wide bandwidth, making reduction of size and reduction of power consumption difficult.

In the SDL system, in which the uplink and downlink clearly have different transmission rates, if the same modulation method or methods which are similar in characteristics are used, there is no choice but to either adjust to one of the modulation methods or to use a compromise method for both the uplink and the downlink, even if performance drops.

In addition, in radio communication systems of the past, the transmission of a variety of quality information was made possible by providing radio communication systems having different transmission methods. That is, by housing two transceivers for different transmission methods in the same case, it is possible to implement diversified transmission quality. For this reason, there was the problem of the increase in size of the constitution of the transceiver.

SUMMARY OF THE INVENTION

The present invention has an object to provide a radio communication system which, by making the downlink transmission rate relatively fast in comparison with the uplink, enables the high-speed transmission of information to the terminal via the downlink, and which further has high frequency utilization efficiency.

Another object of the present invention is to provide radio communication system capable of an increase in the frequency bandwidth used to a bandwidth equivalent to that used in cable communication systems.

Yet another object of the present invention is to provide a radio communication system having a signal transmission rate reference oscillator with a simplified configuration, and which enables a simplification of a portable telephone apparatus for use in multimedia service.

To achieve the above-noted objects, a radio communication system according to the present invention has the following essential constitutional features.

A radio communication system according to the present invention is a radio communication system which includes a plurality of base stations, a plurality of terminals, an uplink circuit established between each of the base stations and each of the terminals for the purpose of radio transmission of prescribed information from a terminal to a base station, and a downlink circuit established between each of the terminals and each of the base station for the purpose of radio transmission of prescribed data from a base station to a terminal, this radio communication system comprising a low-speed transmitting means, provided at an above-noted terminal, which transmits a radio signal at a relatively low transmission rate to an above-noted base station via the above-noted uplink circuit, a low-speed receiving means, provided at an above-noted base station, which receives a radio signal sent at a relatively low transmission rate from an above-noted terminal via the above-noted uplink circuit, a high-speed transmitting means, provided at an above-noted base station, which transmits a radio signal at a relatively high transmission rate to an above-noted terminal via the above-noted downlink circuit, and a high-speed receiving means, provided at an above-noted terminal, which receives a radio sent at a relatively high transmission rate from an above-noted base station via the above-noted downlink circuit.

A radio communication system according to the present invention has at least one each of the above-noted uplink circuit and downlink circuit, each of these circuits having at least two types of radio signal transmission rates, there being at least one pair of such the circuits in which the transmission rate of one circuit is an integral multiple of the transition rate of the other.

A radio communication system according to the present invention is a radio communication system which includes a plurality of base stations, a plurality of terminals, an uplink circuit established between each of the base stations and each of the terminals for the purpose of radio transmission of prescribed information from a terminal to a base station, and a downlink circuit established between each of the terminals and each of the base station for the purpose of radio transmission of prescribed data from a base station to a terminal, this radio communication system comprising a low-speed transmitting means, provided at an above-noted terminal, which transmits a radio signal having a radio frequency in a relatively low frequency band at a relatively low transmission rate to an above-noted base station via the above-noted uplink, a low-speed receiving means, provided at an above-noted base station, which receives a radio signal of a relatively low frequency sent at a low transmission rate from an above-noted terminal via the above-noted uplink circuit, a high-speed transmitting means, provided at an above-noted base station, which transmits a radio signal having a radio frequency in a relatively high frequency band at a relatively high transmission rate to an above-noted terminal via the above-noted downlink circuit, and a high-speed receiving means, provided at an above-noted terminal, which receives a radio signal of a relatively high frequency sent at a high transmission rate from an above-noted base station via the above-noted downlink circuit.

In addition, in a radio communication system according to the present invention the above-noted high-speed transmitting means transmits a large amount of user information from an above-noted base station to an above-noted terminal via the above-noted downlink circuit by means of a high-frequency-band radio signal, and the above-noted low-speed transmitting means transmits a small amount of control information from an above-noted terminal to an above-noted base station via the above-noted uplink circuit by means of a low-frequency-band radio signal.

In addition, the present invention has an optimum connection station interpreting means which receives a signal for the purpose of identifying the above-noted wideband radio base station, notification of which is made from the above-noted wideband radio base station via a radio circuit, and which interprets from this signal the wideband radio base station that is suitable for connection, an optimum base station notification means which gives notification to the above-noted server of an above-noted specific wideband radio base station that is suitable for connection to an above-noted mobile radio station, via the above-noted narrowband radio base station, and a service starting means which starts the above-noted prescribed service via the above-noted specific wideband radio base station which is judged to be suitable for connection with respect to the above-noted mobile radio station.

In the case in which handover must be performed, in addition to the above-noted means, a radio communication system according to the present invention has a means which, when the above-noted mobile radio station receives the above-noted service via an above-noted specific wideband radio base station, receives a signal for the purpose of identifying the above-noted wideband radio base station, notification of which is given via a radio circuit from a wideband radio base station which is different from the above-noted specific wideband radio station, and which interprets from this received signal to which wideband radio base station should switching be made, a means by which the above-noted mobile radio station notifies the above-noted server via the above-noted narrowband radio base station of a wideband radio base station which is suitable as a switching destination, and a means by which the above-noted server switches a connection with respect to the above-noted mobile radio station, that connection is made via the above-noted specified wideband radio base station, which is judged to be suitable as a switching destination for connection, thereby providing the above-noted prescribed service.

By virtue of adopting the above-noted constitution, the present invention is proposed based on the above-described goal, in which it was stated that it makes sense for the transmission capacity of the uplink circuit of a terminal to be smaller than the transmission capacity of the downlink circuit of the base station. Specifically, because the transmission rate at which the terminal transmits information to the user is much higher than the transmission rate at which information is transmitted from the terminal to the base station, in view of this significant difference in transmission capacities, these respective transmitting/receiving means are constituted so as to provide appropriate transmission capacities for the uplink circuit and the downlink circuit. It is sensible to have the transmission capacity of a personal-use portable telephone be smaller than the receiving capacity. In addition, the user of a personal-use portable telephone receives the output thereof, and sends the response thereto to the personal-use portable telephone. Therefore, it is sufficient for a personal-use portable telephone to be capable of transmitting information to a base station at a transmission rate which is lower than the transmission rate when information is being transmitted to the user of the personal-use portable telephone.

That is, a personal-use portable telephone receives information from a base station at a higher transmission rate that is higher than when information is transmitted to the user of the personal-use portable telephone, making it reasonable that the personal-use portable telephone transmit information at a rate that is lower than the receiving rate.

This is highly desirable as well because of the limited battery capacity in a personal-use portable telephone. That is, the transmitting power of a personal-use portable telephone is limited by the battery capacity, and the transmission bandwidth is severely limited by this transmitting power. Specifically, it is desirable that a personal-use portable telephone not perform wideband transmission, because of this limited battery capacity.

As described above in detail, in a radio communication system according to the present invention, because the uplink circuit radio signal transmission rate is made relatively low, and the downlink circuit radio signal transmission rate is made relatively high, it is possible to send a large amount of user information from the base station to the terminal at high speed, thereby sufficiently meeting user requirements, while making effective use of the frequency spectrum.

BRIEF DESCRIPTION OF THE DRAWINGS

FIG. 7 is a block diagram which shows a radio communication system according to the fourth embodiment of the present invention.

FIG. 10 is a block diagram which shows an example of the basic configuration of a radio communication system according to the present invention.

FIG. 11 is a block diagram which shows the configuration of the eleventh embodiment of the present invention.

FIG. 12 is a drawing which shows the utilization condition of memory space in the embodiment of FIG. 11.

FIG. 13 is a block diagram which shows an example of an SDL system to which the present invention is not applied.

FIG. 28 is a block diagram which shows a radio communication system according to the twenty-second embodiment of the present invention.

FIG. 29 is a block diagram which shows a radio communication system according to the twenty-third embodiment of the present invention.

FIG. 32 is a drawing which shows the service area of a radio communication system related to the twenty-fifth embodiment of the present invention.

FIG. 33 is a drawing which shows the action of a portable electronic apparatus which is used in a radio communication system related to the twenty-fifth embodiment of the present invention.

FIG. 40 is a drawing which shows the input and output signals of the reference signal generating circuit related to the twenty-seventh embodiment of the present invention.

FIG. 41 is a drawing which shows the configuration of a frame timing clock generating circuit.

FIG. 44 is a drawing which shows the configuration of a clock synchronization system.

FIG. 51 is a flowchart which shows the processing steps in a radio communication system related to the thirty-first embodiment of the present invention.

FIG. 58 is a sequence diagram which shows communication starting protocol in a radio communication system related to the thirty-third embodiment of the present invention.

FIG. 60 is a sequence diagram which shows communication starting protocol in a radio communication system related to the thirty-fourth embodiment of the present invention.

FIG. 62 is a sequence diagram which shows communication starting protocol in a radio communication system related to the thirty-fifth embodiment of the present invention.

FIG. 64 is a sequence diagram which shows communication starting protocol in a radio communication system related to the thirty-sixth embodiment of the present invention.

FIG. 67A and FIG. 67B are plan views of mobile radio stations used in a radio communication system related to the thirty-ninth embodiment of the present invention.

DETAILED DESCRIPTION OF THE PREFERRED EMBODIMENTS

A number of preferred embodiments of a radio communication system according to the present invention will be described in detail below, with reference being made to the accompanying drawings.

Before being the description of the preferred embodiments, the basic principle of the present invention will be described, using the block diagram of FIG. 3.

Figure 3:
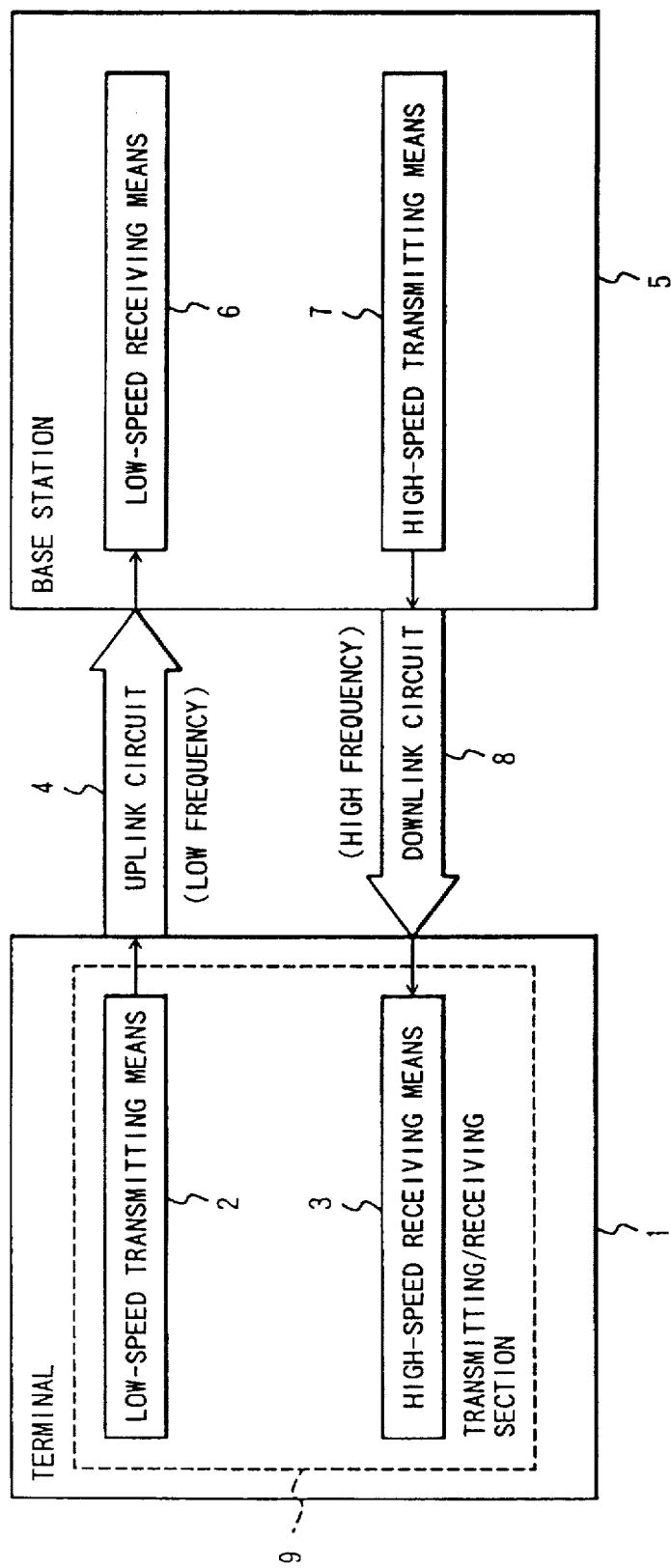
FIG. 3 is a block diagram which shows the basic principle of the present invention.

A radio communication system related to the present invention has a plurality of base stations which are assigned their respective parts of a prescribed service area, a plurality of terminals which can move around within the above-noted prescribed service area and, as shown in FIG. 3, it further has an uplink circuit 4 which is provided between individual terminals 1 and individual base stations 5 for the purpose of performing radio transmission of information from a terminal 1 to a base station 5, and a downlink circuit 8 which is provided between individual terminals 1 and individual base stations 5 for the purpose of performing radio transmission of information from a base station 5 to a terminal 1.

The above-noted terminal 1 has a low-speed transmitting means 2 which transmits a radio signal to the above-noted base station 5 at a relatively low transmission rate via the above-noted uplink circuit 4, and a high-speed receiving means 3 which receives a radio signal sent at a relatively high transmission rate via the above-noted uplink circuit 8 from the base station 5.

The above-noted base station 5 has a low-speed transmitting means 6 which receives a radio signal at a relatively low transmission rate from the above-noted terminal 1 via the above-noted downlink circuit 1, a high-speed receiving means 7 which transmits a radio signal at a relatively high transmission rate to the above-noted terminal 1 via the above-noted downlink 8. Furthermore, the reference numeral 9 denotes a terminal-side transceiving section, which includes a low-speed transmitting means 2 and a high-speed receiving means 3.

Figure 4:
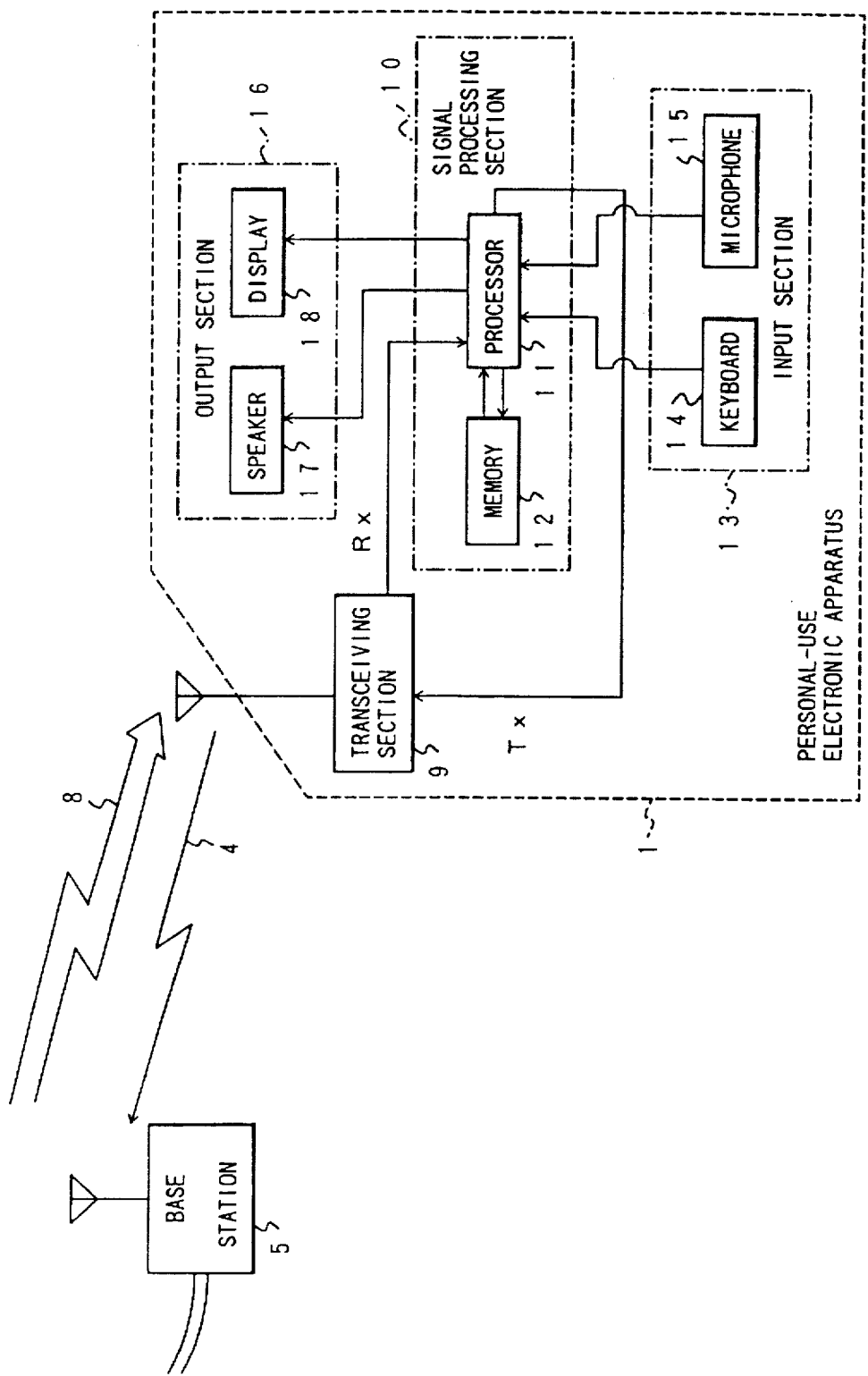
FIG. 4 is a block diagram which shows a radio communication system according to the first embodiment of the present invention.

Next the individual embodiments of the present invention will be described in sequence. First, in the first embodiment in communication with a personal-use portable telephone held by an individual, the communication system used is one in which a wideband signal is transmitted from a (relay) base station to an electronic apparatus via a downlink, and a narrowband signal is transmitted from the electronic apparatus to the relay base station via an uplink. A wideband downlink is used for communication which includes images, voice, file editing, information distribution, advertising, broadcasting, and the like, in which case the uplink is used for information to control the downlink, channel selection, and, in the case of multimedia, media selection control signals, voice, and the like. FIG. 4 shows the first embodiment.

In FIG. 4, the personal-use portable telephone 1 performs transmission and receiving with the base station 5 via the circuits 4 and 8, this having a transceiving section 9, a signal processing section 10 which processes data received by and to be transmitted by the transceiving section 9, an input section 13 which inputs a transmitting control signal, and an output section which outputs data which has been transferred in. The signal processing section 10 is formed by a processor 11 which performs, among other things, A-D conversion and coding of signals to be transmitted and D-A conversion and decoding of received data, and a memory 12 which temporarily stores data which is to be processed. The input section 13 has a keyboard 14 with numeric keys and the like for the purpose of inputting control information, and a microphone for inputting a voice, while the output section 16 has a speaker which outputs the voice which is related to the transferred in data, and a display 18 which displays character information and the like.

Figure 5:
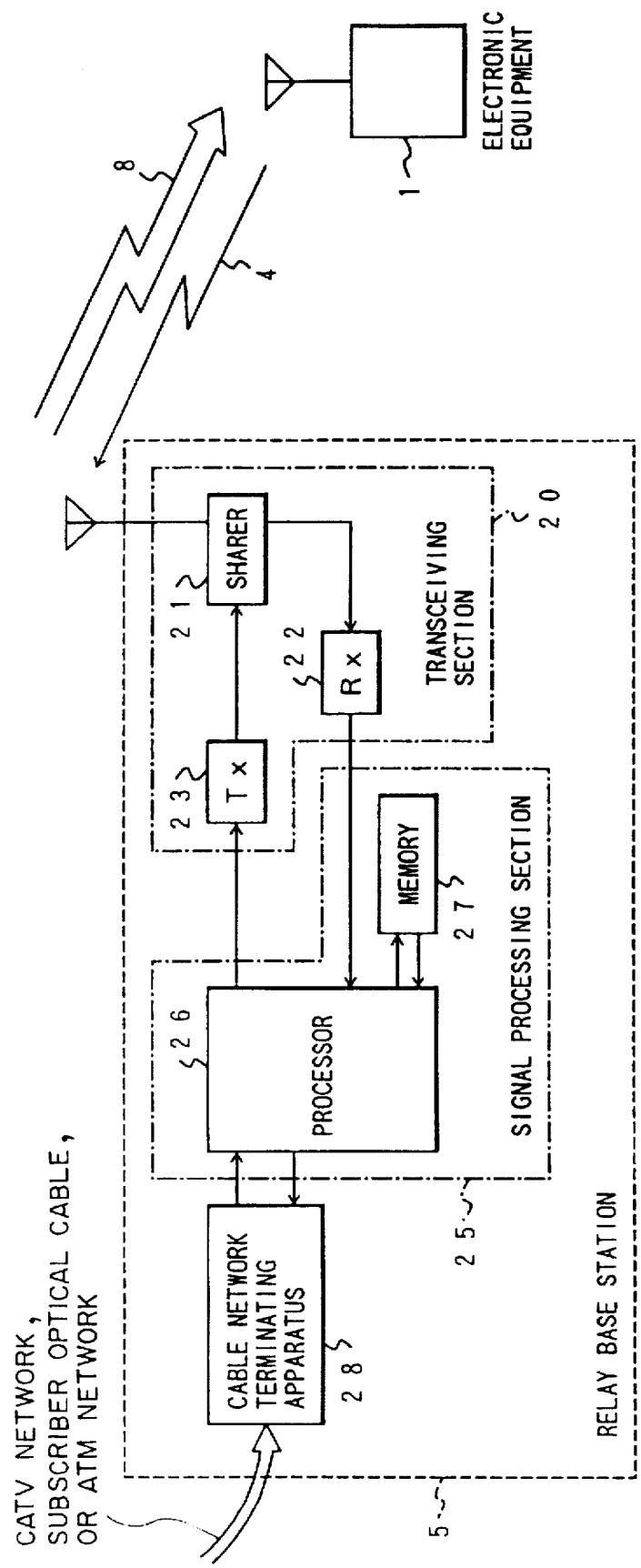
FIG. 5 is a block diagram which shows a radio communication system according to the second embodiment of the present invention.

A radio communication system related to the second embodiment of the present invention is applied to the case of multiple-recipient communications, which is a blending of broadcasting and communications. In this case, even an electronic apparatus held by an individual is capable of receiving a broadcast signal. In such cases, one broadcast signal selected from a plurality of broadcast signals is sent to the electronic apparatus 1 by the relay base station 5 in response to a request from the user of the electronic apparatus. In the future, the electronic apparatus 1 will be usable to freely process and use the information taken from a broadcast. When doing this, it is possible to store this information in the relay base station in response to a request from the electronic apparatus, and to process it, as will be described later. FIG. 5 shows one of the second embodiments.

The relay base station 5 in the above-noted type of radio communication system, as shown in FIG. 5, has a transceiving section 20 which performs transmission and receiving of data with the electronic apparatus 1 via the circuits 4 and 8, a signal processing section 25 which performs signal processing for the purpose of processing and using the data which is received from a broadcast or the like, and a cable network terminator apparatus 28 which accepts an information signal which is transferred in via cable network such as CATV, subscriber optical fiber cable, ATM, or the like. The transceiving section 20 includes a sharer 21 which accepts a control signal which is sent in from the electronic apparatus 1 and which outputs data to be sent to the electronic apparatus 1 via an antenna, a receiving section (Rx) 22 which converts a received radio frequency (RF) signal to a prescribed-frequency signal, and a transmitting section (Tx) 23 which converts data to be sent to an RF signal. The signal processing section 25 has a processor 26 which selects a channel from channels of data, in response to user requests from various electronic apparatuses 1 which are input via the cable network terminator apparatus 28, and which performs signal processing for the purpose of sending the selected desired data to an electronic apparatus 1, and a memory 27 which stores the desired data in response to the above-noted request of a user.

Figure 6:
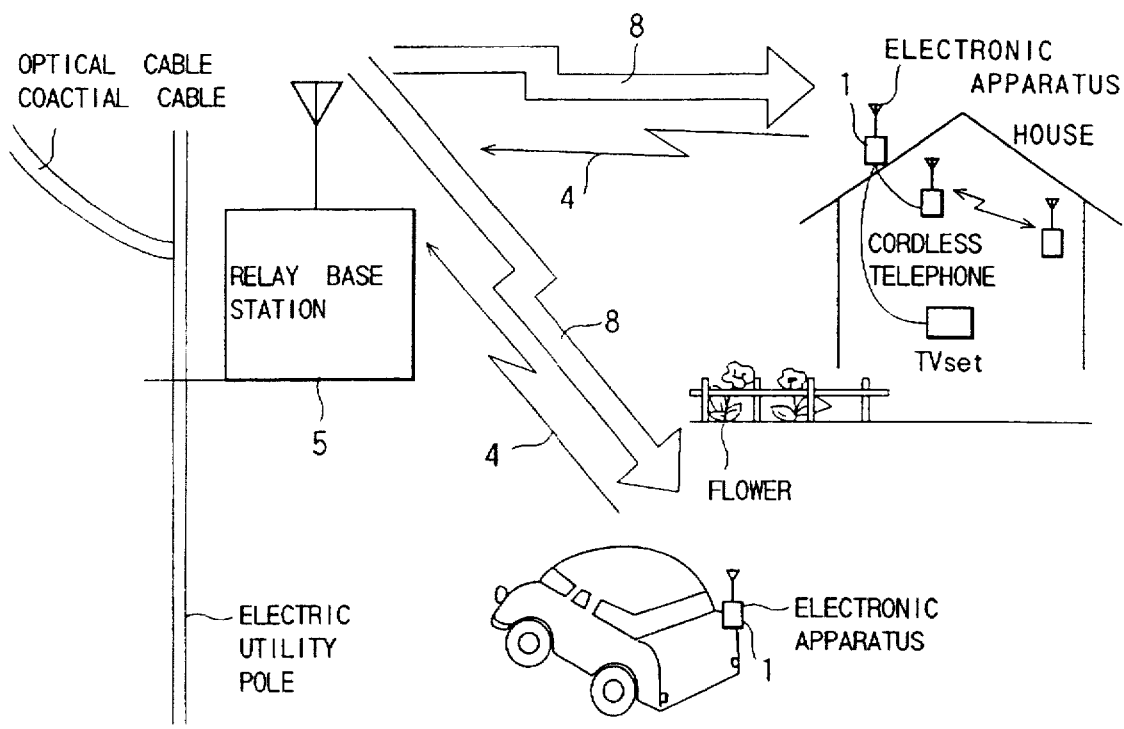
FIG. 6 is a drawing which illustrates a radio communication system according to the third embodiment of the present invention.

In the second embodiment, the electronic apparatus need not be for personal use. That is, it can be used by a number of persons, such as the case in which it is for family use. In particular as shown in FIG. 6, the relay base station 5 is mounted to electrical utility poles or the like, with optical cable or coaxial cable, or the like use to transfer information to that point. It is also possible for an electronic apparatus 1 which is mounted at home or in a vehicle to have a base station of a cordless telephone used at home, a VCR, or a home-use workstation or the like connected to it. In such a case, the electronic apparatus 1 transmits to the relay base station 5 information and information as to whether or not the information requested is to be stored, in accordance with a request from such home equipment. In accordance with this, the relay base station 5 selects information, and in some cases transfers it to the electronic apparatus 1 as it stores it.

The third embodiment is applied in the case in which the apparent amount of information generated by a human is large, the received information being processed and further retransmitted.

That is, there are cases in which a file A is received, this is processed or added to convert to the form $\alpha(A)+\beta$ and then retransmitted. In this case, $\alpha(A)+\beta$ appears to be a large amount of information. However, there are the operation of conversion to the amount of information $\alpha(X)$ that a human generates and the added information $\beta$. The amount of information required to express the conversion operation $\alpha(X)$ and the added information $\beta$ are information that a human generates, the speed of generation thereof not exceeding the speed at which the human brain and body can generate information. That is, it does a given speed. Specifically, it is low in comparison with the speed at which speed at which a human can receive information. In such cases, instead of transmitting $\alpha(A)+\beta$, it is acceptable to transmit only the conversion operation $\alpha(X)$ and $\beta$, these being used at the base station to generate $\alpha(A)+\beta$, the result sent to the far end party.

Operations such as file editing can all be implemented with these types of operations. That is, the original file is transmitted to the portable terminal via a wideband downlink, which is then looked at and edited by the user. The screens that are looked at and edited by the user are updated in accordance with the editing performed. Along with this, the editing information is sent to the base station, where the original file is edited based on this editing information. By doing this, editing is possible with an extremely small amount of transmission from the portable terminal to the base station.

By means of the above-noted operations, it is possible to reduce the radio transmission bandwidth, to reduce the radio transmitting power, and to perform efficient information transmission with a rechargeable battery.

This type of processing can be applied to examples other than the file operation noted above. Specifically, assume that A is the data for the face and the voice of a user of a personal-use portable telephone, and that these are stored at a base station or relay station. The personal-use portable telephone then transmits to the base station only the content of the speech and parameters for intonation different from the usual. Or else only expressions that are differ greatly from the user's normal facial expression or other emotional expression parameters are sent by radio. At the base station, these are synthesized to resynthesize the original voice or the original screen transmission. By doing this, it is possible to reduce the radio transmitting power, and to perform efficient information transmission with a rechargeable battery.

In addition, a relay base station which performs such processing as $\alpha(A)+\beta$ can be in the same position as the radio transceiving apparatus, but can also be at a remote location which is connected to a communication network inside, for example, the electronic apparatus's user computer or inside equipment at the far-end party.

The third embodiment is shown in FIG. 7. The relay base station 5, information amount expanding server 30, communication far-end server 31, information generating source database 32, and the like are connected, for example, in a network such as a LAN, MAN, or ATM network. The information generating source database 32 transmits information A to the electronic apparatus 1 via the relay base station 5. Along with this, the information A generates the processing operator $\alpha(x)$ and added information $\beta$. The electronic apparatus 1 transmits these processing operator $\alpha(x)$ and added information $\beta$ to the information amount expanding server 30, via the relay base station 5. The amount of information this operator and added information have is the amount of information that is generated by the human who is the user of the electronic apparatus 1, this capacity being small. At the information amount expanding server 30, information A is processed by the processing operator $\alpha(a)$ and the added information $\beta$, $a(A)+\beta$ is generated, this being sent to the server 31. The information amount expanding server 30 send the processed information $\alpha(A)+\beta$ to the electronic apparatus 1A via the relay base station 5A, and this can be displayed on the display 18 of the electronic apparatus 1A, or $\alpha(A)+\beta$ can be made at the electronic apparatus 1 and displayed on the display 18.

There are cases in which the apparent amount of information generated by a human is large. This is the case in which the received data is processed and then retransmitted. That is, it is the case in which the original information A is received at a portable electronic apparatus, this being processed or added to, converting it to the form $\alpha(A)+(B)$, and retransmitting it. In this case, the $\alpha(A)+\beta$ can appear to be data of great quantity. There are many cases in which there is a large amount of the original data A. However, there are the operation of conversion to the amount of information $\alpha(X)$ that a human generates and the added information $\beta$. The amount of information required to express the conversion operation (X) and the added information $\beta$ are information that a human generates, the speed of generation thereof not exceeding the speed at which the human brain and body can generate information. That is, it does not exceed a certain speed. Specifically, it is low in comparison with the speed at which speed at which a human can receive information. In such cases, instead of transmitting $\alpha(A)+\beta$, only the conversion operation $\alpha(X)$ and $\beta$ are transmitted, these being used at the receiving side to generate $\alpha(A)+\beta$, the result being the same.

That is, the relay base station sends A to the electronic apparatus, and along with that A is stored at the relay base station. Then, the electronic apparatus looks at A, while transmitting only the information α(X) and the conversion operator β to the relay base station. Simultaneously with this, at the electronic apparatus α(A)+β is made and displayed, while the relay base station also makes α(A)+β and sends this to the far end. By means of the above, it is possible to implement service which requires the transmission of large amounts of data, without using excessive frequency resources and by means of low-capacity battery power.

Furthermore, a communication system such as described above, in which wideband signal transmission is performed via a downlink from a relay base station or base station to an electronic apparatus or a personal-use portable electronic apparatus and in which narrowband signal transmission is performed via an uplink from an electronic apparatus to a relay base station is implemented in the fourth embodiment, which is shown in FIG. 4.

Figure 9:
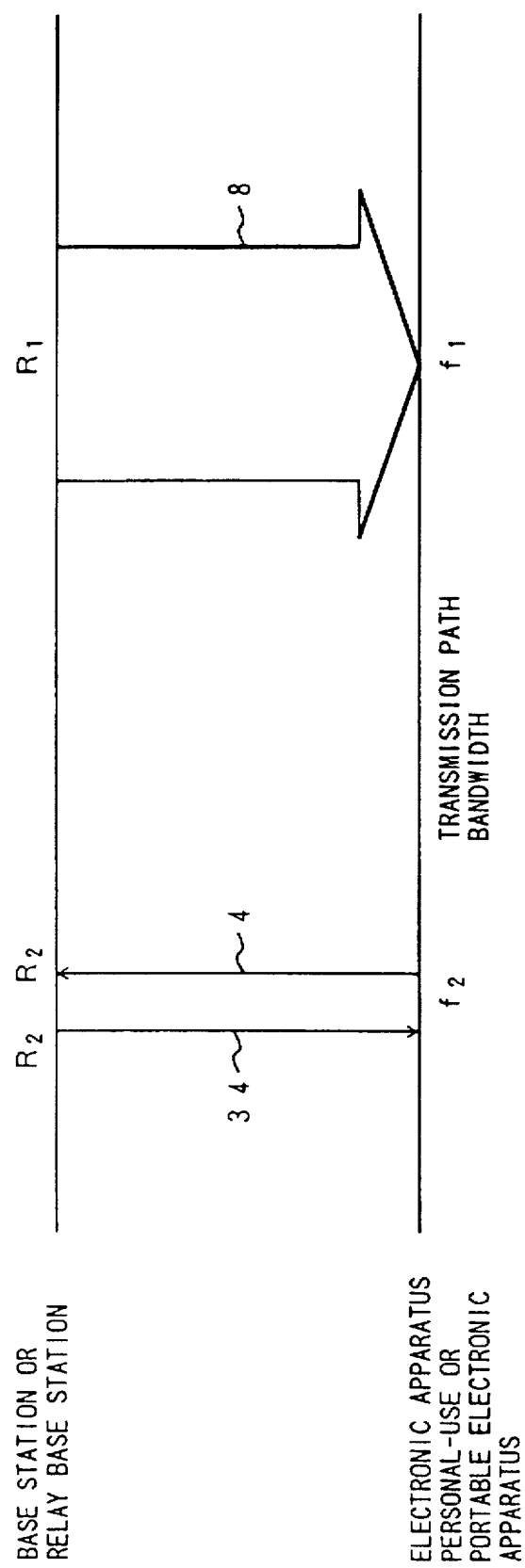
FIG. 9 is a drawing which shows an example of a different form of communication.

In the fourth and fifth embodiments, there are two modes of communication with an electronic apparatus held by an individual, one in which wideband signal transmission is performed via a downlink from a relay base station to the electronic apparatus, and in which narrowband signal transmission is performed via an uplink from the electronic apparatus to the base station, and another in which narrowband signal transmission is performed in both directions. A wideband downlink is used for communication which includes images, voice, file editing, information distribution, advertising, broadcasting, and the like, in which case the uplink is used for control signals or the above-noted conversion operators. The communication mode in which narrowband signal transmission done in both directions is used when both sides are transmitting voice or low-speed data. That is, it is very desirable that there be one narrowband uplink and two downlinks, one narrowband and one wideband. The fifth embodiment is shown in FIG. 9. In FIG. 9, the reference numeral 34 is the narrowband downlink circuit used for low frequencies. In addition, it is desirable that which of these two is to be used is established by a request from an electronic apparatus. That is, when there is a call from an electronic apparatus, if it is a voice signal the narrowband downlink is requested, but if it is an image transmission request, the wideband downlink is requested.

FIG. 10 shows a radio communication system related to this fifth embodiment. The configuration shown in FIG. 5 differs from the configuration shown in FIG. 3 in the low-speed transmitting means 35 provided at the base station 5, the low-speed receiving means 39 provided at the terminal 1, and the above-noted downlink circuit 34 between this low-speed transmitting means 35 and low-speed receiving means 36.

In the case in which communication is started from the electronic apparatus, first it is reasonable that the narrowband link of FIG. 10 is used to transmit to the base station or relay base station what kind of communication it is, a selection of one of the two downlinks being made based on the transmitted signal, the links in both directions being then opened. When a transmission intended for the electronic apparatus reaches the relay base station, in the case in which both a narrowband and a wideband downlink are provided, first the narrowband downlink is used to inform the electronic apparatus that a call for it has been received, whereupon the electronic apparatus informs the base station whether or not it can use that link to the call to receive it, and a corresponding link is assigned.

In this case, the narrowband link itself can also be a narrowband bi-directional transmission means which operates independently. For example, it is possible to use the TDMA/TDD (time division multiple access/time division duplex) form of transmission.

The sixth embodiment is applied to the case in which frequency placement problems exist when the bandwidths of the uplink and the downlink differ greatly. Specifically, in the case in which this is to be implemented using FDMA/FDD (frequency division multiple access/frequency division duplex), if the specifications of the sharers of the terminals are all made the same, it is desirable that the frequency spacing of the uplink frequency and the downlink frequency be the same. When this is done, on the narrowband uplink, the frequency difference between adjacent channels becomes much greater than the uplink bandwidth, leaving much of the frequency band unused, quite an undesirable condition. Therefore, a pseudorandom signal series is used to achieve bandwidth dispersion on the uplink, so that transmission is done with almost the same bandwidth as the downlink. If the dispersion ratio is large, the uplink frequency can be made the same as other systems.

The seventh and eight embodiments are applications to the case in which long-distant transmission is not possible because of the tendency of the high-speed downlink to be influenced by multipath. There is also a desire to perform long-distance transmission, even if the bandwidth is narrow. In such cases, a signal to be transmitted a long distance is dispersed using a pseudorandom series having a long period and then transmitted, and a short-distant large capacity signal is dispersed using a pseudorandom series having a short period and then transmitted, thereby enabling satisfaction of both requirements. In addition, because it is possible to select the transmission rate freely by selecting the series, in response to the position at which the electronic apparatus exists, it is possible to perform communication with high flexibility in the case in which there is a mixture of signals with various bandwidths. It is also possible, in the case in which there are radio circuits with differing original data rates, to use pseudorandom series of the appropriate length so each of the circuits has approximately the same bandwidth after dispersion, thereby enabling the provision of a radio communication system which is flexible and which enables effective use of frequency bandwidth.

In addition, in the case in which this kind of bandwidth dispersion is used, because it is possible to use the same frequency band for a plurality of links, it is easy to achieve a reduction to a small size and weight, for facilities in the base station or relay base station, and also for the personal-use portable electronic apparatus or electronic apparatus.

The ninth embodiment is applied in the case in which the timing of transceiving is different between transmitting and receiving, these not being performed simultaneously, thereby enabling free selection of the uplink and downlink frequency, enabling even more effective use of frequencies.

The tenth embodiment is applied to accommodate the case in which to accommodate a radio LAN or the like, if the uplink is randomly accessed, access to a server or database connected to the network can be performed by a simple protocol.

The eleventh and twelfth embodiments will be described using FIG. 11 through FIG. 13.

FIG. 11 is a block diagram of the eleventh embodiment, which shows the configuration of an SDL system to which the present invention has been applied. As illustrated therein, a memory 42 is provided between an information providing station 41 and a base station 5, information which is obtained via a communication circuit 43 being stored in the memory. The portable electronic apparatus 1 accesses the base station by radio communication, almost all the information that many electronic apparatuses desire being stored in the memory, enabling the passage of much information to be executed merely via the connecting line 44.

While this functions for a radio communication post and memory as well, a different embodiment of the present invention enables connections between one memory and a plurality of radio communication posts.

FIG. 12 is a drawing for the purpose of describing the condition of memory in the system of the eleventh embodiment of the present invention. The information 47 and 48, which is obtained from the information providing station, is placed in the memory. The frequency of access of this information is differentiated into levels, and when there is a new information access, the stored contents are discarded, starting from information 23, which has a low access frequency, with new information 46 being written into memory area 45.

As another embodiment, in the case in which the memory area is sufficiently large with respect to the amount of information, it is possible to write all of the information into memory beforehand.

As yet another embodiment, in the case in which there is an effective period of time for the information, such as in the case of a newspaper or a magazine, it is possible when the time limit has come, to erase the information from the memory, or to overwrite it with new information.

FIG. 13 is a drawing which shows the information providing service according to an SDL system related to the twelfth embodiment. The information providing station 32 provide information such as newspapers, magazines, images, voice, traffic, or personal information. The information providing station is connected to the base station 5 by means of a communication circuit 49. The base station is installed at a transport station, a structure, or on a road, and sends information in response to a request from a portable electronic apparatus 1, or information is sent continuously from the base station.

A radio communication system in accordance with the above-described first through twelfth embodiments, is related to the SDL system, the principle of which is shown in FIG. 4. The radio circuit is formed by a wideband downlink from the base station to a personal-use portable electronic apparatus, and a narrowband uplink from a terminal to a base station. In these embodiments, on the case in which the transmission rates of the uplink and the downlink are asymmetrical is proposed, nothing being said about frequency placement or method of modulation.

Figure 1:
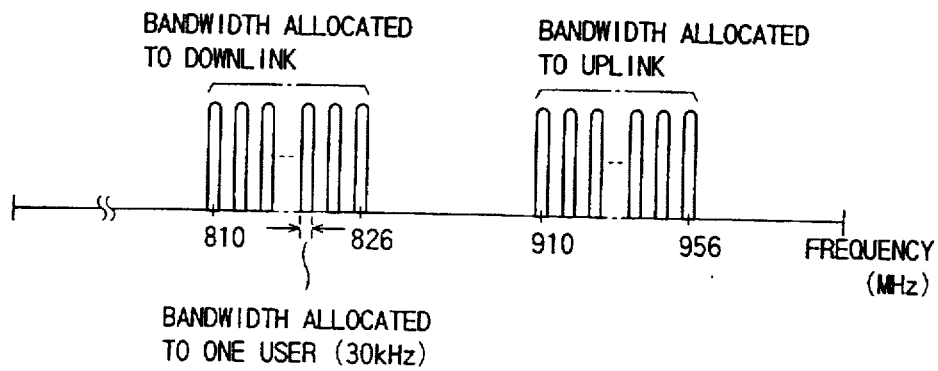
FIG. 1 is a drawing which shows the configuration of a PLL in the past.
Figure 2:
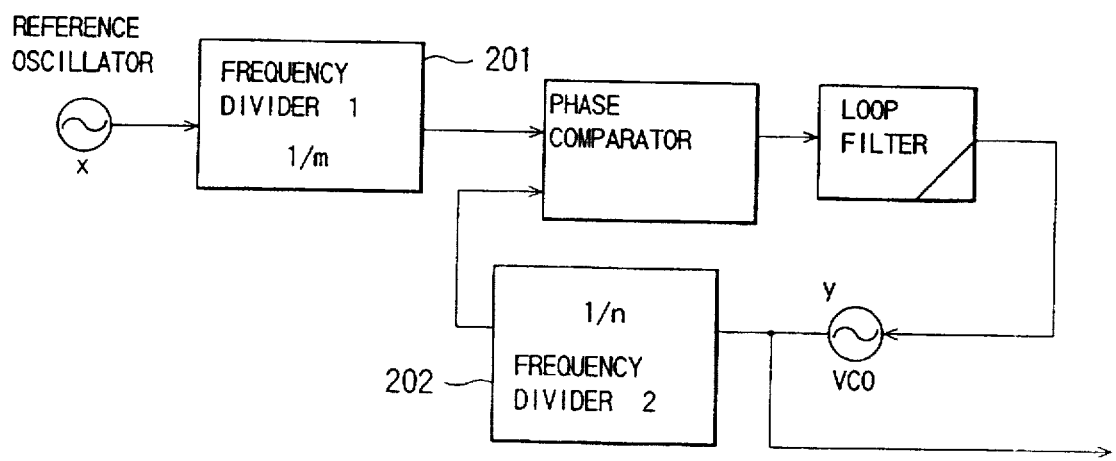
FIG. 2 is a drawing which shows the frequency placement in a radio communication system in the past.

A frequency placement example of the past is shown in FIG. 1. This is the Japanese RCR STD-27B digital automobile telephone system. In this system, the downlink and the uplink have the same transmission rate, the 800-MHz and 1.5-GHz bands being used as the radio frequency bands. In the 800-MHz band, the downlink is located in the range 810 MHz to 826 MHz, and the uplink is located in the range 940 MHz to 956 MHz. In a system of the past, because an uplink and a downlink operating at the same transmission rate were assumed, transmission is performed in the same frequency band. However, problems arise when considering application to the SDL system.

In the SDL system, because a wideband downlink is assumed, in a low frequency band such as the 800-MHz band, it becomes difficult to assign this wide band and to achieve effective frequency usage. For example, in the case of trying to perform transmission at 100 MHz or so, it is obvious that it is impossible for the bandwidth to be found to allow one user 100 MHz bandwidth in the 800-MHz band. For this reason, it is necessary to perform transmission in the sub-millimeter band of several gigahertz, or in the millimeter band of several tens of gigahertz.

Figure 14:
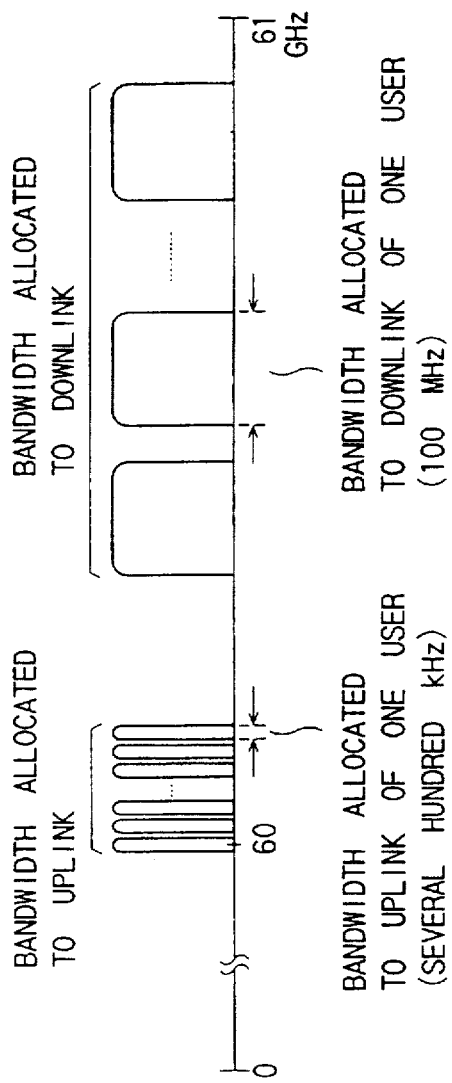
FIG. 14 is a drawing which shows the frequency placement of a radio communication system.

An example of the frequency placement in the case in which a radio communication system related to the present invention is configured using a 60-GHz-band SDL system is shown in FIG. 14.

The amount of information that a human being is capable of generating has an upper limit due to the capability of a human being. In contrast, the amount of information that a human can perceive is much greater than the amount of information that a human can generate. The information that a human can generate is limited, even if we add together voice, input from a keyboard or a mouse, facial expressions, and all other information. The amount of information in the human voice falls far short of 64 kbps. Even if various means of transferring data between the human and a machine, such as a keyboard or a mouse, are used, none of these can surpass the amount of information that can be generated by the human mind or parts of the body, and in total the amount of information that a human being can generate is thought of as not exceeding 100 kbps.

In contrast to this, the amount of information that a human being can receive is extremely large. The human being receives a plurality of sensory media, such as voice, images, atmosphere, tactile senses, and smells, and the like, using perception organs that operate independently. In addition, the brain and the organs of a human being process the information they receive, extracting and processing only information which can be processed by the brain and the bodily organs, in response to the individual human's history and processing priority. In normal everyday life, much more information than can be generated by a human being is received. And feedback is applied to an information receiving means which selects which information is to be accepted, based on the received information. The manner in which this feedback is applied differs from individual to individual. Therefore, even if a large number of humans receive the same information, the method of processing it will differ greatly. That is, it is possible for a human to receive a great amount more information than it is possible for the human mind or bodily organs to process.

This can also be understood from the difference in sizes between the part of the human brain which governs the receiving of information and the part of the human brain which governs the generation of information. The auditory/visual part of the brain is extremely large. In contrast to this, the part related to the generation of language is not so large. Nerves a strung throughout all parts of the body, and a variety of information is collected in the brain and the spinal cord. In contrast to the very large amount of information, the information that the brain generates is limited to the voice and a few gestures. In terms also of the thickness of the nerves that are used as information transmission paths within the body, the thickest of these is the optic nerve, which governs the reception of information.

This fact can be understood from engineering applications as well. Specifically, in the case of generating image information that a human being will receive, to make image information that the human being will sense as being natural, several megabits per second of information are generally required. In images made will less than this amount of information, a human will easily be able to detect unnaturalness of shape and movement. And a human is not capable of generating this amount of image information. The amount of information in a human facial expression is extremely small compared with the amount of image information the human eye generally perceives. The analog of this is the very high compression ratio when an image is bandwidth compressed to capture a human facial expression. Bandwidth compression of an image including a human facial expression has be researched in detail by Prof. Harashima et al, of University of Tokyo, from which this extremely high compression ratio is known. That is, the amount of information in the human facial expression is extremely small. Virtually the same is true of the voice. Using current bandwidth compression technology, voice information can be compressed to approximately 4 kilobits per second. That is, the amount of information is small.

In the case in which music from an musical instrument, rather than a voice, is to be used to generate information, the amount of information is small. Consider the amount of information from a piano performance. A piano has 88 keys and, therefore, when one is pressed data less than 7 bits is generated. If it is possible for a fast person to press ten keys in one second, there are ten fingers, and additionally, if there are 1000 sound levels (10 bits) which the sound can take, this is 7*10*10*10=7000, which is no more than 7 kilobits per second. This does not change with the model and the tone of the piano. When recording a piano performance, the required information speed is generally no more than 1000 bits per second. While it appears that a large amount of information is generated by a musical instrument when it is played, the amount of information generated by the musical instrument only appears to be large because the information of the tone and individuality of the musical instrument is modulated by information that is generated by a human being.

On the other hand, in the case of receiving information, a human being is capable of receiving and processing a very large amount of information. With an orchestra of 150 people generating information, if even one performer makes a mistake, it can be easily detected. Additionally, a human being is constantly distinguishing sound from the extremely large amount of information generated by the performers' modulation of the characteristic information generated by the instruments, and perceiving and extracting characteristics therefrom.

Consider the case of five people having a serious discussion. Each person is receiving information from the other four people, who are making all efforts to express their opinions to the other person. While all of the information from the other four people is not processed in the receiving person's brain, it is at least received via the person's sensory organs. Even after the meeting, the participants have a general grasp of who said what. This is possible because, of the information received from the other four persons, the required parts were processed by the brain. With regard to information generation, it is generally not possible for one person to generate an amount of information that exceeds the total of the average information generated by the other four persons.

That is, there is a large difference in the amount of information that a human being can generate and receive. Specifically, the amount of information that a human being generates is extremely small compared to the amount of information that can be received by a human.

The amount of information transmitted in a personal-use electronic apparatus of the past was small compared to the amount of information that a single human being can generate. That is, it was no more than as much as a voice transmission. Therefore, this human being clearly generated less information that the human being was intrinsically capable of generating. However, when wider bandwidth radio communication becomes possible in the future, it will be possible to perform radio transmission at a transmission rate that is lower than the information receiving rate of a human being and greater than the information generating rate of a human being. When this is done, it will not be possible as in the past to make effective use of frequencies with the same rate for both transmitting and receiving.

In the past, the same modulation method was used in the uplink and the downlink. For example, in a narrowband digital automobile telephone system using the TDMA of Japan and the US, π/4DWPSK was used on both the downlink and the uplink. A proposal to use different modulation methods on the uplink and downlink was made in the US digital automobile telephone standards (IS-95) which uses OQPSK. In this, the uplink uses OQPSK (Offset Quadrature Phase Shift Keying-4) and the downlink uses QPSK (Quadrature Phase Shift Keying-4). However, the information transmission rates are the same, this clearly differing from the SDL system. Also, because the same PSK modulation is used, the characteristics are extremely similar. There are no examples of using modulation methods of completely different natures and with completely different transmission rates.

Figure 15:
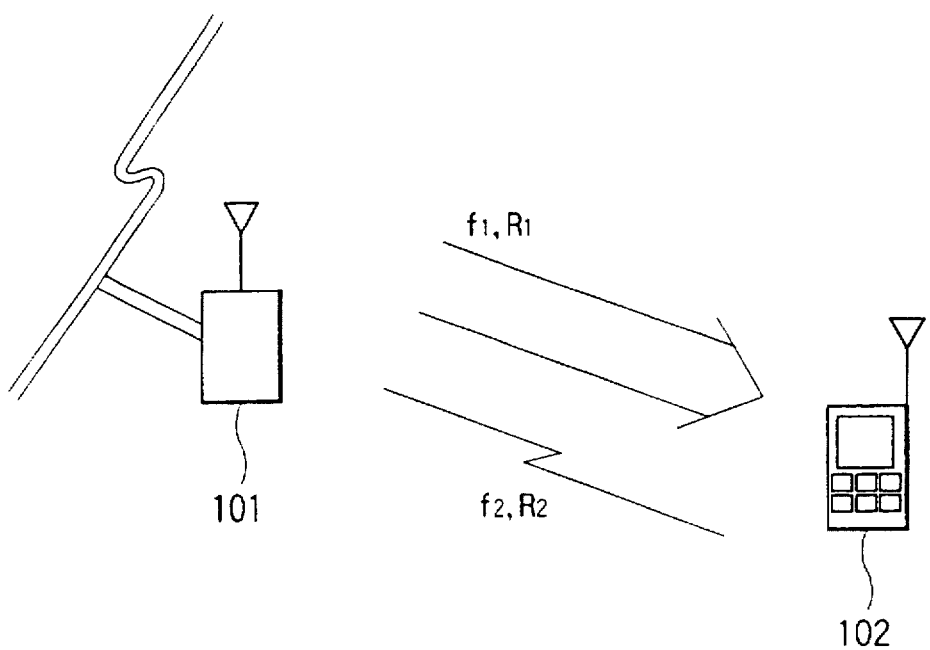
FIG. 15 is a conceptual drawing which shows a radio communication system according to the thirteenth embodiment of the present invention.
Figure 16:
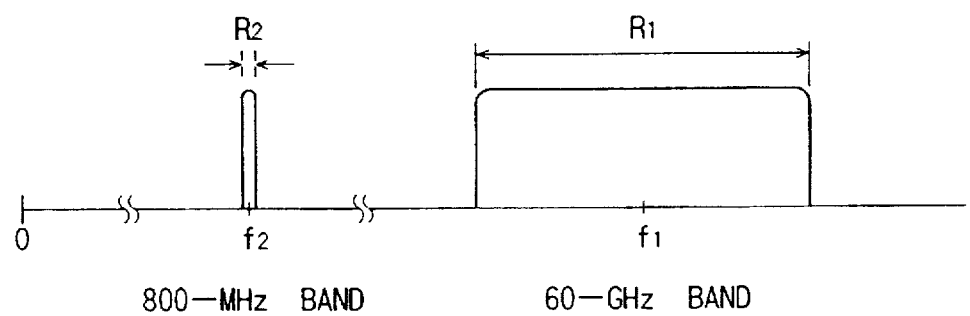
FIG. 16 is a drawing which shows the frequency placement in the thirteenth embodiment of the present invention.

The thirteenth embodiment of the present invention is shown in FIG. 15. Communication is performed by a radio communication terminal 101, which is connected to a cable network, and a portable radio terminal 102. The relationship between the frequency band used for this communication and the transmission rate is shown in FIG. 16.

Transmission from the radio communication terminal 101 to the portable terminal 102 is performed via a radio circuit (downlink) at a transmission rate of R1 at a radio frequency of f1 in the 60-GHz band. In this embodiment, because BSPK, which is a two-state modulation method, is used, the transmission rate and the used bandwidth are noted as the same. R1 is the 100-Mbps transmission rate, it is possible to achieve a 100-MHz bandwidth by using the 60 GHz band, and it is possible to implement wideband transmission.

Transmission from the portable terminal 102 to the radio communication terminal 101 is performed via a radio circuit (uplink) at a transmission rate R1, which is lower than R1, at a frequency of f2 in the 800-MHz band. Because the information that is generated at the portable terminal 102 can be thought of as being mainly input from keys and voice, sufficient information transmission can be performed with a transmission rate of several tens of kilobits per second. In this embodiment, this was made 30 kbps. If this is 30 kbps, because sufficient bandwidth can be achieved even in the 800-MHz band, transmission is possible at this bandwidth.

Because the radio frequency band at the terminal is low, there is little propagation loss in the air, so that the power need not be made that large. Also, because the transmitted bandwidth is small, the total power is also small. For this reason, it is possible to reduce the power consumption, enabling a lengthening of the period of continuous use before recharging or replacement of the battery.

In addition, devices for the 800-MHz band are widely used in automobile telephones, and inexpensive devices are readily available. Reduction of the size of devices is also being achieved. By placing the uplink in the 800-MHz band, it is possible to reduce the cost and the size of the terminal.

19

Figure 17:
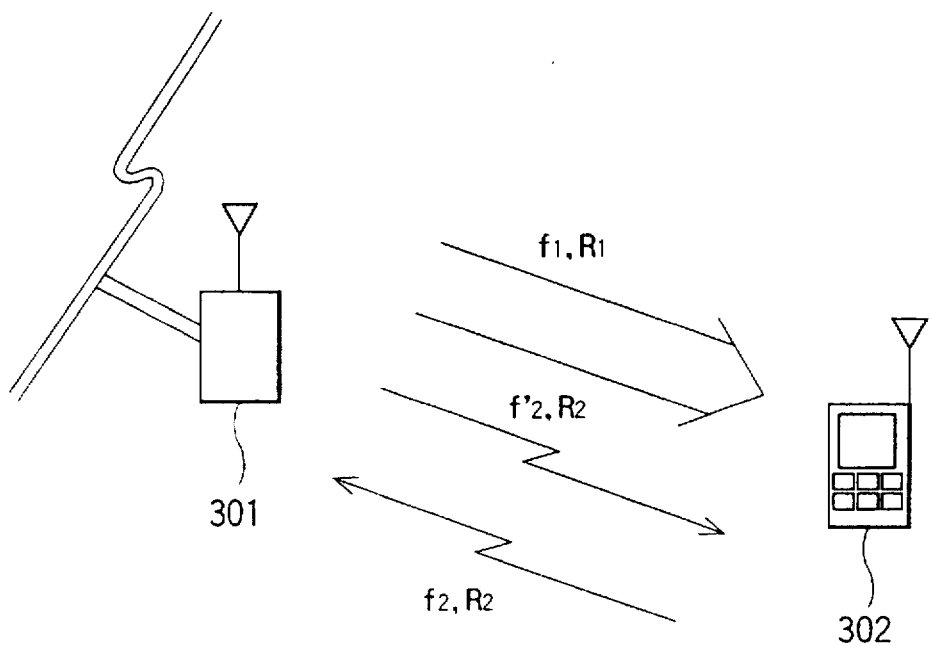
FIG. 17 is a conceptual drawing which shows a radio communication system according to the fourteenth embodiment of the present invention.

The fourteenth embodiment of the present invention is shown in FIG. 17.

Figure 18:
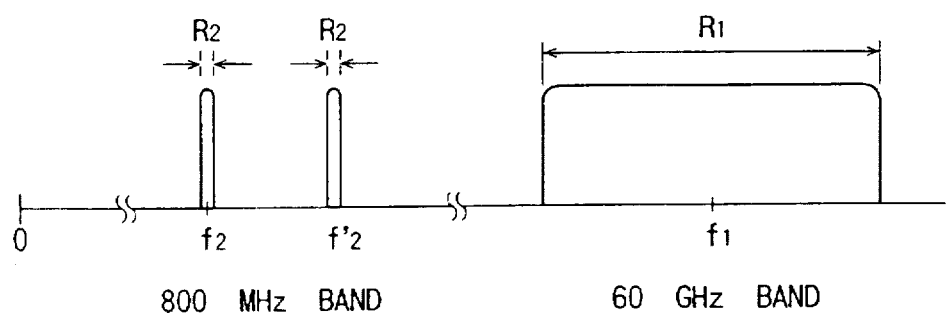
FIG. 18 is a drawing which shows the frequency placement in the fourteenth embodiment of the present invention.

Communication is performed between a radio communication terminal 301, which is connected to a cable network and a portable radio terminal 202. In doing this, the relationship of the radio frequency placement and the transmission rate is as shown in FIG. 18.

Transmission from the radio communications terminal 301 to the portable terminal 302 is performed via a radio circuit (downlink) at a transmission rate of R1 at a radio frequency of f1 in the 60-GHz band. R1 is a high-speed circuit of, for example, 100 Mbps. Along with this, another single downlink is provided for transmission at a rate of R2 (for example, 30 kbps) at f2' in the 800-MHz band. Transmission from the portable terminal 302 to the radio communication terminal 301 is performed via a radio circuit (uplink) at a transmission rate of R2 at a radio frequency of f2 in the 800-MHz band.

The difference in this in comparison with the thirteenth embodiment is the provision of on more downlink, at f2 and R2. The 60-GHz-band downlink, because of the characteristics of that frequency band, is susceptible to the influence of obstructing objects. Because of shadowing caused by obstructing objects, cutoff of the communication circuit occurs. In this embodiment, by providing a link by the additional one downlink at f2', it is possible to prevent the total cutoff of the downlink. Compared to the radio frequency f1 in the 60-GHz band, the radio frequency f2' in the 800-MHz band has less propagation loss and is less susceptible to shadowing, thereby reducing the possibility of circuit cutoff. For example, by assigning a control channel to this f2'/R2 downlink, even in the event that the f1/R1 downlink is cut off, there is no complete cutoff, the link between the radio terminal 301 and the portable terminal 302 being maintained by executing such protocols as the completion protocol, the upper state protocol, and the cutoff protocol via the control channel. In this case, although the portable radio terminal 302 an additional f2'/R2 receiving apparatus, compared to the 60-GHz-band receiving apparatus, the added part has negligible small current consumption, volume, and cost. By adopting the radio frequency bands and transmission rate configuration of this embodiment, it is possible to implement a high-performance portable terminal which is small, has low power consumption, and which is low cost.

Figure 19:
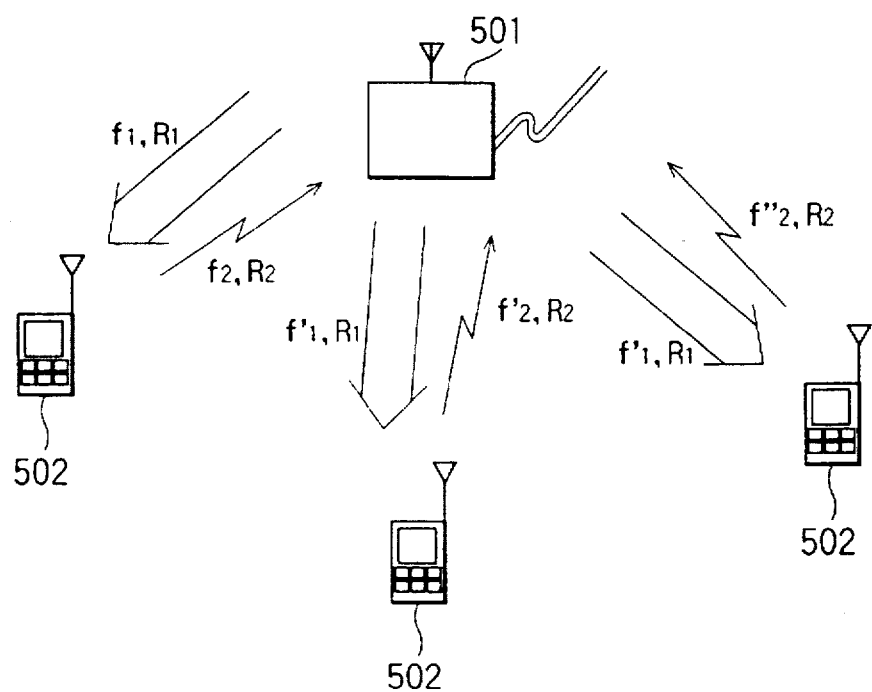
FIG. 19 is a conceptual drawing which shows a radio communication system according to the fifteenth embodiment of the present invention.

The fifteenth embodiment of the present invention is shown in FIG. 19.

Figure 8:
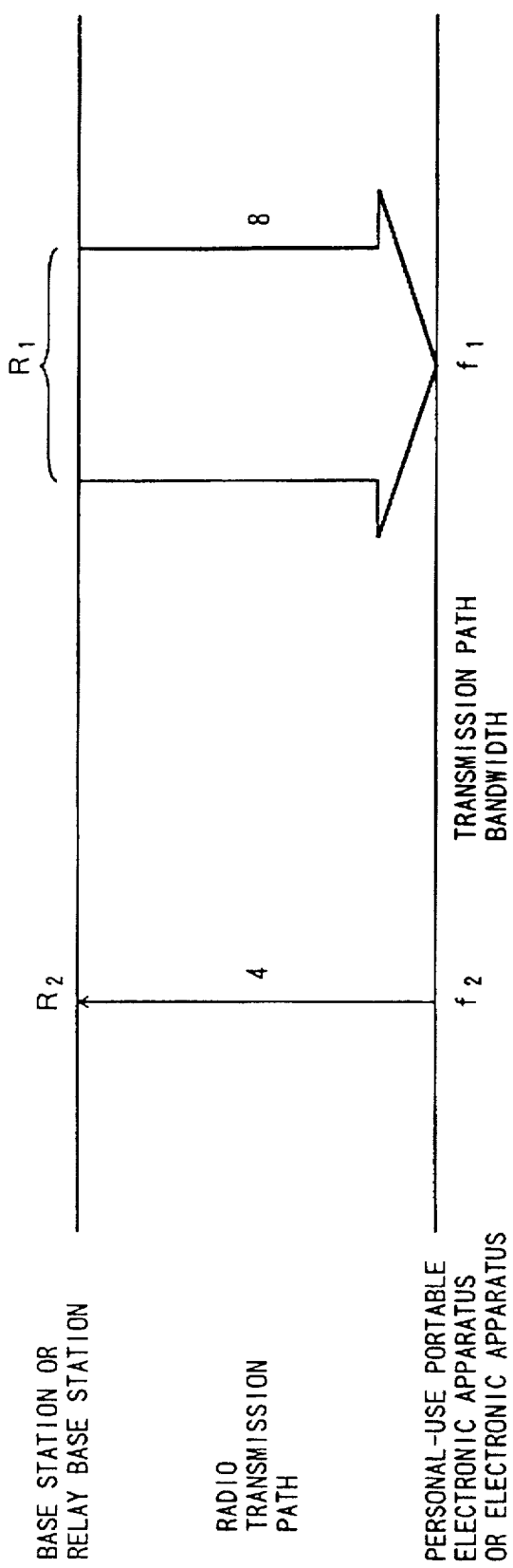
FIG. 8 is a drawing which shows an example of the usual form of communication.
Figure 20:
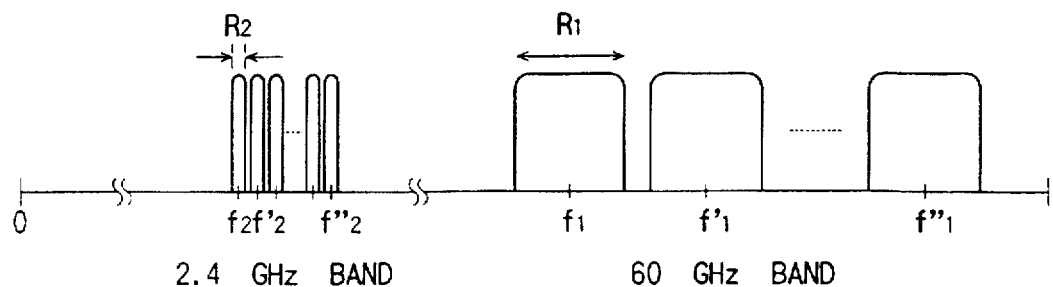
FIG. 20 is a drawing which shows the frequency placement in the fifteenth embodiment of the present invention.

Communication is performed between a radio base station 501, which is connected to a cable network, and a plurality of portable radio terminals 502. The relationship between the radio frequency band and the transmission rates in this embodiment is shown in FIG. 20. From the radio base station 501 to each of the portable terminals 502 (downlink) transmission is made on frequencies f1, f1', f1" in the 60-GHz band at a transmission rate of R1. From each of the portable terminals 502 to the radio base station 501 (uplink) transmission is made on frequencies f2, f2', and f2" in the 2.4-GHz band at a transmission rate of R2. R1 is 100 MHz, and R2 is 2 MHz. In doing this, one base station and a plurality of terminals perform wideband transmission over a millimeter downlink and relatively narrowband transmission over a 2.4-GHz-band uplink. The frequency placement at each of the terminals, as shown in FIG. 8, is configured such that f2 follows and corresponds to f1 and such that f2' follows and corresponds to f1'. In this embodiment, while frequency multiplexing is used on both the uplink and the downlink, it is also possible to employ multiplexing by time-division multiplexing, coding-division multiplexing, or the ALOHA system or the like. In this embodiment, because the uplink transmission rate is a relatively high 2 MHz, the 2.4-GHz band is used. Compared with the 800-MHz band, the 2.4-GHz band has higher propagation loss, but compared with the 60-GHz band it has much lower propagation loss, so that, compared to the case in which the same 60-GHz band is used for the uplink and the downlink, it is possible to limit the terminal power to a low power. It is possible to make the influence of the terminal on a human being small, and to have a configuration which has low power consumption, small size, and low cost.

Figure 21:
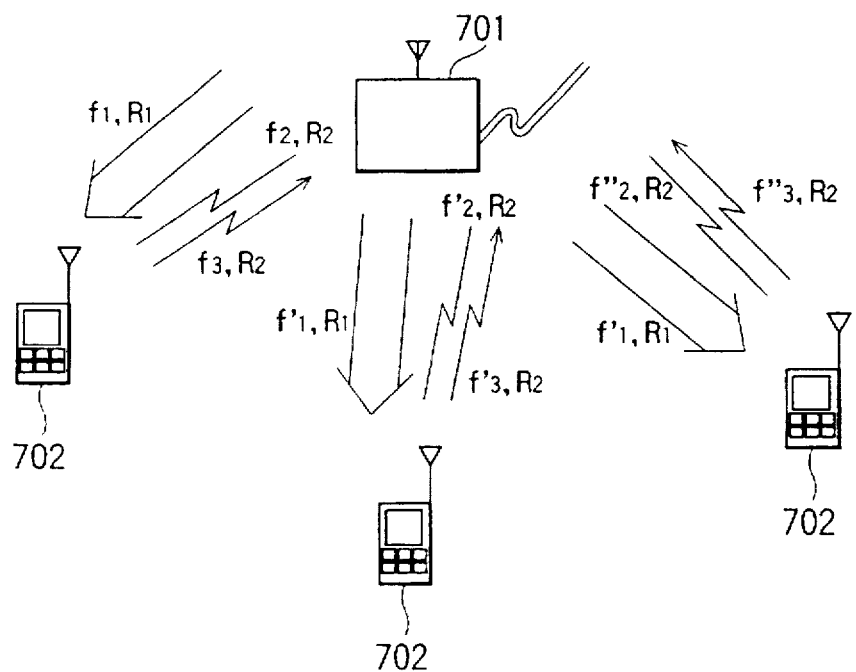
FIG. 21 is a conceptual drawing which shows a radio communication system according to the sixteenth embodiment of the present invention.

The sixteenth embodiment of the present invention is shown in FIG. 21.

Figure 22:
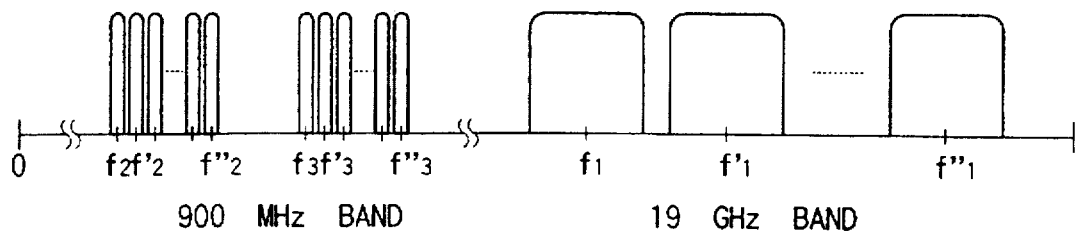
FIG. 22 is a drawing which shows the frequency placement in the sixteenth embodiment of the present invention.

Communication is performed between a radio base station 701, which is connected to a cable network, and a plurality of portable terminals 702. The relationship of the radio frequency placement and the transmission rate in this embodiment is shown in FIG. 22. The downlink performs communication at a transmission rate of R1 at a frequency of f1 in the 19GHz band. In this case, R1 is 50 Mbps. Another downlink is provided, this performing communication at a transmission rate of R2 (for example, 2 kbps) at a frequency of f3 in the 400-MHz band. The uplink performs communication at a transmission rate of R2 at a frequency of f2 in the 400-MHz band. The frequency placement, as shown in FIG. 10, is configured such that the frequency sequence is f1, f2, f3 for the terminal 1 and f1', f2', f3' for the terminal 2. If this type of frequency placement is used, it is possible to have uniformly spaced radio frequencies in the narrowband 400-MHz-band uplink and downlink, making it easy to establish synchronization of the terminal frequency. By placing the f1 in the 19-GHz band, a wideband downlink is established, and by placing the downlink and uplink in the 400-MHz band, the possibility of complete cutoff is reduced, thereby enabling stable control. Because the receiver for the downlink in the 400-MHz band can have a simple configuration, it can be implemented without much influence on the overall size of the terminal. By configuring the uplink with a low transmission rate on the low 400-MHz band, it is possible to provide a simple portable terminal.

Figure 23:
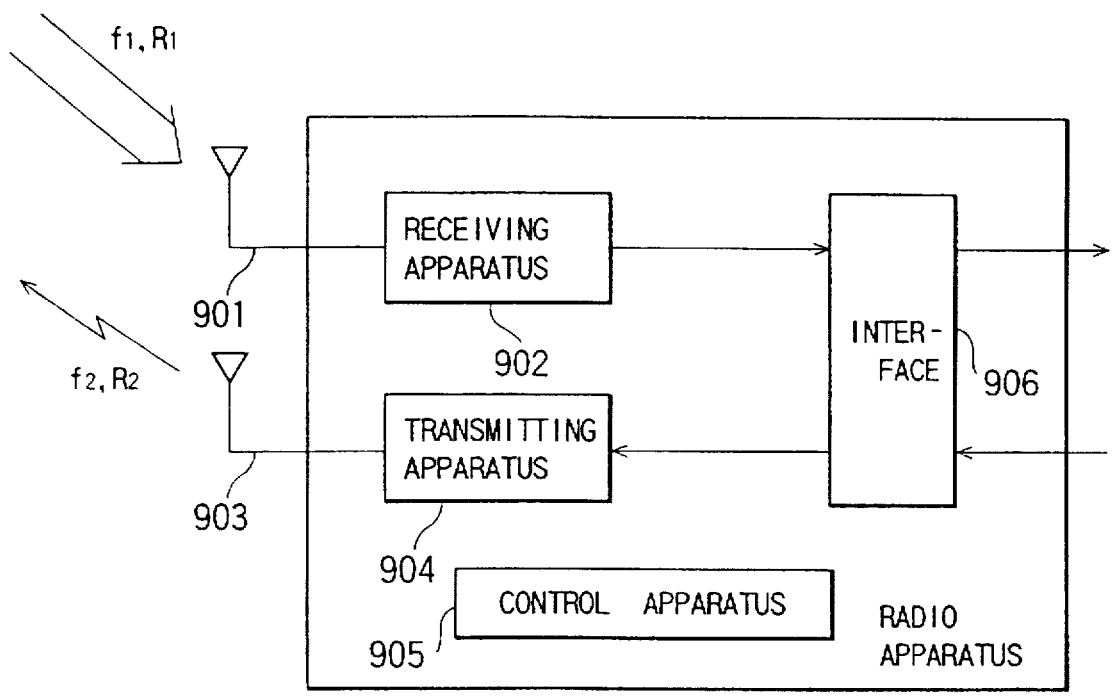
FIG. 23 is a block diagram which shows a radio apparatus according to the seventeenth embodiment of the present invention.

The seventeenth embodiment of the present invention is shown in FIG. 23. This relates to the radio section (radio apparatus) of a portable radio terminal applied to the radio communication system of the thirteenth and fifteenth embodiments of the present invention. The radio apparatus of the seventeenth embodiment is formed by an antenna 901 and receiver for the purpose of receiving a f1/R1 radio signal, an antenna 903 and transmitter for the purpose of transmitting a f2/R2 radio signal, an interface 906 between the receiver, the portable terminal and other parts, and a control apparatus 906. In this case, f1 is in a high-frequency band (for example, in the 60-GHz band), R1 is wideband (for example, 100 Mbps), f2 is in a low-frequency band (for example, 800-MHz band), and R2 is narrowband (for example, 30 kbps). Because the frequency bands and bandwidths differ between receiving and transmitting, independent antennas are used for receiving and transmitting. The receiver includes a frequency converting apparatus and demodulating apparatus for the purpose of converting the RF-band frequency radio signal to a digital signal. The transmitter includes a digital modulator and frequency converting apparatus to convert a digital signal to an RF (radio frequency). The control apparatus has functions which establish the timing of the transmitting and receiving with synchronized frequency and transmission rate.

By providing a portable terminal with a radio apparatus of this type of configuration, it is possible to configure a portable terminal which can be applied to the radio communication system of the thirteenth and fifteenth embodiments.

Figure 24:
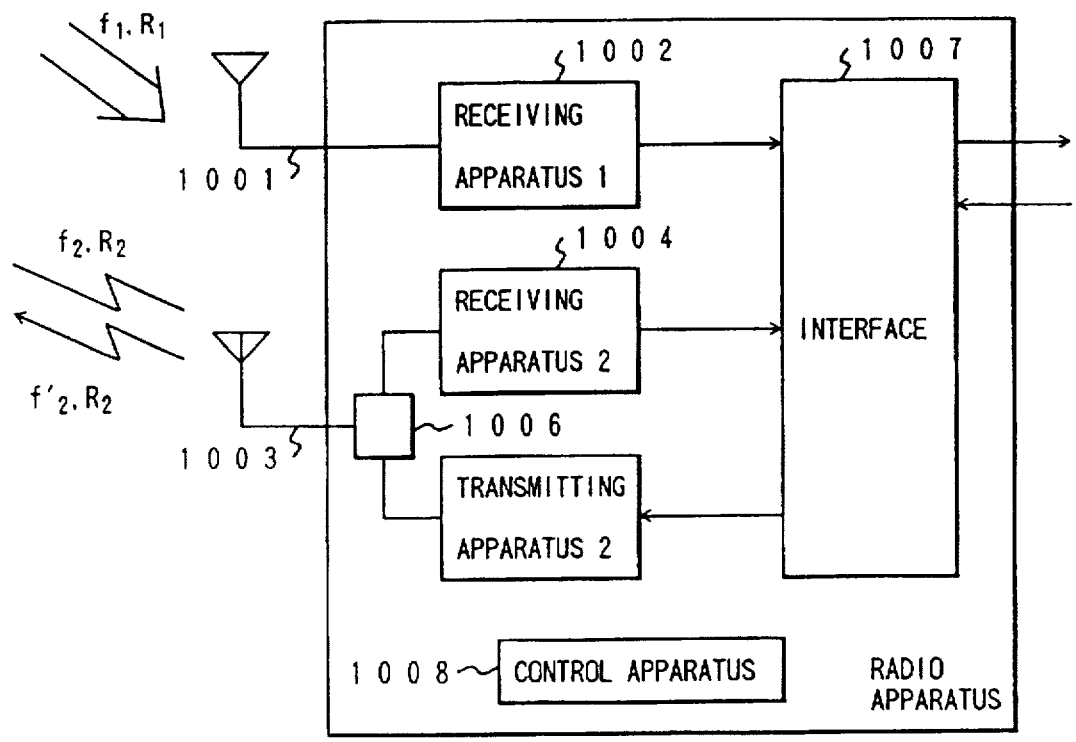
FIG. 24 is a block diagram which shows a radio apparatus according to the eighteenth embodiment of the present invention.

The eighteenth embodiment of the present invention is shown in FIG. 24. This embodiment is related to a radio section (radio apparatus) of a portable radio terminal which is applied to a radio communication system of the twelfth and fourteenth embodiments. The difference in this with respect to the fifteenth embodiment is a receiving apparatus 1004 which receives a narrowband (for example, 30 kbps) signal at a frequency of f2 in a low-frequency band (for example, in the 800-MHz band), and a transmitting/receiving sharer (duplexer) which includes both the f2 transmitting signal and the received signal in a single antenna. A 800-MHz-band transmitting apparatus 1005 and the receiving apparatus 1004 are inexpensive in comparison to a 60-GHz-band receiving apparatus, and facilitate a reduction in size. Also, because transmission is done at a low frequency and narrow bandwidth, the transmitting power can be made small. This enables the implementation of a portable radio terminal which has little influence on the human body.

By providing a portable terminal with a radio apparatus of this type of configuration, it is possible to configure a portable terminal which can be applied to the radio communication system of the twelfth and fourteenth embodiments.

Figure 25:
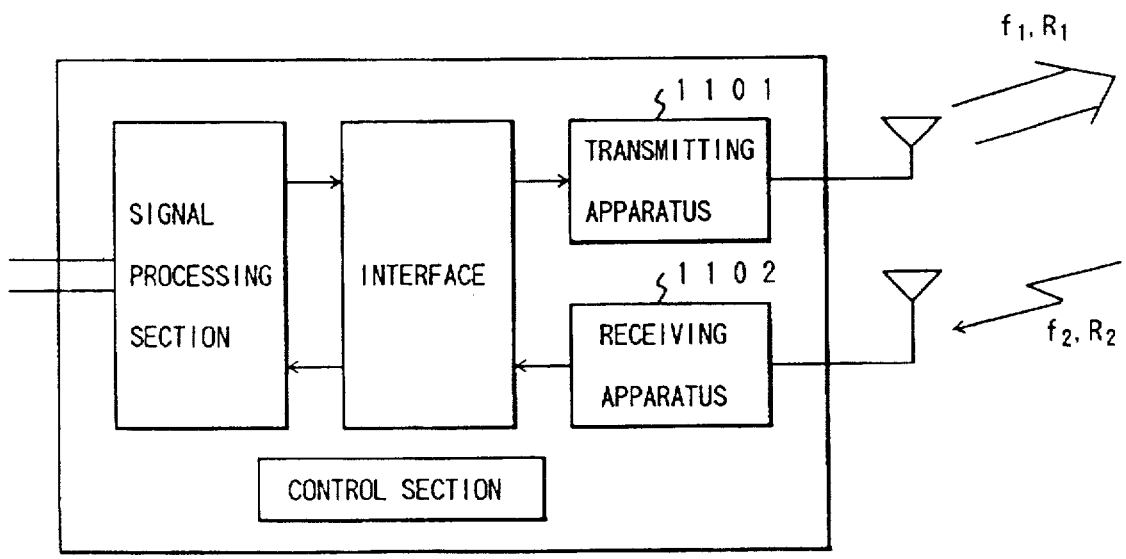
FIG. 25 is a block diagram which shows a base station radio apparatus according to the nineteenth embodiment of the present invention.
Figure 26:
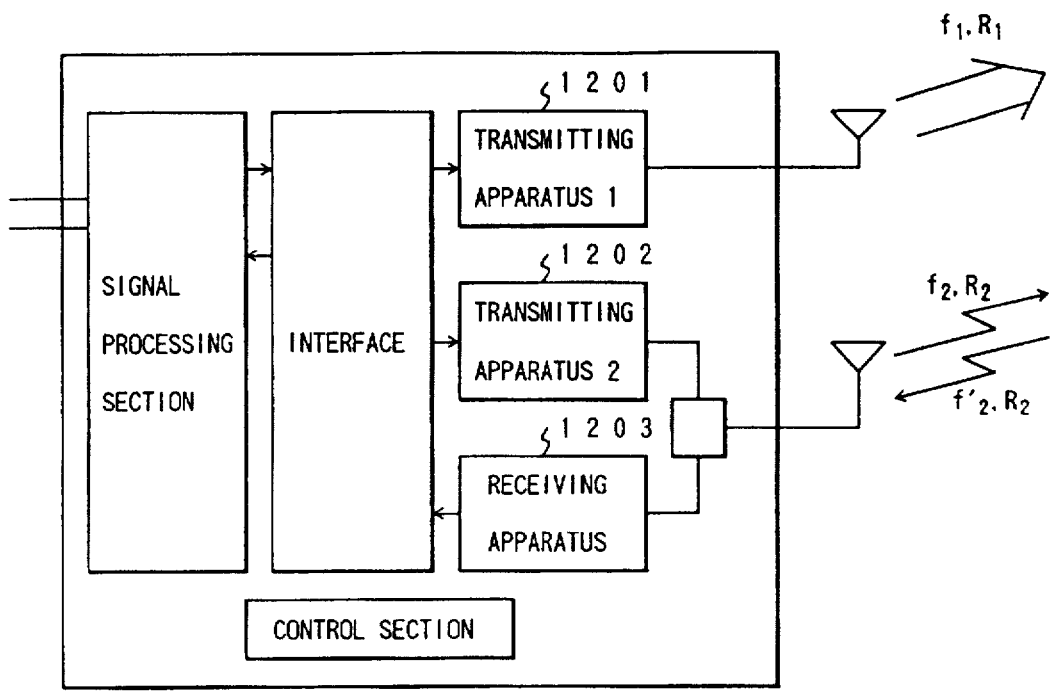
FIG. 26 is a block diagram which shows a base station radio apparatus according to the twentieth embodiment of the present invention.

The nineteenth embodiment of the present invention is shown in FIG. 25. This embodiment relates to a radio apparatus and radio base station which are applied to a radio communication system of the thirteenth and fifteenth embodiment. This embodiment will be described using the example of a radio base station. The base station has a transmitting apparatus 1101, which performs transmission at a transmission rate of R1 (for example, 100 Mbps) at a radio frequency of f1 in a millimeter band (for example, 60-GHz band), and a receiving apparatus which performs receiving of at a transmission rate of R2 which is lower than R2 (for example, 30 kbps) at a radio frequency of f2 in a low frequency band (for example, 800-MHz band). In addition, there is control section, and a signal processing section and interface section which perform connections to a cable network.

By providing a receiving apparatus and a transmitting apparatus which have different frequency bands and transmission rates, it is possible to configure a radio apparatus and a radio base station which can be applied to the radio communication system of the second embodiment and the fourth embodiment.

Figure 27:
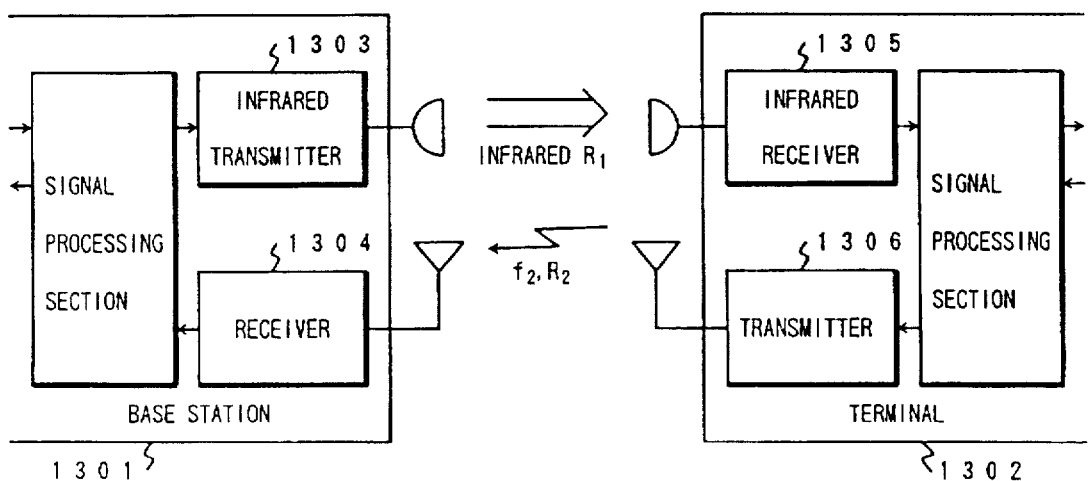
FIG. 27 is a block diagram which shows a radio communication system according to the twenty-first embodiment of the present invention.

The twenty-first embodiment of the present invention is shown in FIG. 27. The twenty-first embodiment is a radio communication system made up of a base station 1301 and a terminal 1302. The base station is formed by a transmitter 1303 which performs transmission by infrared rays at a transmission rate of R1, a receiver 1304 which performs receiving of at a transmission rate of R2 on a radio frequency of f2, and a signal processing section which performs control and performs interfacing with a cable network. The terminal is formed by an infrared receiver 1305, a radio transmitter 1306, and a signal processing section which performs interface with other parts and control. Transmission from the base station to a terminal (downlink) is performed using infrared at a transmission rate of R1. Transmission from a terminal to the base station (uplink) is performed using radio at a transmission rate of R1.

In the case in which the downlink is implemented as a radio circuit using radio waves, it is necessary to have a bandwidth which corresponds to the transmission rate. In the case in which high-speed transmission is performed, it is necessary to achieve a wide bandwidth, and it is necessary to develop a high frequency band that is yet unused, such as a millimeter band. However, in this embodiment, by using infrared waves on the downlink which requires a wide bandwidth, it is possible to configuration the system without a limitation imposed by radio frequency bandwidths. Additionally, millimeter-band devices are high in cost and physically large, whereas infrared devices are low-cost and physically small, enabling the implementation of a terminal and base station that are small and low-cost.

The twenty-second embodiment of the present invention is shown in FIG. 28. The base station radio apparatus 1401 is formed by a transmitting apparatus which performs transmission at a high transmission rate of R1 (100 Mbps) at a frequency f1 in a first radio frequency band (for example, 60 GHz) and a receiving apparatus which performs receiving of a signal at a transmission rate R2 (for example, 30 kbps) which is lower than R1 at a frequency f2 in a radio frequency band that is lower than f1 (for example 800 MHz). The radio apparatus of the terminal is formed by a receiving apparatus which performs receiving of a f1/R1 signal and a transmitting apparatus which performs transmission of an f2/R2 signal.

In this system, the f1/R1 signal and the f2/R2 signal have different modulation methods.

The frequency f1 is in a millimeter band, and R1 is approximately 100 Mbps. It is difficult to obtain a device which operates linearly over such a wide bandwidth in a millimeter band. Therefore, on the downlink it is desirable to use a non-linear modulation method. The radio propagation characteristics in a millimeter band are such that there is a large propagation loss, and because the distance being traveled by the radio waves is short, frequency usage can be effectively improved by means of zone design. Because millimeter waves provide a relative amount of spectrum bandwidth margin, the utilization efficiency on the frequency axis is not as severe as with previous microwaves. For this reason, a method of modulation is allowed which has a relatively wide bandwidth in comparison with the transmission rate. Because of both of these aspects FSK, which is a non-linear modulation system, having a modulation index of 0.5 or greater, thereby requiring some bandwidth, is a candidate.

On the other hand, because the frequency of the uplink is microwave (f2), and the transmission rate (R2) is several tens of kbps, it is easy to obtain low-cost, compact linear components, thereby eliminating problems of linearity. However, because the bandwidths allocated in this frequency band are small, it is necessary to make efficient use of the frequency axis. For this reason, a method of modulation having superior frequency utilization efficiency is desired. Although they are linear modulation, the π/4DQPSK and the QPSK modulation methods, which have superior frequency utilization efficiency, and GMSK, which has a slightly inferior efficiency are candidates.

From another viewpoint, on the high-speed downlink, because of the speed of the transmission rate, QAM, which enables the transmission of much information with a single symbol, is a candidate. On the uplink, the transmission rate is slow, but because the associated information is important control information and the like, BPSK and the like, which are more immune to errors than QAM (Quadrature Amplitude Modulation-4) are candidates.

As described above, in an SDL system, because the uplink and downlink transmission rates and transmission frequency bands differ, by selecting different modulation systems for each, it is possible to obtain a high-quality circuit on each.

The twenty-third embodiment of the present invention is shown in FIG. 29. The base station and terminal shown in this embodiment are those shown in FIG. 28. Transmission on the downlink from the base station 1501 to each terminal 1502 is done at a transmission rate of R1 (100 Mbps) at a frequency f1 in the 60-GHz band, using a modulation method 1 (code division multiplexing, CDM), and transmission on the uplink from each terminal to the base station is done at a transmission rate of R2 (8 kbps) at a frequency of f2 in the 800-MHz band, using a modulation method 2 (GMSK). By changing the transmission rates, transmitting frequency bands, and modulation methods of the uplink and downlink, it is possible to achieve a high-quality circuit on both, while enabling reduction in size and power consumption of the terminal.

Figure 30:
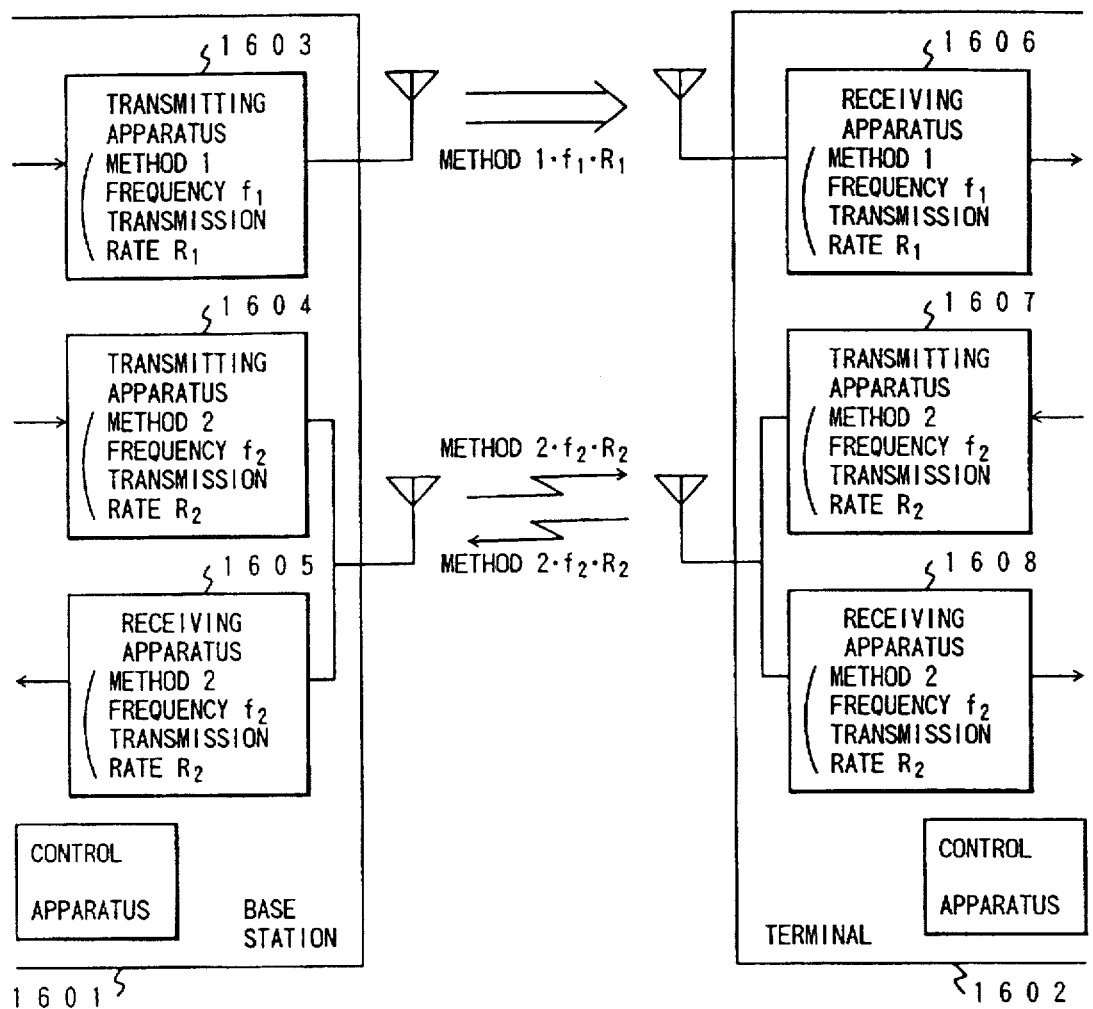
FIG. 30 is a block diagram which shows a radio communication system according to the twenty-fourth embodiment of the present invention.
Figure 31:
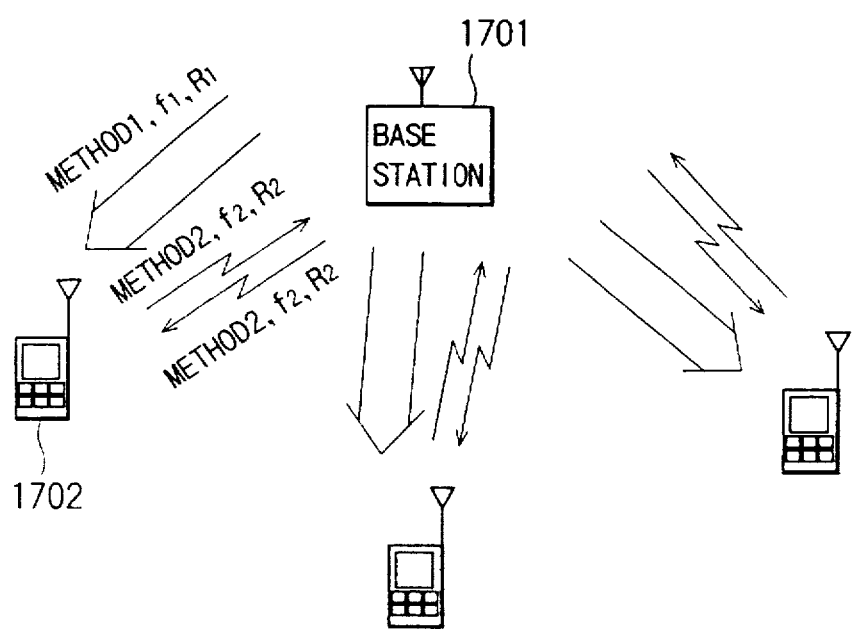
FIG. 31 is a block diagram which shows a radio communication system according to the twenty-fourth embodiment of the present invention.

The twenty-fourth embodiment of the present invention is shown in FIG. 30. The base station 1601 has a transmitting apparatus 1603 for transmission at a transmission rate of R1 at a radio frequency of f1 in a sub-millimeter band (19 GHz). The transmission rate R1 is not fixed, but can be varied in the transmission rate range of 1 Mbps to 15 Mbps. The modulation method 1 is 4-value FSK. At the terminal, in the same manner, a receiving apparatus 1606 is provided for receiving at a transmission rate of R1, using a modulation method 1, at a frequency of f1. On this wideband downlink, mainly transmission of data such as images, which requires a wide bandwidth, is performed. The base station and terminal have, separate from this downlink, a π/4DQPSK transceiver for a transmission rate of R2 (384 kbps) on a frequency of f2 (1.9 GHz). Because transmission on the frequency of f2 is don by time-division multiple access/time-division multiplexing (TDMA/TDD), transmission is done on the same frequency. FIG. 31 is a conceptual drawing of the system configuration which uses the base station and terminal of FIG. 30. The base station 1701 has a f1/R1, modulation method 1 downlink, and a modulation method 1, f2/R2 uplink and downlink. By using this type of configuration, it is possible to obtain a high-quality circuit on each, and further possible to configure a system that has few instantaneous dropouts caused by shadowing.

In this twenty-fourth embodiment, the f2 uplink and downlink use the same transmission rate of R2. Having an uplink with a transmission rate of R2 and a downlink with a transmission rate of R2' can also be envisioned. While the f2 uplink and downlink are mainly used for transmission of control information, in addition to simple control information the uplink also performs data transmission of re-transmitted control, in the case in which an error occurs in f1 downlink data, and uplink data transmission. Because downlink data transmission is performed on a high-speed downlink at f1, the f2 downlink only performs transmission of control data. Therefore, even on the f2 uplink and downlink, there occurs an symmetry in the amount of information. Radio communication systems of the past did not consider asymmetry of information, assigning the same bandwidth to the uplink and the downlink. On the f2 circuit, which mainly transmits control information, by considering an uplink and a downlink with differing transmission rates, it is possible to achieve a more efficient utilization of frequencies.

The twenty-fifth embodiment of the present invention will be described below, with reference made to the drawings.

First, the digital radio communication system related to the twenty-fifth embodiment of the present invention will be explained in accordance with FIG. 32.

There is a base station and a plurality of portable electronic apparatuses, an downlink circuit transmission of information from the base station to a portable electronic apparatus, and an uplink circuit for transmission information from a portable electronic apparatus to a base station. The downlink circuit and the uplink circuit can be, for example, an SDL-Net as shown in the first through the twelfth embodiments. With an SDL-Net, the area covered by a high-speed downlink circuit is made narrow, and the area covered by a low-speed uplink circuit is made wide. In addition, the signal transmission rate of the uplink circuit is made slower than the signal transmission rate of the downlink circuit, to give consideration to the reduction in size of the portable electronic apparatus.

FIG. 33 shows an example of the configuration of a portable electronic apparatus used in an SDL-Net. A digital signal transmitted from a portable electronic apparatus to a base station undergoes error-correcting encoding, and is waveshaped and modulated in a digital section, is converted to an analog signal by means of a D-A converter (DAC) and an interpolating filter (LPF), and is input to a mixer. At the mixer, the signal which is output from the DAC is multiplied by a signal which is output from a carrier signal generator (oscillation frequency f1), the output of the mixer undergoing suppression of images after the multiplication by means of a bandpass filer (BPF), and amplification by means of an RF amplifier, after which it is output by means of an antenna. The downlink signal transmitted from the base station is received by an antenna and bandlimited by means of a bandpass filter (BPF), after which it is amplified by an LNA (low-noise amplifier). The output of the LNA is input to a mixer, by which it is multiplied by a signal which is output from a carrier signal generator (oscillator frequency f2), thereby converting the frequency. The output of the mixer undergoes suppression of images after multiplication, by means of the LPF, after which an A-D converter (ADC) converts it to a digital signal. The ADC output (digital signal) is demodulated at the digital section.

In an SDL-Net, the uplink signal transmission rate and the downlink signal transmission rate differ (the downlink signal transmission rate having a high speed than that of the uplink). That is, the timing clocks for the uplink and the downlink differ. According to the present invention, a clock which is supplied to a digital section of the uplink is merely connected from the clock for the downlink via a 1/n frequency divider, enabling simplification of the circuit cf.

Figure 34:
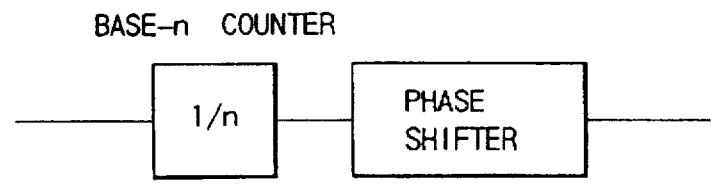
FIG. 34 is a drawing which shows the configuration of a frequency divider related to the twenty-fifth embodiment of the present invention.
Figure 35:
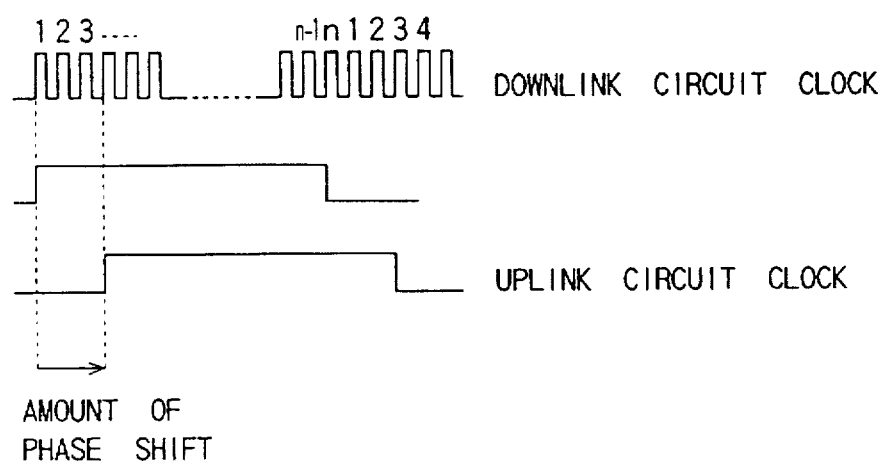
FIG. 35 is drawing which shows the configuration of a portable electronic apparatus used in a radio communication system related to the twenty-sixth embodiment of the present invention.

The frequency divider is, as shown in FIG. 34, made up of a base-n counter and a phase shifter. By means of this, the signal transmission rate of the uplink and the downlink differ, and in a system in which the uplink signal transmission rate is . . . than the downlink signal transmission rate, it is possible to use a common system clock generator, thereby enabling simplification of the circuit configuration. Also, by adopting the circuit configuration shown in FIG. 34, it is possible to generate the clock for the uplink circuit with an arbitrary phase. This operation will be described by means of FIG. 35. The downlink circuit clock is frequency divided by a base-n counter, and phase shifted by an arbitrary timing by the phase shifter. By adopting the above-noted configuration it is possible to synchronize the signals transmitted on the uplink an the downlink.

Next, a digital radio communication method related to the twenty-sixth embodiment will be described, using FIG. 36.

In the radio communication method related to the twenty-sixth embodiment there is a PHS circuit and a high-speed downlink circuit, the method being made up of a information service base station which is connected to a cable network, a PHS base station which is connected to the above-noted information service base station, and a high-speed downlink circuit base station. Signal transmission from the information service base station to a portable electronic apparatus is performed by either the PHS circuit or a high-speed downlink. Signal transmission from the portable electronic apparatus to the information service base station is performed by means of the PHS circuit.

Figure 36:
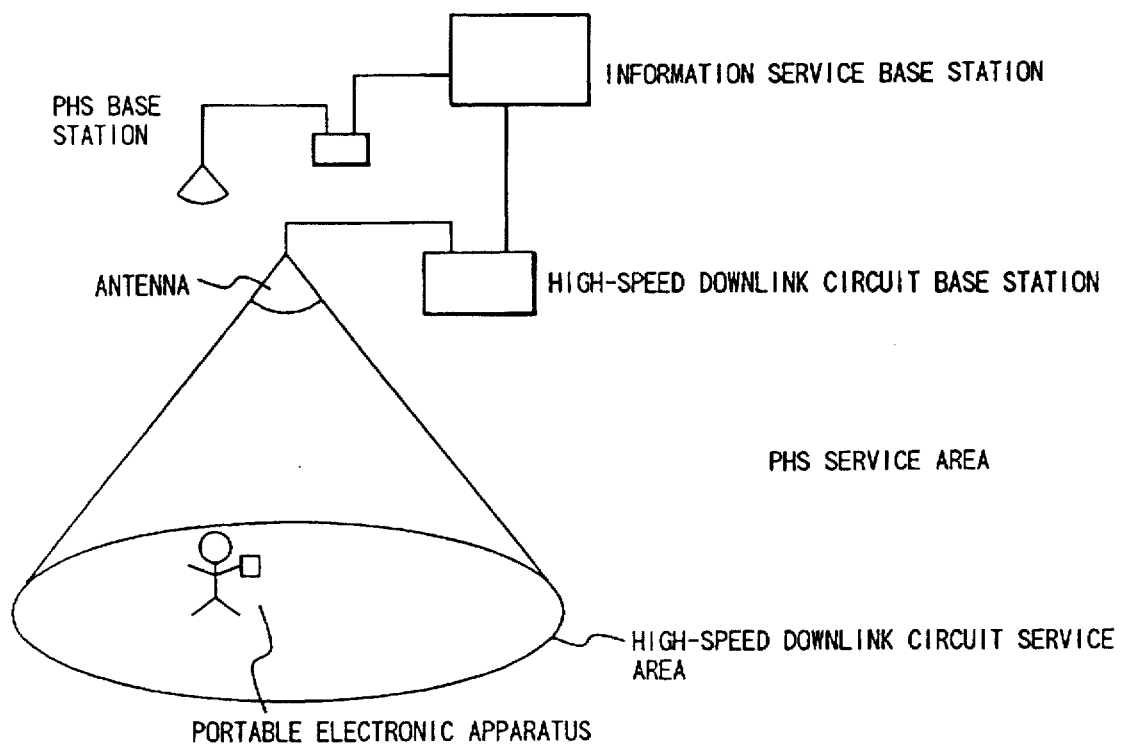
FIG. 36 is a drawing which shows the service area of a radio communication system related to the twenty-sixth embodiment of the present invention.
Figure 37:
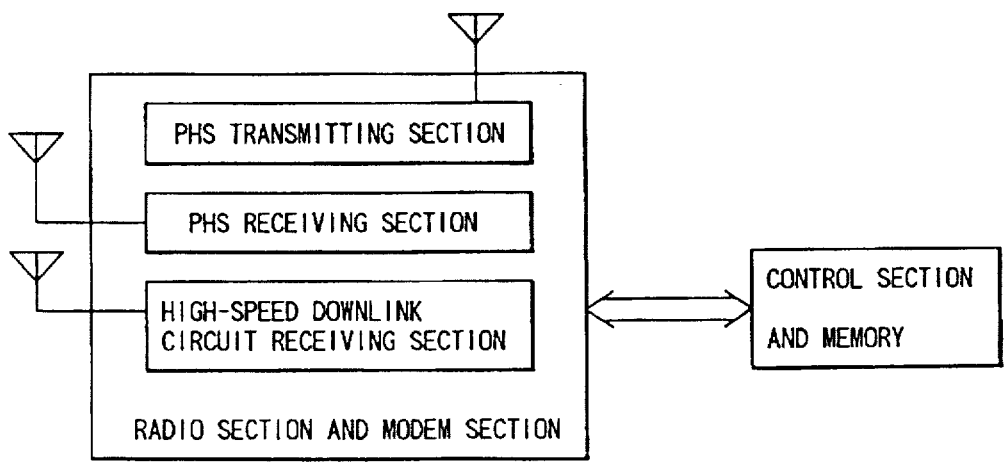
FIG. 37 is a drawing which shows the configuration of a receiver for the purpose of forming a timing generation circuit.

FIG. 37 shows the configuration of the radio section and the modem section of the portable electronic apparatus which is used in the radio communication system of FIG. 36. Because of one type of uplink circuit and two types of downlink circuits, each of the transmitting sections and receiving sections are housed together. A received radio signal is demodulated by the radio section and modem section, and sent to the control section and memory section. A digital signal output from the control section and the memory section is sent to the radio section and the modem section and transmitted as a radio signal.

Figure 38:
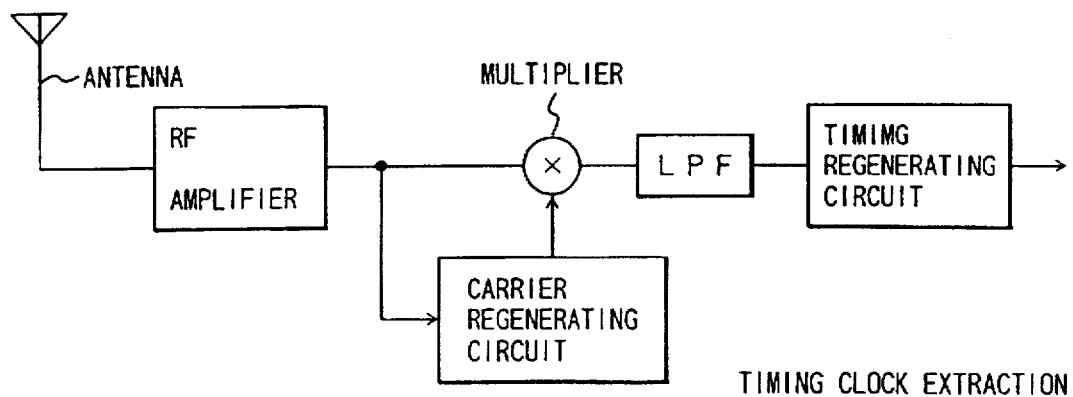
FIG. 38 is a drawing which shows the configuration of a receiver for the purpose of forming a timing clock generating circuit related to the twenty-sixth embodiment of the present invention.
Figure 39:
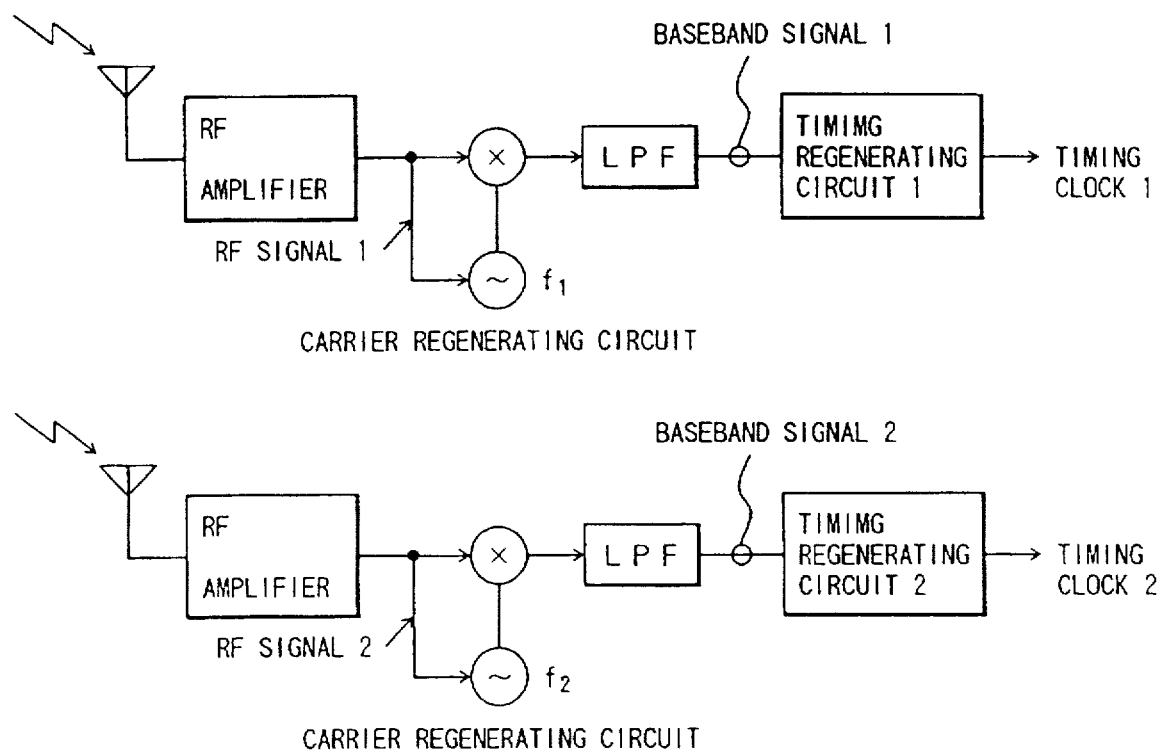
FIG. 39 is a drawing which shows the input and output signals of the carrier generating circuit and timing circuit related to the twenty-seventh embodiment of the present invention.

When a radio signal is demodulated, the carrier and timing clock must be regenerated from the received signal. FIG. 38 shows the configuration of the receiver when performing regeneration the carrier and the timing clock. The radio signal received by the antenna is amplified by the RF amplifier (the RF amplifier output being hereinafter referred to as the RF signal). At the carrier regeneration circuit, the reference carrier is regenerated from the RF signal. The regenerated reference carrier is input to a multiplier. Simultaneously with this, the RF signal is input to a mixer, by which its frequency is converted. The multiplier output is input to a lowpass filter (LPF) for the purpose of eliminating image signals caused by the frequency conversion (the output of the LPF being hereinafter referred to as the baseband signal). At the timing regeneration circuit, the timing clock is regenerated from the baseband signal. Therefore, in a portable electronic apparatus used in the radio communication system shown in FIG. 36, because radio signals are received at two different signal transmission rates, two timing regeneration circuits such as shown in FIG. 38 are required (FIG. 39). That is, it is necessary to have a timing regeneration circuit 1 to regenerate the timing clock from the baseband signal 1, and a timing regeneration circuit 2 to regenerate the timing clock from the baseband signal 2.

According to the present invention, it is possible to replace the slower speed of the two timing regeneration circuits with the divider and phase shifter shown in FIG. 34, thereby simplifying the circuit cf. In addition, it is possible to synchronize the transmission timing of the high-speed downlink circuit and the PHS circuit.

In the twenty-sixth embodiment, although PHS was given as the example given of a radio communication system in which the signal transmission rates were equal, this can also be a different kind of radio communication system, such as an automobile telephone.

Next, a digital radio communication method related to the twenty-seventh embodiment will be described.

With the configuration of the portable electronic apparatus shown in FIG. 39, it is necessary to have two types of carrier regeneration circuits and clock regeneration circuits. This is shown in a simple manner in FIG. 40. The RF signal 1 and the RF signal 2, the baseband signal 1, and the baseband signal 2 are each used to perform regeneration of carriers and timing. As shown in FIG. 33, according to the present invention, it is possible to replace the other clock generating circuit by a frequency divider and a phase shifter, thereby enabling simplification of the circuit cf. In addition, the present invention can be applied no only to the clock regeneration circuit, but to the carrier regeneration circuit as well. FIG. 41 shows an example of the present invention applied to a carrier regeneration circuit.

The reference signal generating circuit shown in FIG. 41 generates and outputs carriers and timing clocks with respect to the RF signal 1 and RF signal 2, and the baseband signal 1 and the baseband signal 2 which are input to it.

At the carrier regeneration circuit or the timing clock regeneration circuit, by extracting the carrier component or the clock component from the input signal by means of a highly selective (high Q) circuit, such as a PLL, it is possible to regenerate the carrier or the timing clock. That is, by eliminating from the input signal the error component, using a filter, regeneration is made of either the carrier or the timing clock.

Figure 42:
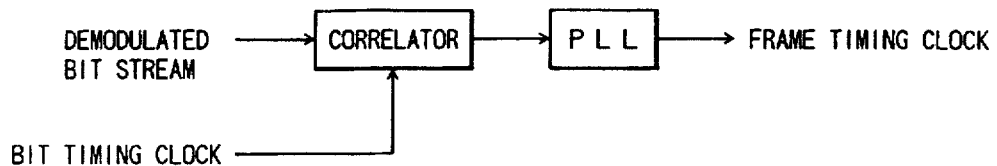
FIG. 42 is a block diagram which shows the configuration of the frame timing clock generating circuit related to the twenty-eighth embodiment of the present invention.

While in the carrier regeneration circuit or clock regeneration circuit shown in FIG. 41, regeneration of the carrier or of the timing clock is performed from a signal of each, with the reference signal regenerating circuit shown in FIG. 42, because it is possible to perform regeneration of the carrier or timing clock from a plurality of input signals, it is possible to obtain a plurality of error information. For this reason, the regenerated carrier or timing clock frequency accuracy can be improved.

Figure 43:
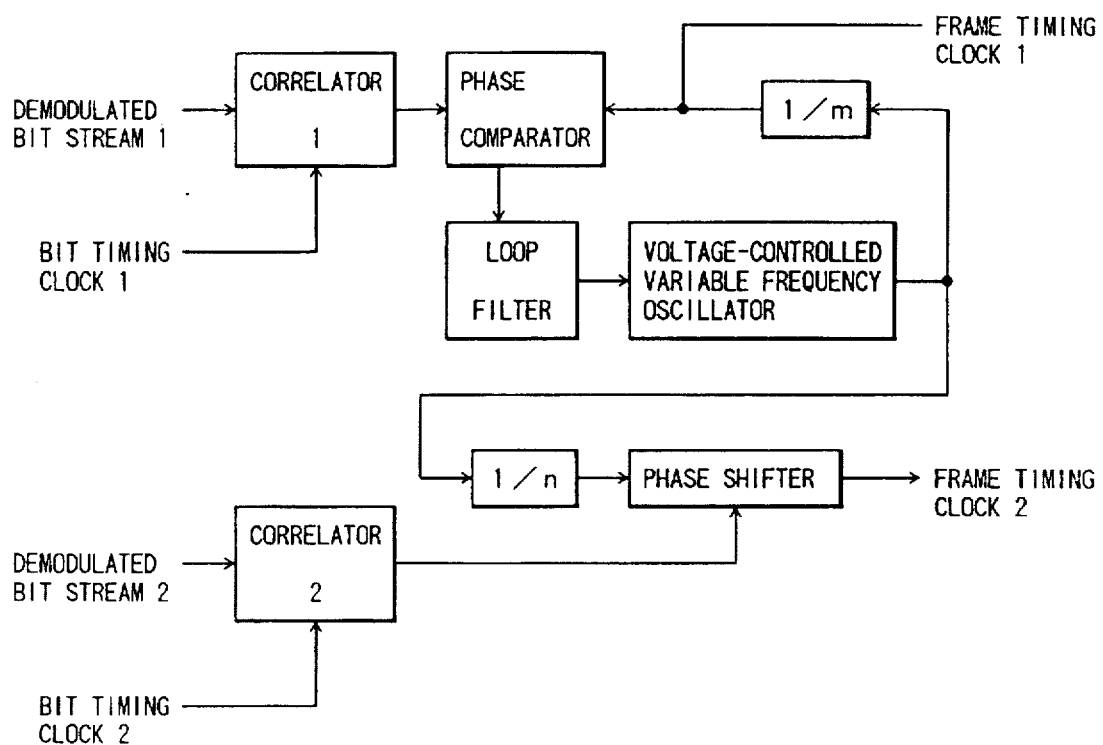
FIG. 43 is a drawing which shows the configuration of a clock generating circuit.

Next, a digital radio communication method related to the twenty-eight embodiment will be described. In the radio communication method shown in FIG. 32 or FIG. 36, when transmitting information from the base station to a portable electronic apparatus or from a portable electronic apparatus to a base station, transmission is done in units of frames, a frame being made up of a plurality of continuous bits. By treating the transmitted signal in units of frames, it is possible to easily apply error correction or ARQ. FIG. 43 shows a block diagram of a frame timing detecting circuit which performs frame timing clock regeneration from a demodulated bit data stream. Let us assume a receiver configuration as shown in FIG. 44. A digital bit stream which was demodulated by the above-noted digital section is input to a correlator along with the a bit timing clock. The correlator is formed from cascaded D-type flip-flops (a shift register) and a comparator. The comparator has input to it the output of the shift register, which is delayed by the bit timing clock, and a known signal which is inserted beforehand for the purpose of frame detection. The correlator output is input to a PLL, and the frame timing clock is generated. In a radio communication method in which there are two or more communication systems having differing signal transmission rates and frame timings, two or more frame timing detecting circuits as shown in FIG. 42 are required.

According to the present invention as described above, it is possible to replace a signal source with a frequency divider and phase shifter. Therefore, it is possible to have a single PLL replace two or more types of frame synchronization circuits, thereby enabling simplification of the circuit cf. It is possible to implement a frame timing detecting circuit with a frequency divider and a phase shifter. FIG. 43 shows an example of a frame timing detecting circuit implemented with a frequency divider and a phase shifter.

The demodulated bit stream 1 and the bit timing clock 1 are input to a correlator 1, and the trigger signal of the frame timing is detected. The output of the correlator 1 is input to a phase-locked loop which is formed by a phase comparator, a loop filter, a voltage-controlled oscillator, and a base-m counter. One output of the voltage-controlled oscillator is input to the frequency divider shown in FIG. 34. The amount phase shift of the phase shifter is controlled by the output of the correlator 2.

In addition, because the frame timing can be generated by frequency dividing the bit timing clock, it is possible to have a common circuit serve as the bit timing clock regeneration circuit and the frame timing regeneration circuit. FIG. 44 shows a clock signal generating circuit. The error signal is detected from a plurality of inputs such as a clock signal (number of inputs i) and the voltage-controlled oscillator is controlled, it being possible to derive the desired clock (output signal k) by means of base-nk counter and a phase shifter. By using the above-noted configuration, it is possible to simplify the circuit cf.

Figure 45:
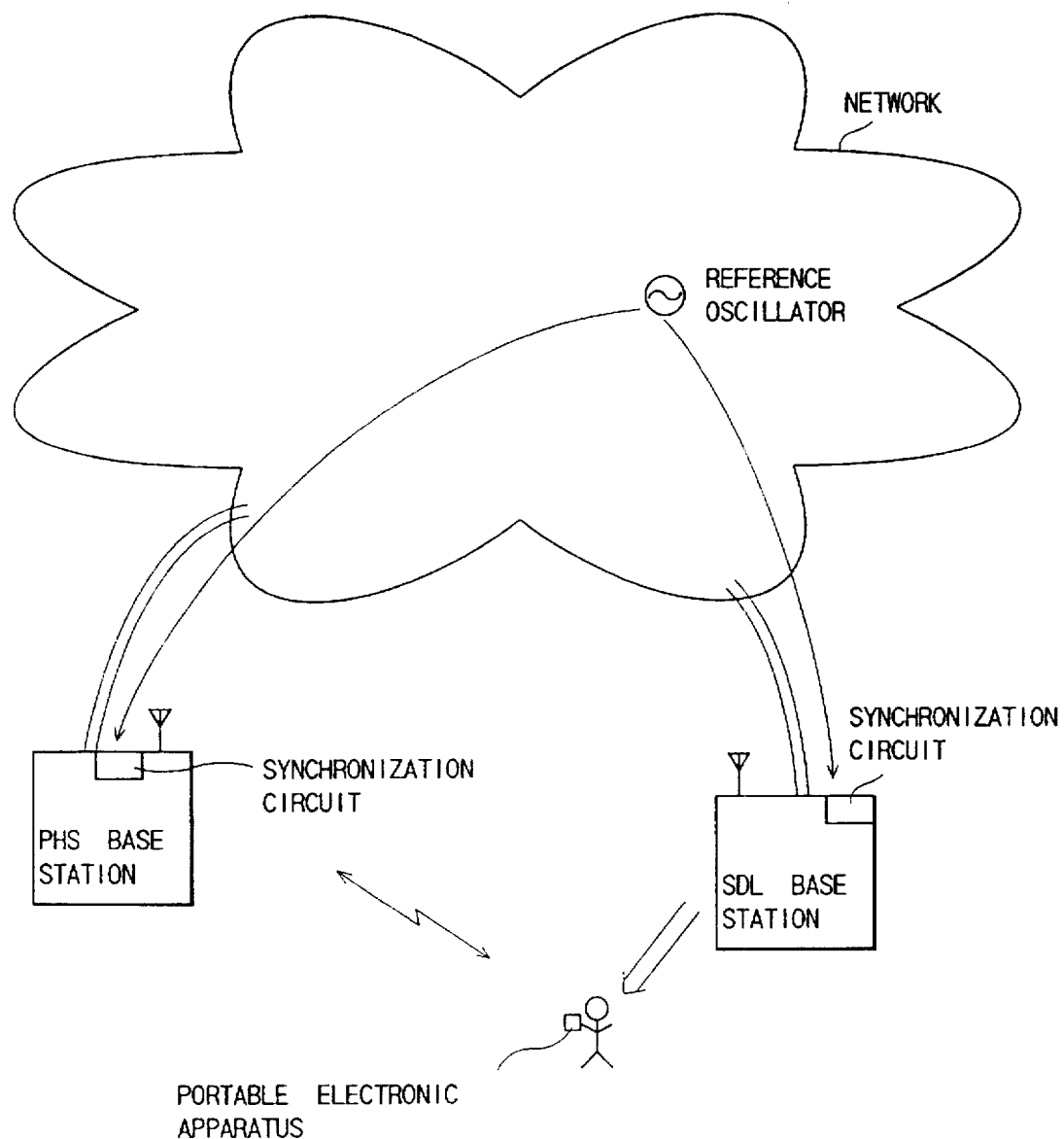
FIG. 45 is a drawing which shows the system configuration related to the thirtieth embodiment of the present invention.

Next, a radio communication system related to the twenty-ninth embodiment will be described in accordance with FIG. 45. FIG. 45 shows the configuration, which is made up of a PHS base station and cable network, and an SDL-Net. The SDL-Net has a downlink which has a high speed compared to the PHS, this being mainly used for data transmission. In the PHS circuit, position recording is performed.

As described above, in a system in which two or more different types of transmission system exist, it is possible to simplify the circuit configuration by replacing one of the clock regeneration circuits by a frequency divider and phase shifter. However, in doing this, it is necessary to have the clocks of the differing transmission methods synchronized. FIG. 45 shows a method of synchronizing, via the network, a PHS circuit and an SDL-Net circuit. The network side has a reference signal generator. At the PHS base station a signal which is synchronized to a reference signal on the network side is generated by a synchronizing circuit. When performing communication between with a portable electronic apparatus, the signal is transmitted based on this reference signal. At the SDL-Net base station, in the same manner, a signal which is synchronized to a reference signal on the network side is generated by a synchronizing circuit, information being transmitted to a portable electronic apparatus based on this reference signal. The synchronizing circuit is formed by a clock generating circuit such as a PLL and, as described above, this can be implemented by a frequency divider and a phase shifter.

Figure 46:
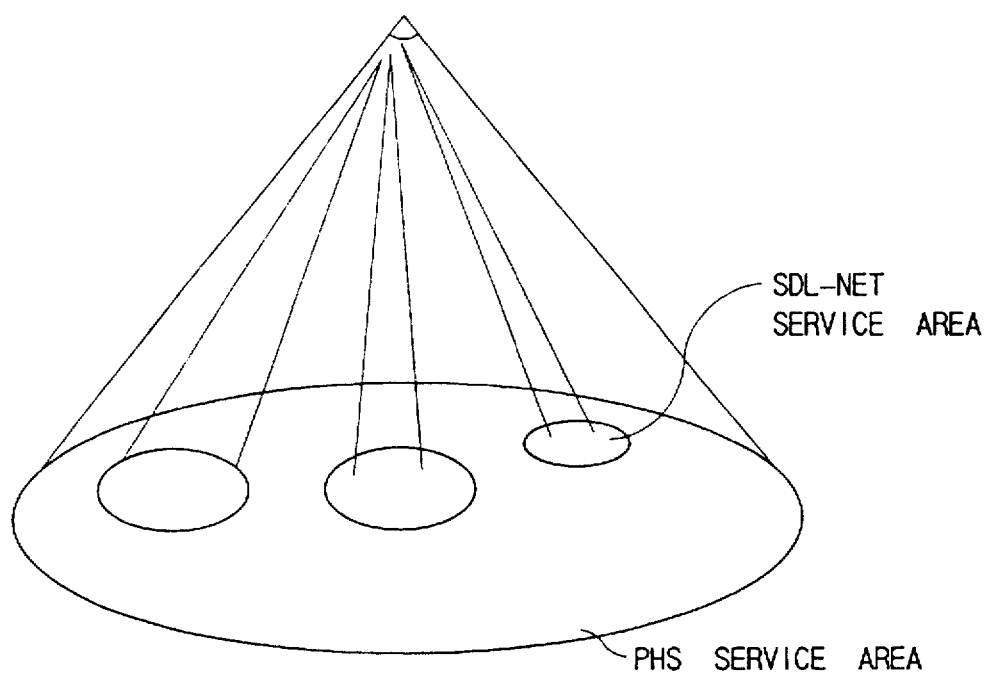
FIG. 46 is a drawing which shows the configuration of a clock synchronization system related to the thirtieth embodiment of the present invention.

Next, a radio communication system related to the thirtieth embodiment of the invention will be described. As in the case of the above-described FIG. 45, in a system made up of a PHS base station, a cable network, and an SDL-Net base station, the case in which the service areas of the PHS and the SDL-Net is assumed. That is, as shown in FIG. 46, the SDL-Net services areas are included within the PHS service area. The existence of a plurality of SDL-Net service area is envisioned.

In the above-described SDL system, there are systems existing which have a narrowband uplink radio channel and a wideband downlink radio channel, and systems which have a narrowband radio channel for both uplink and downlink. Because the system for which the present invention is intended is the latter type of system, hereinafter the term SDL system shall be used to refer to this latter type of system. In an SDL system, to achieve a high transmission rate on the downlink radio channel, a high frequency is used at the wideband radio base station, but because attenuator at high frequencies is high, it is difficult to achieve a wide service area. Also, because the wider the bandwidth is made, the more the transmission distortion increases and the greater is the influence of noise, a wideband radio base station service area is narrower than a narrowband radio base station service area. For this reason, the areas of a wideband radio base station service and a narrowband radio base station service area have different makeups. Therefore, in an SDL system, accompanying the movement of a mobile radio station, with the same connectable narrowband base station, there are cases in which the connectable wideband base station will change, so that a mobile radio station must be aware of both the connectable narrowband base station and the connectable wideband base station. With regard to the method of recognizing in the service area of what narrowband base station a mobile radio station is located, because both up and down radio channels are provided between a narrowband base station and the mobile radio station, it is possible to use the same protocol as has been used in previous portable telephone services. The protocol that is used in a portable telephone service consists of notification by the radio base station, via the downlink channel, of itself by means of an identifying signal, this signal being received by the mobile station, which sends to that base station an identifying signal which indicates its identity, via the uplink channel. By doing this, the mobile radio station can determine in the service area of what radio base station it is located. With regard to the method of recognizing in the service area of what wideband base station a mobile radio station is located, the above description did not provide an explicit method. Therefore, in a system for which the present invention is intended, there was no method with regard to recognizing in the service area of what wideband base station a mobile radio station is located. As a result of there being no method in existence for recognizing in the service area of what wideband base station a mobile radio station is located, this being essential to starting the provision of communication service, in a system which included as a constituent element a mobile radio station not having a wideband uplink radio channel, it was not possible to start communication. In addition, even when in the condition of providing service, it was not possible to maintain service when the mobile radio station moves into the service area of a different radio base station, that is, handover was not possible.

Figure 47:
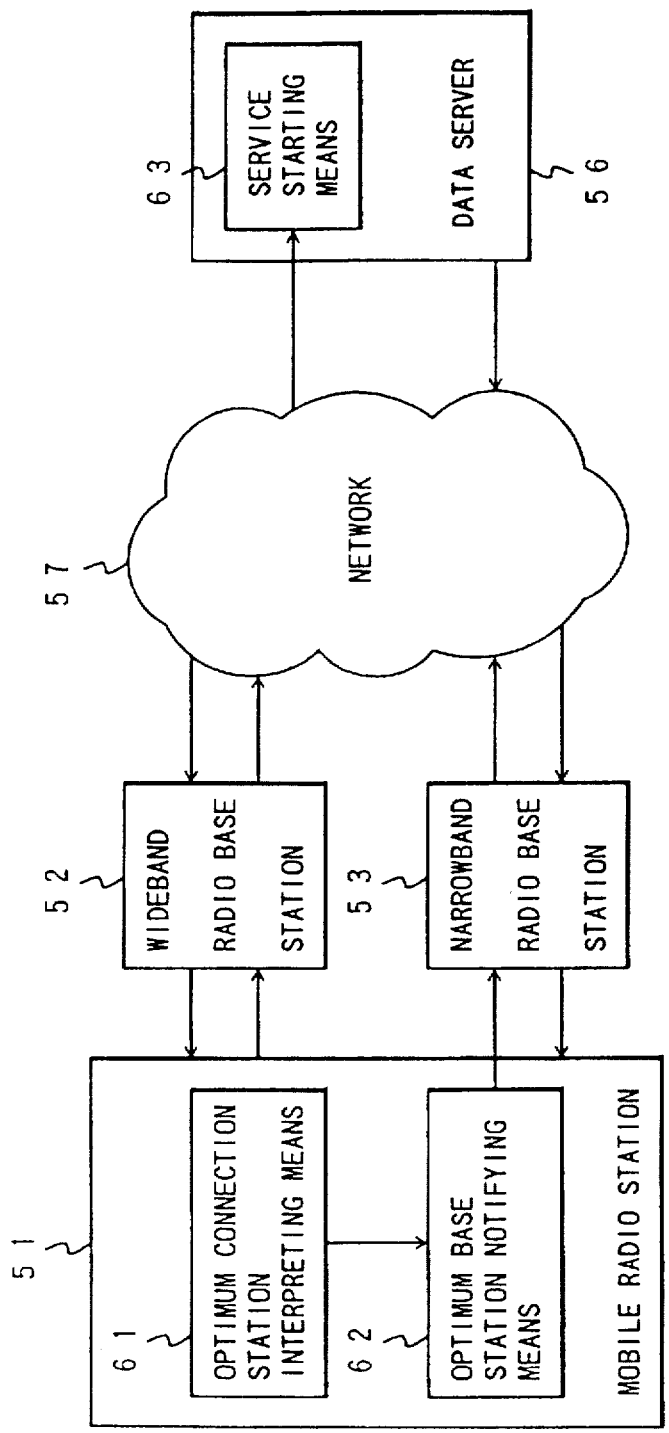
FIG. 47 is a block diagram which shows the overall concept of a radio communication system related to the thirty-first through thirty-ninth embodiments of the present invention.

In a radio communication system related to the thirty-first through the thirty-ninth embodiment, as shown in the conceptual drawing of FIG. 47 the above-noted mobile radio station 51 has an optimum connection station interpreting means 61 which receives a signal for the purpose of identifying the above-noted wideband radio base station 52, notification of which is made from the above-noted wideband radio base station 52 via a radio circuit, and which interprets from this signal the wideband radio base station that is suitable for connection, an optimum base station notification means 62, which gives notification to the above-noted server 56 of an above-noted specific wideband radio base station 52 that is suitable for connection to an above-noted mobile radio station, via the above-noted narrowband radio base station 53, and a service starting means 63, which starts the above-noted prescribed service via the above-noted specific wideband radio base station 52 which is judged to be suitable for connection with respect to the above-noted mobile radio station.

In the case in which handover must be performed, in addition to the above-noted means, a radio communication system related to the thirty-first through the thirty-ninth embodiment of the present invention has a means which, when the above-noted mobile radio station receives the above-noted service via an above-noted specific wideband radio base station, receives a signal for the purpose of identifying the above-noted wideband radio base station, notification of which is given via a radio circuit from a wideband radio base station which is different from the above-noted specific wideband radio base station, and which interprets from this received signal to which wideband radio base station should switching be made, a means by which the above-noted mobile radio station notifies the above-noted server via the above-noted narrowband radio base station of a wideband radio base station which is suitable as a switching destination, and a means by which the above-noted server switches a connection with respect to the above-noted mobile radio station, that connection is made via the above-noted specified wideband radio base station, which is judged to be suitable as a switching destination for connection, thereby providing the above-noted prescribed service.

By virtue of adopting the above-noted constitution, a mobile radio station that receives a signal for the purpose of identifying a wideband radio base station, notification of which is given from a wideband radio base station, can, by interpreting the received signal, determine a wideband radio base station which is suitable for connection. The mobile radio station uses the uplink radio channel from the mobile radio circuit to the narrowband radio base station to tell the narrowband radio base station to what wideband radio base station it is connected. Because the narrowband radio base station and server are connected via the network, it is possible the narrowband radio base station can notify the server, via the network, as to what wideband radio base station the mobile radio station is connected. By doing this, even if there is no uplink radio channel from the mobile radio station to the wideband radio base station, it is possible for the mobile radio station to have the server recognize to what wideband radio base station connection is suitable, and the server is able to start the provision of service to the mobile radio station via the wideband radio base station that is judged suitable for connection.

In the condition of providing the prescribed service via one of the wideband radio base stations, with regard to maintaining the service in the case in which the mobile radio station moves to the service area of a different wideband radio base station, according to the present invention, a signal for the purpose of identifying a wideband radio base station, notification of which is given via a radio circuit from a wideband radio base station, and interpreting that received signal, a judgment is made as to what wideband radio base station suitable for connection switching should be made. The mobile radio station notifies the server via the narrowband radio base station of to what wideband radio base station suitable for connection switching should be made. By doing this, because it is possible to cause the server to recognize to what wideband radio base station suitable for connection switching should be made, it is possible for the server to continuing providing service by switching via the wideband radio base station which was judged to be suitable for connection.

Figure 48:
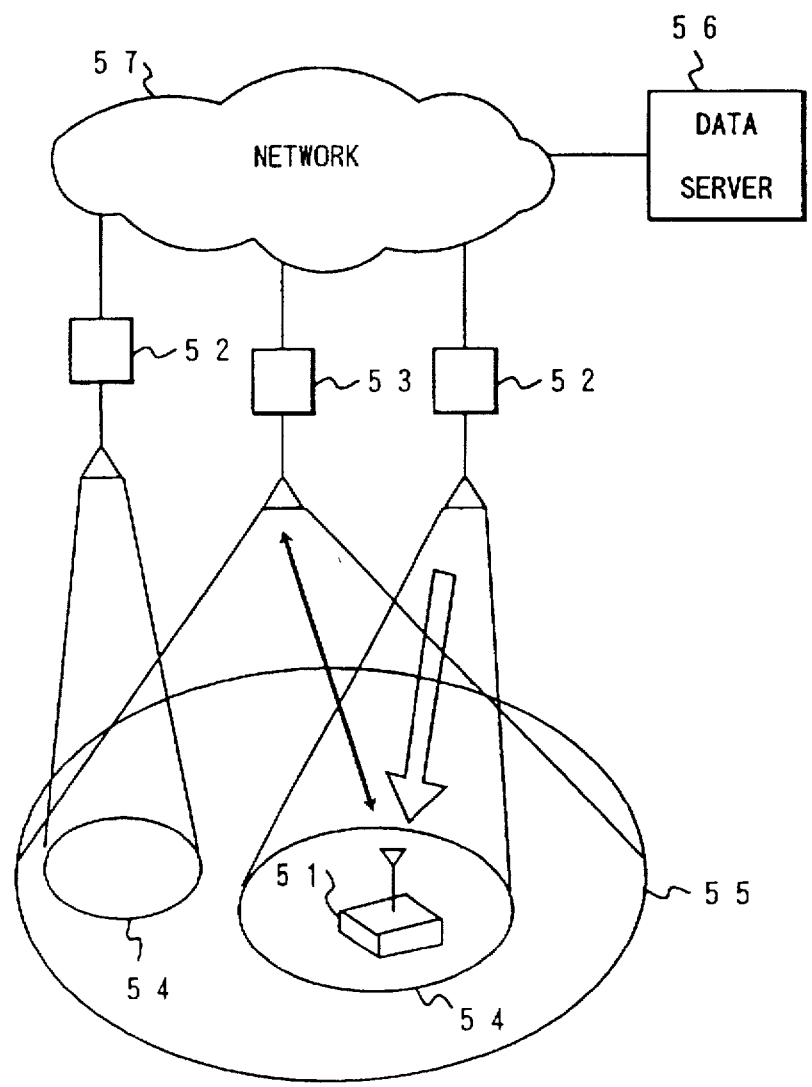
FIG. 48 is a drawing which shows the overall configuration of a radio communication system related to the thirty-first through thirty-ninth embodiments of the present invention.

First, a radio communication system for which the thirty-first through the thirty-ninth embodiments were intended will be described. FIG. 48 is a conceptual drawing which shows the configuration of a system related to the present invention. In FIG. 48, the numeral 51 denotes a mobile radio station, 52 and 53 are radio base stations, 56 is a server, and 57 is a network. The radio base station 52 (this hereinafter being referred to as the wideband radio base station 52) has a transmitting means for the purpose of wideband information transmission. With respect to this, the radio base station 53 (hereinafter referred to as the narrowband radio base station 53) has a transmitting/receiving means for the purpose of narrowband information transmission. The mobile radio station 51 is a terminal which performs information transmission with the wideband radio base station 52 or the narrowband radio base station 53. The radio channel between the wideband radio base station 52 and the mobile radio station 51 is called the wideband radio channel, and the radio channel between the narrowband radio base station 53 and the mobile radio station 51 is called the narrowband radio channel.

Figure 49:
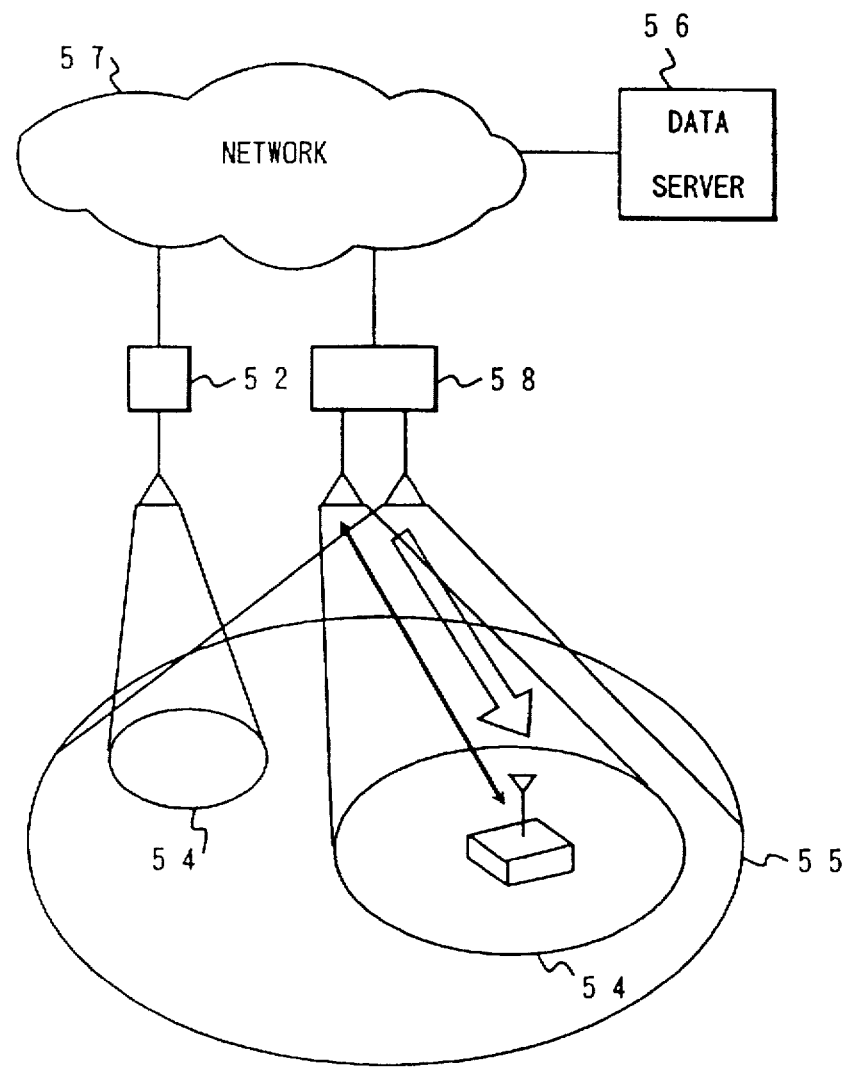
FIG. 49 is drawing which shows the overall configuration of a different radio communication system related to the thirty-first through thirty-ninth embodiments of the present invention.

While in FIG. 48, as a convenience, a distinction is made between the wideband radio base station 52 and the narrowband radio base station 53, as shown in FIG. 49, it is also acceptable for a single radio base station 58 to have both a transceiving means for the purpose of narrowband information transmission and a transmission means for the purpose of wideband information transmission. In this case, although the cost of the relay base station 58 becomes high, the total number of radio base stations in the system is reduced. If there is a need to perform control between the transceiving means for the purpose of narrowband information transmission and the transmitting means for the purpose of wideband information transmission, this control is made easy. What follows is a description, using FIG. 48, of the thirty-first through thirty-ninth embodiments of the present invention which, in which the wideband relay base station 52 and the narrowband relay base station 53 are separate radio base stations.

Figures 50A, 50B:
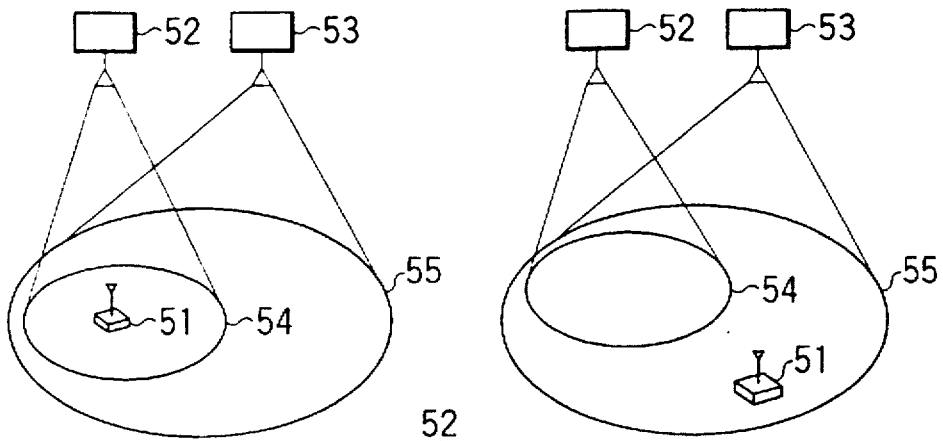
FIGS. 50A–50E are drawings which show the movement of a mobile radio stations in radio communication system related to the thirty-first through the thirty-sixth embodiments of the present invention.
Figure 52:
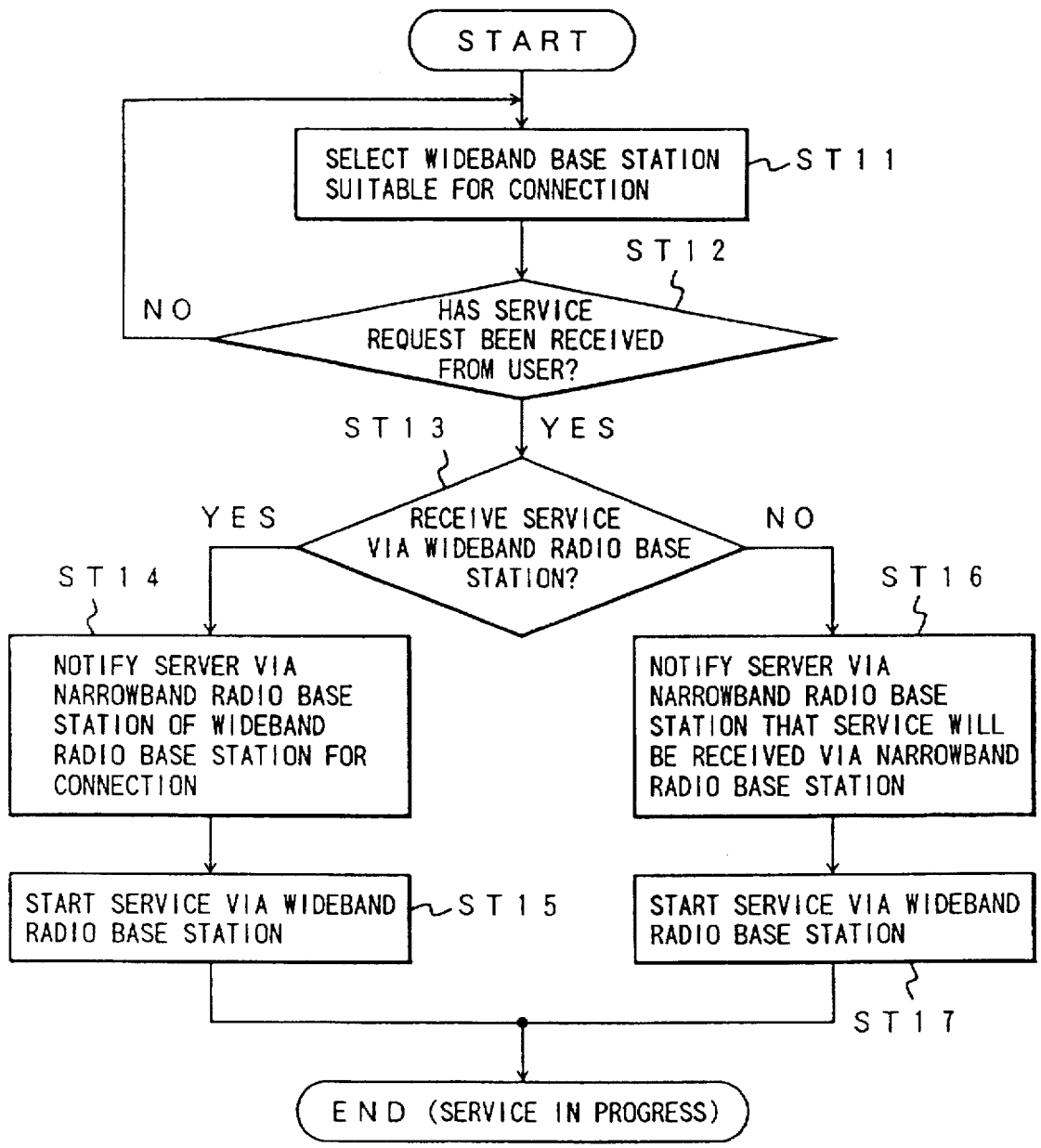
FIG. 52 is a flowchart which shows the processing steps of starting service in a radio communication system related to the thirty-first embodiment of the present invention.

The thirty-first embodiment: The procedure for starting communication will be described for the thirty-first embodiment for the case in which the mobile radio station 51 is in the area shown in FIG. 50A, that is, the case in which the mobile radio station 51 can connect to the wideband radio base station 52. FIG. 51 is the most basic flowchart related to the thirty-first embodiment. At step ST1, the mobile radio station 51 interprets in what wideband relay base station 52's service area it is located. At step ST2, the information interpreted at step ST1 is passed to the server 56 via the narrowband relay base station 53. By doing this, the server 56 can recognize in which wideband relay base station 52's service area the mobile radio station 51 is located. At step ST3, service is started to be provided with respect to the mobile radio station 51, via the wideband relay base station 52 which was interpreted at step ST1. In actuality, when service is started to be provided, a variety of procedures can be envisioned, based on the above-described basic flowchart. FIG. 52 is one example. At step ST11, the mobile radio station 51 interprets in what wideband relay base station 52's service area it is located. At step ST12, a judgment is made as to whether a user has made a service request. In the case in which there is a service request from a user, flow proceeds to step ST13, but if there is no request, step ST11 is repeated. At step ST13, selection is made as to whether the wideband downlink radio channel is to be used to receive service. If the wideband downlink radio channel is to be used to receive service, flow proceeds to step ST14, but if not, flow proceeds to step ST16. At step ST14, the information interpreted at step ST11 is passed to the server 56 via the narrowband relay base station 53. At step ST15, the provision of service to the mobile radio station 51 is started, via the wideband relay base station interpreted at step ST11. If, however, at step ST13 the selection was not to use the wideband downlink radio channel to receive service, that is, if the selection was made to use the narrowband downlink radio channel to receive service, at step ST16 the fact that the mobile radio station 51 will use the narrowband downlink radio channel to receive service is reported to the server 56. At step ST17, service is begun to be provided to the mobile radio station 51 via the narrowband radio base station 53.

In the above-noted thirty-first embodiment, although the example shown is that in which at step ST13 the service is to be received via the wideband radio channel, this being executed at step ST14, if step ST14 is after step ST11, it is acceptable to execute this, regardless of the existence or non-existence of a service request. That is, even if there is no service request from a user, the information interpreted at step ST11 may be passed to the server 56 via the narrowband radio base station 53. In this case, regardless of whether there is a service request from a user, the server 56 is able to tell which wideband radio base station 52 service area the mobile radio station 51 is located. There is a sequence in which only if steps ST12 is executed before step ST11, that is, only in the case in which there is a service request from a user. In this case, if there is no request from a user, because the mobile radio station 51 does not need to interpret in which wideband relay base station 52 service area it is located, there is a reduction of power consumption. For a further reduction in power consumption, it is possible to switch off the power to the receiving means for receiving wideband information.

Figure 53:
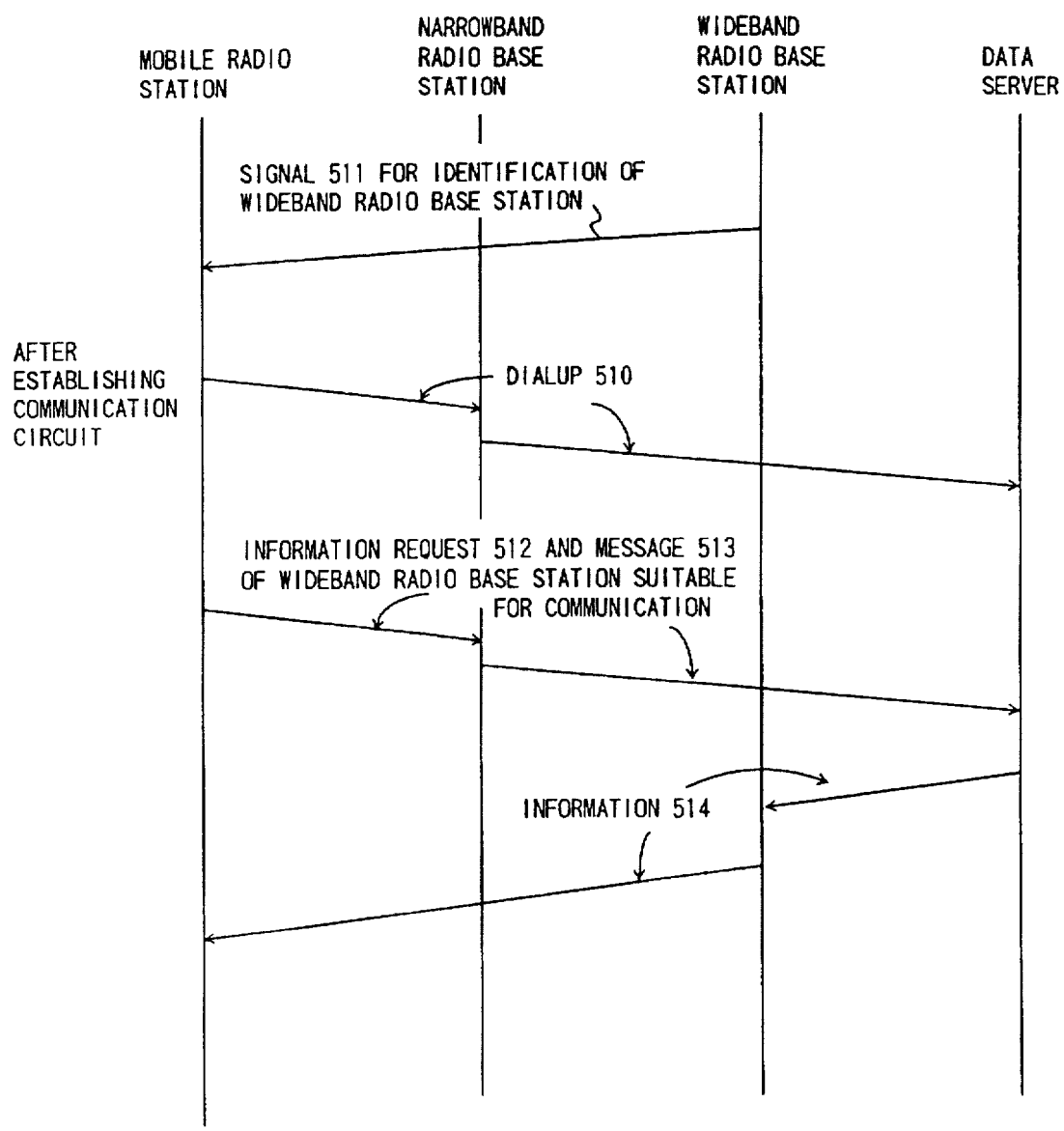
FIG. 53 is a sequence diagram which shows communications starting protocol in a radio communication system related to the thirty-first embodiment of the present invention.

Next the sequence diagram for the communication starting procedure related to the first invention will be described, using FIG. 53. The mobile radio station 51 receives from the wideband radio base station 52 a signal 511 for the purpose of identifying the radio base station, and from this signal is able to judge which relay base station 52 service area it is located in. In this condition, if a service request occurs, the user performs a dialup 511 of the specific telephone number of the server 56, and a communication circuit is secured from the mobile radio station 51 to the server 56, via the narrowband relay base station 53. After securing the communication circuit from the mobile radio station 51 to the server 56, the mobile radio station 51 sends to the server 56 a data transmission request message 512 and a signal 513 for the purpose of identifying a wideband relay base station 52 to which it can be connected. The server 56 interprets the data request message 512 and the signal 513 sent from the user, and sends information 514 which the user has requested, via the wideband relay base station 52 which is specified by the signal 513.

Figure 54:
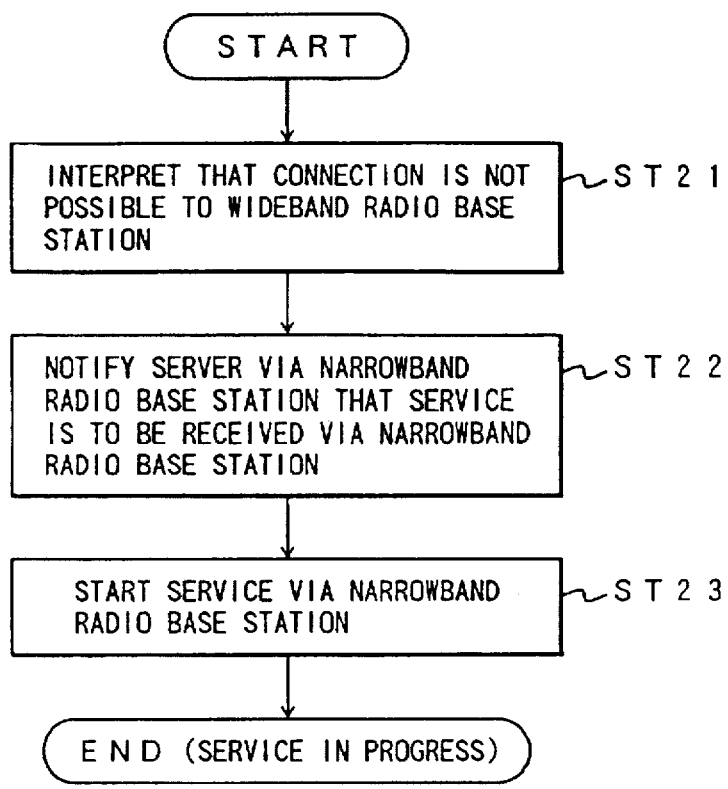
FIG. 54 is a flowchart which shows the processing steps in a radio communication system related to the thirty-second embodiment of the present invention.

The thirty-second embodiment: The procedure for starting communication will be described for the thirty-first embodiment for the case in which the mobile radio station 51 is in the area shown in FIG. 50B, that is, the case in which the mobile radio station 51 cannot connect to the wideband relay base station 52. FIG. 54 is the most basic flowchart related to the thirty-second embodiment. At step ST21, the mobile radio station 51 interprets that it is not located in a wideband radio base station 52 service area. At step ST22, the information that the base station 51 will use the narrowband downlink radio channel is passed to the server 56 via the narrowband relay base station 53. The provision of service to the mobile radio station 51 is started, via the narrowband relay base station 53. When the service is started, a variety of procedures can be envisioned, based on the above-described basic flowchart.

Figure 55:
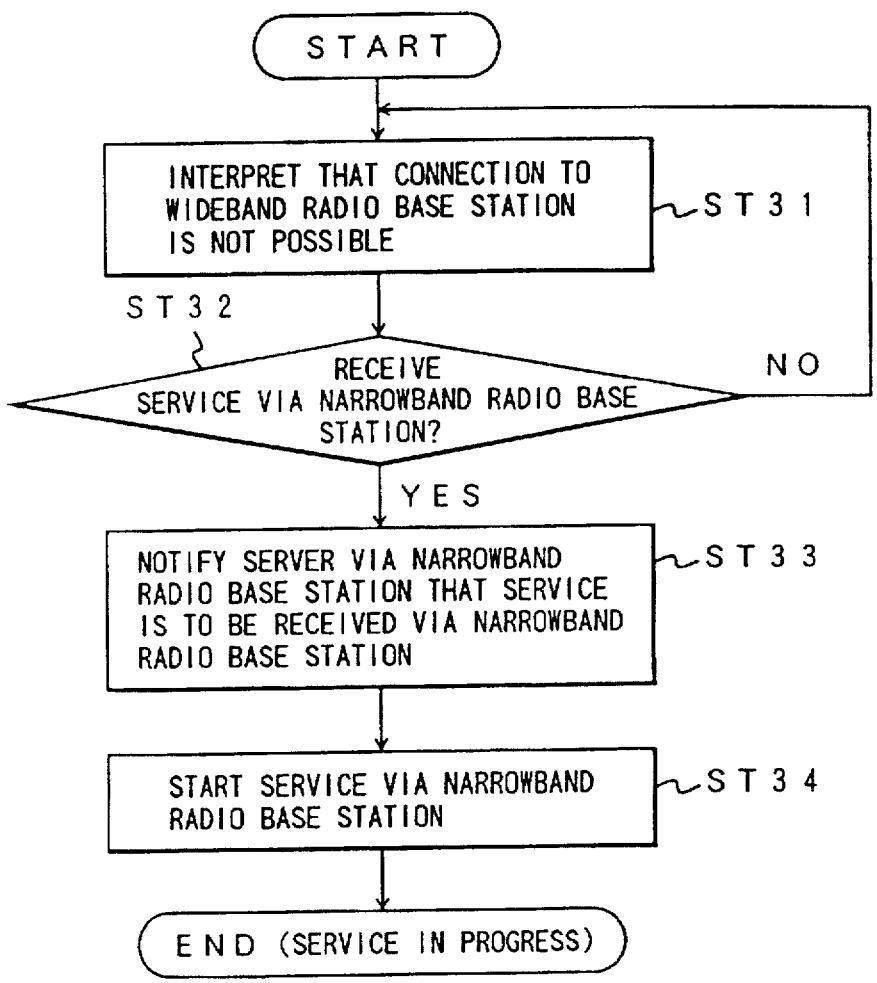
FIG. 55 is a flowchart which shows the processing steps of starting service in a radio communication system related to the thirty-second embodiment of the present invention.

FIG. 55 is one example. At step ST31, the mobile radio station 51 interprets that it is not in a wideband radio base station 52 service area, that is, that it cannot connect to the wideband radio base station 52. At step ST32, a judgment is made as to whether there is a service request which used the narrowband downlink radio channel. In the case in which there is a service request from a user, flow proceeds to step ST33, and if there is no service request, step ST31 is repeated. At step ST33, the mobile radio station 51 passes the fact that it will use the narrowband radio base station 53 to the server 56, via the narrowband radio base station 53. At step ST34, the provision of service to the mobile radio station 51 is started, via the narrowband radio base station 53. Although in the above-described embodiment, after an interpretation is made that the mobile radio station 51 cannot connect to the wideband radio base station 52, that is, after a determination is made as to whether or not connection to the wideband radio base station 52 can be made, the example shown is that of making a judgment at step ST32 of whether there is a service request from a user, it is possible, as shown in the thirty-first embodiment, to execute the step ST31 after determining whether there is a request from a user.

Figure 56:
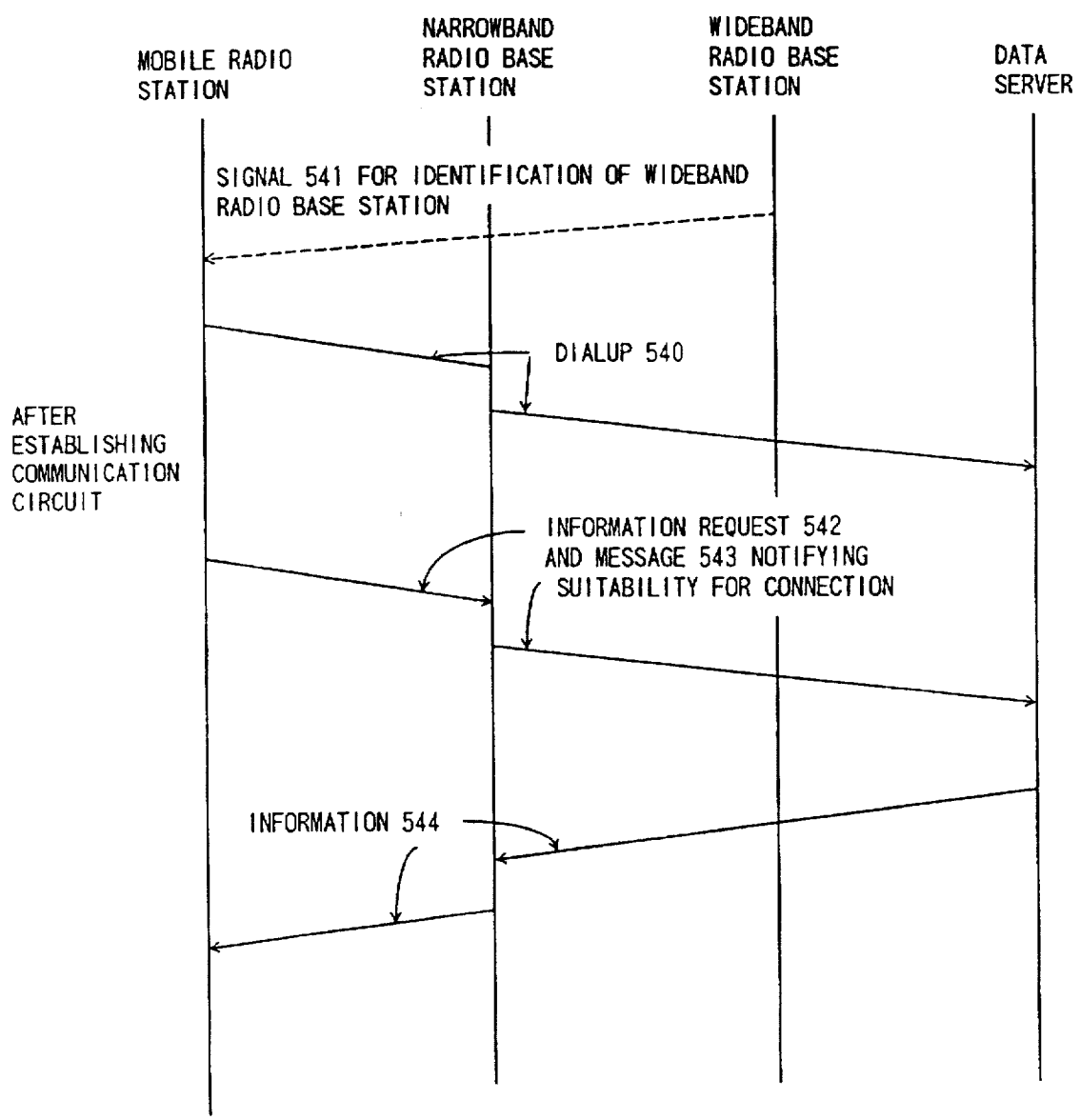
FIG. 56 is a sequence diagram which shows communication starting protocol in a radio communication system related to the thirty-second embodiment of the present invention.

Next the sequence diagram for the communication starting procedure related to the second invention will be described, using FIG. 56. The mobile radio station 51 cannot receive from the wideband radio base station 52 a signal 541 for the purpose of identifying the radio base station. Even if it could receive it, the signal strength is not great enough for the purpose of receiving the service. Therefore, the mobile radio station 51 interprets this as meaning that it is outside the service area of the wideband radio base station. That is, the mobile radio station 51 recognizes that it can only receive the service via the narrowband downlink radio channel. In such a case as this, the user selects whether or not to receive the service via the narrowband downlink radio channel. If the service is to be received via the narrowband downlink radio channel, the user performs a dialup 540 of the specific telephone number of the server 56, and a communication circuit is secured via the narrowband radio base station. After securing the communication circuit from the mobile radio station 51 to the server 56, the mobile radio station 51 sends a data transmission request message 542 and a signal 543, for the purpose of identifying the a narrowband radio base station 53 to which connection can be made, to the server. Usually, because the narrowband radio base station 53 used as the downlink radio channel is the same narrowband radio base station 53 used as the uplink radio channel, the signal 543 may merely be only the information to inform the server 56 that the wideband downlink radio channel cannot be used. The server 56 interprets the data transmission request message 542 and the signal 543 sent from the user, and sends the information 544 requested by the user either via the narrowband radio base station 53 which is specified by the signal 543, or via the uplink radio channel.

Next, the procedure with regard to handover in each of the thirty-third to thirty-sixth embodiments will be described.

The handover which is handled by these embodiments is limited to a handover that occurs in the case in which the mobile radio station 51 moves within the service area of a specific narrowband radio base station 53. The reason for this is that, because the narrowband radio base station 53 has uplink and downlink radio channels, handover between narrowband radio base stations can be adequately performed using the procedure of the past. Because the procedure when starting communication was shown for the thirty-first and thirty-second embodiments, the handover procedure will be described from the condition of already providing service in the thirty-third to thirty-six embodiments.

Figure 50C:
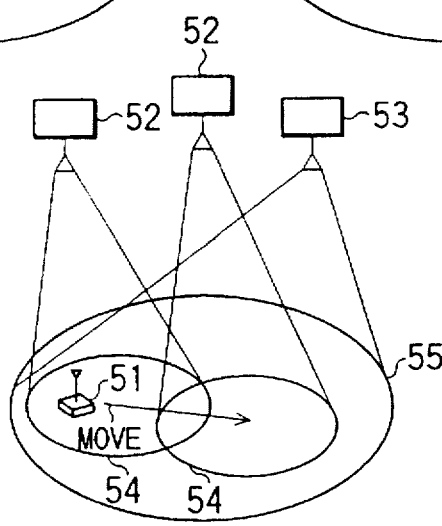

Thirty-third embodiment: The handover procedure will be described for the case in which the mobile radio station 51 moves as shown in FIG. 50C, that is, in the case in which the mobile radio station 51 is receiving service in the service area of the wideband radio base station 52, and moves into the service area of a different wideband radio base station 52.

Figure 57:
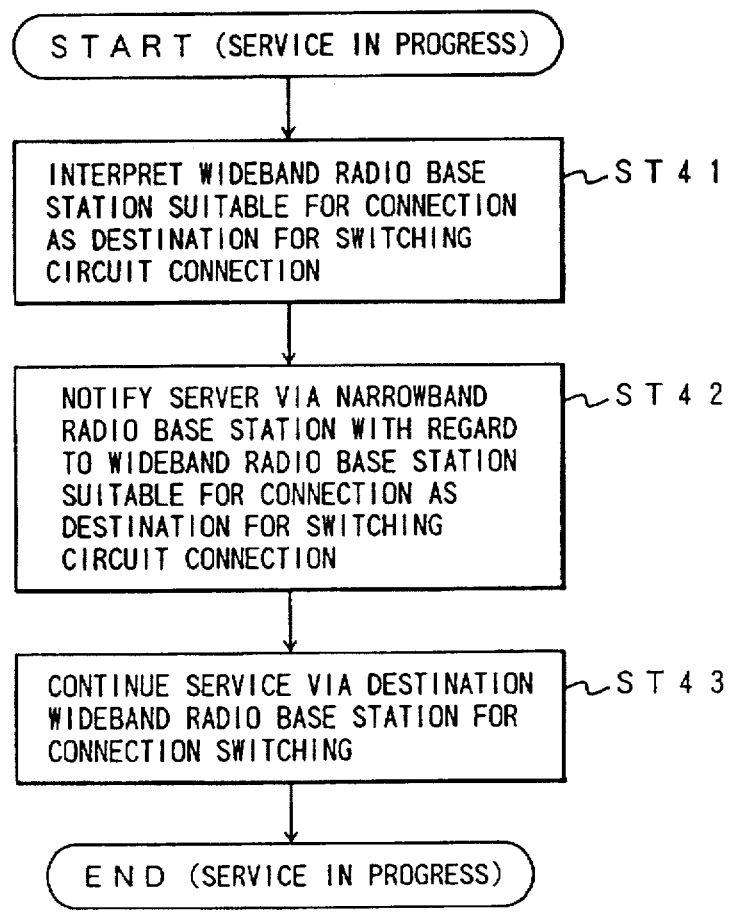
FIG. 57 is a flowchart which shows the processing steps in a radio communication system related to the thirty-third embodiment of the present invention.
Figure 59:
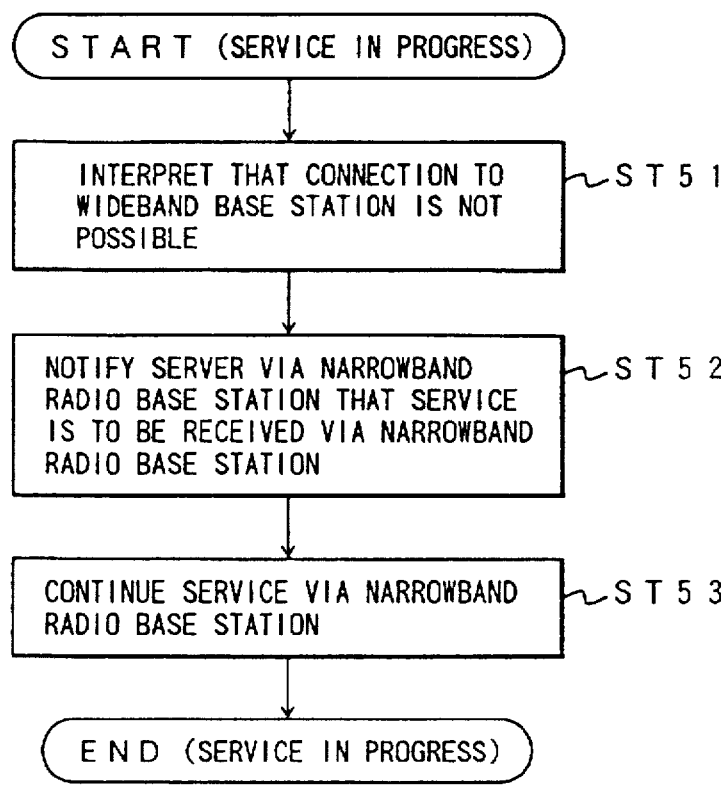
FIG. 59 is a flowchart which shows the processing steps of starting service in a radio communication system related to the thirty-third embodiment of the present invention.

FIG. 57 is the most basic flowchart related to this embodiment. At step ST41, a judgment is made as to whether or not the mobile radio station 51 can receive the a signal sent from a wideband radio base station 52 different from the one from which service is being provided. In the case in which receiving is possible, the mobile radio station 51 interprets the destination wideband radio base station 52 for handover, based on the results of a comparison of the received signal field strength with the received signal field strength of the signal sent from the wideband radio base station 52 which is currently providing service. Therefore, in the case in which the field strength of the signal being sent by the wideband radio base station 52 which is currently providing service is sufficient, service continues and switching of the radio station is not performed. The criterion for selecting whether or not switching of the connection is to be done varies depending upon the communication quality required by the service being provided. For example, in the case of voice communication service, because the required communication quality is not that high, even if movement of the mobile radio station 51 is accompanied by a slight deterioration in communication quality. However, in the case of data communication service, because the required communication quality is higher than in the case of voice communication service, switching of the radio base station is done to assure the best possible communication quality. At step ST42, the information interpreted at step ST41 is passed to the server 56 via the narrowband radio base station 53. By doing this, the server 56 is able to recognize the destination wideband radio base station 52 for handover. At step ST43, switching of the connection is performed so that service is provided via the wideband radio base station which was judged to be the destination of the handover. Next, the handover sequence diagram will be described, using FIG. 58. In the case in which the mobile radio station 51 moves as shown in FIG. 50C, because the signal strength when receiving the information data 565 transmitted from the wideband radio base station 52 deteriorates, it becomes impossible to receive it properly. Because the mobile radio station moves into the service area of a different wideband radio base station, it can now receive the signal 566 for the purpose of identifying a radio base station notified from the other wideband radio base station, and it is possible for it to make a judgment, from that received signal, of what wideband radio base station 52 service area it has moved into. The mobile radio station 51 makes a judgment of whether or not handover should be done, based on the relationship of the received field strengths of the information signal 565 and the signal 566. If there is no need to perform handover, receiving of the information data 565 continues as is.

In the case in which the need to perform handover arises, the mobile radio station 51 sends a handover request message and a signal 558, for the purpose of identifying the handover destination wideband radio base station 52, to the server 56. When the server 56 interprets the handover request message and the signal 568, it sends a circuit cutoff request message 569 to the wideband radio base station which is current performing communication. After the circuit is cut off, the server sends the information data 570 via the wideband radio base station 52 which was specified by the signal 568. By doing this, even in the case in which the service area changes because of movement of the user, it is possible for the user to continue receiving the service.

Figures 50D, 50E:
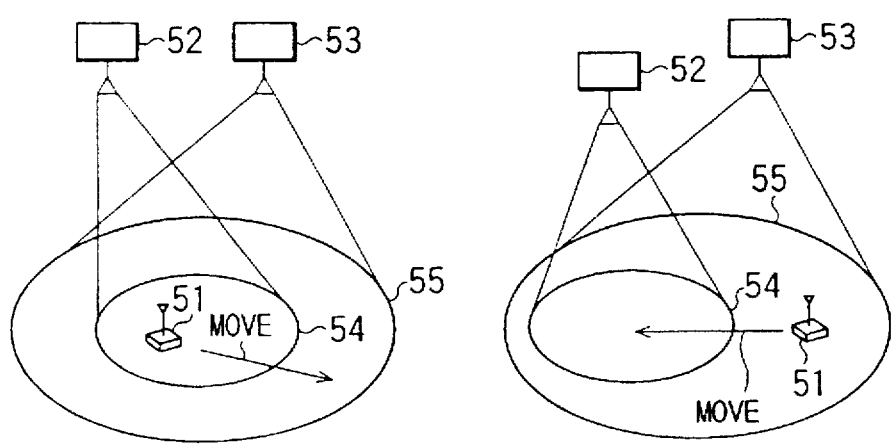

Thirty-fourth embodiment: The handover procedure for the thirty-fourth embodiment will be described for the case in which the mobile radio station 51 moves as shown in FIG. 50D, that is, for the case in which the mobile radio station 51 is receiving service in the service area of a wideband radio base station 52, and moves outside the service area of the wideband radio base station 52. Because the mobile radio station 51 moves outside the service area, the received signal strength of the signal sent from the wideband radio base station 52 which is currently providing service deteriorates. Also, it is not possible for it to receive a signal sent from a wideband radio base station 52 different from the wideband radio base station 52 providing service. Therefore, at step ST51, the mobile radio station 51 interprets that it cannot connect to the wideband radio base station 52. At step ST52, the mobile radio station 51 informs the server 56 via the narrowband radio base station 53 that it cannot connect to the wideband radio base station 52, that is, that it will use the narrowband radio base station 53 for downlink channel transmission. At step ST53, the server 56 switches the connection so that service in continued via the narrowband radio base station 53.

In the above-described embodiment, the example provided was that of the case in which the assumption was made that the mobile radio station 51 could no longer connect to a wideband radio base station 52 and switching is made to connect via a narrowband radio base station, it is possible to add a step after step ST51 which selects either continued provision of service using the narrowband downlink radio channel or stoppage of the provision of service. In the case in which the selection of continued service is made, the flow proceeds to step ST52. The case in which the service is to be stopped is described in detail with regard to the thirty-fifth embodiment.

Next, the sequence diagram for handover with relation to the thirty-fourth embodiment will be described, using FIG. 60. In the case in which the mobile radio station 51 moves as shown in FIG. 50D, because there is a deterioration in the received field strength of the information data signal 585 which is sent from the wideband radio base station, it is no longer possible to properly receive the information. Because the mobile radio station 51 moves outside the service area of the wideband radio base station 52, it is not possible for it to receive the signal 586 which is for the purpose of identifying a radio base station sent from different wideband radio base station 52. Even it could receive it, it is not possible to obtain a signal strength sufficient for the provision of service. Therefore, the mobile radio station 51 interprets that it is located outside the wideband radio base station 52 service area. That is, it recognizes that it cannot receive service via a narrowband downlink radio channel. For this reason, switching is made to connect to a narrowband downlink radio channel to continue the provision of service. The mobile radio station 51 sends to the server 56 a handover request message 587 and a signal 588 for the purpose of identifying the handover destination narrowband radio base station 53.

Normally, because the narrowband radio base station 53 which is used as the downlink radio channel is the same as the narrowband radio base station 53 used as the uplink radio channel, the signal 588 may merely be only the information to inform the server 56 that the wideband downlink radio channel cannot be used. When the server 56 interprets the handover request message 587 and the signal 588, it sends a circuit cutoff request message 589 to the wideband radio base station 52 which is currently performing communication. After the circuit is cut off, the server 56 sends the information 590 requested by the user, either via the narrowband radio base station 53 which was specified by the signal 588, or via the narrowband radio base station 53 used on the uplink radio channel. By doing this, even in the case in which the service area changes because of movement of the user, it is possible for the user to continue receiving the service.

Figure 61:
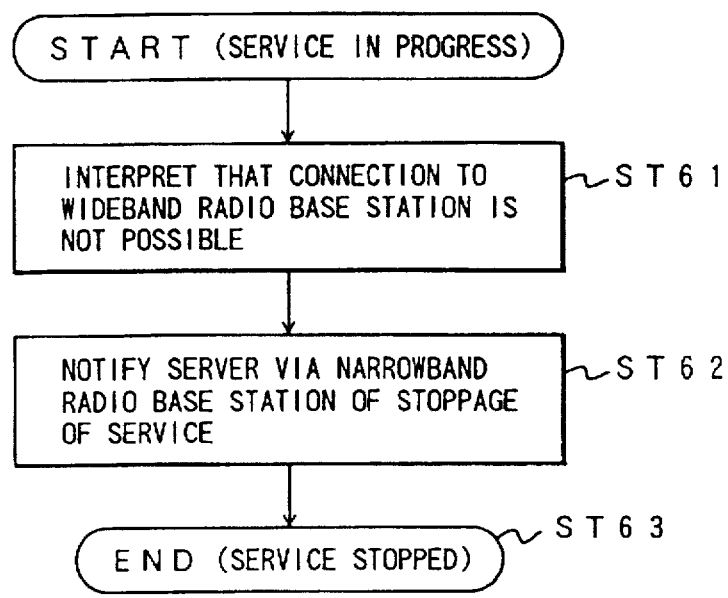
FIG. 61 is a flowchart which shows the processing steps in a radio communication system related to the thirty-fifth embodiment of the present invention.

Thirty-fifth embodiment: The circuit service stopping procedure, that is, the circuit cutoff procedure will be described, using FIG. 61, for the case in which the mobile radio station 51 moves as shown in FIG. 50E, that is, in the case in which the mobile radio station 52 is receiving service inside the service area of a wideband radio base station 52, and moves outside the service area of the wideband radio base station 52.

Because the mobile radio station 51 moves outside the service area of the wideband radio base station 52, there is a deterioration of the received field strength of the signal sent from the wideband radio base station 52 currently providing service. It is also impossible to receive the signal sent from a wideband radio base station other than the wideband radio base station currently providing service. Therefore, at step ST61, the mobile radio station interprets that it cannot connect to a wideband radio base station. At step ST62, the mobile radio station 51 informs the server 56 via the narrowband radio base station, that it cannot connect to a wideband radio base station 52, that is, that the provision of service is to be stopped. At step ST63, the server 56 performs a stoppage of the service being provided, and cuts off the communication circuit from the wideband radio base station to the mobile radio station 51. In the case in which, as in the thirty-fourth embodiment, a step is added which selects either continued provision of service using the narrowband downlink radio channel or stoppage of the provision of service, this step follows step ST61, and if stoppage of the service is selected at this step, flow proceeds to step ST62.

Next, the sequence diagram for handover in the thirty-fifth embodiment will be described, using FIG. 62. In the case in which the mobile radio station 51 moves as shown in FIG. 50E, because the signal strength when receiving the information data signal 605 sent from the wideband radio base station 52 deteriorates, it is no longer possible to receive it properly. Because the mobile radio station 51 moves outside the service area of the wideband radio base station 52, it cannot receive the signal 606 from another wideband radio base station which is for the purpose of identifying the radio base station. Even it could receive it, it is not possible to obtain a signal strength sufficient for the provision of service. Therefore, the mobile radio station 51 interprets that it is located outside the wideband radio base station 52 service area. That is, it recognizes that it cannot receive service via a wideband downlink radio channel. For this reason, the stoppage of the provision of service is executed. The mobile radio station 51 sends a communication cutoff request message 607 to the server 56. When the server interprets the communication cutoff request message 607, it sends a circuit cutoff message 608 to the mobile radio station 51, via the wideband radio base station 52 which is currently performing communication. By doing this, it is possible to quickly stop the service being provided, in accordance with the wish of the user.

Figure 63:
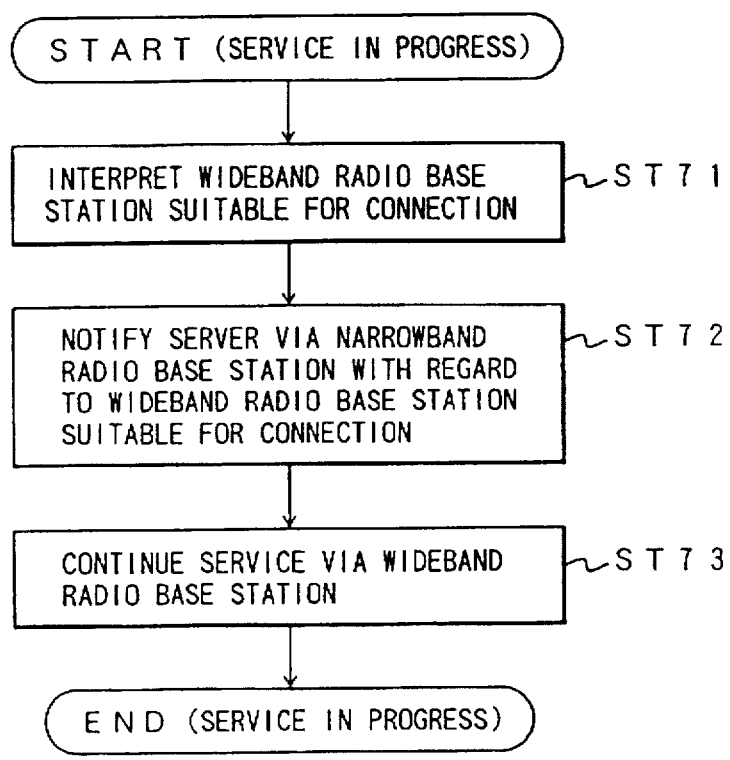
FIG. 63 is a flowchart which shows the processing steps in a radio communication system related to the thirty-sixth embodiment of the present invention.

Thirty-sixth embodiment: The handover procedure will be explained using FIG. 63, for the case in which the mobile radio station 51 moves as shown in FIG. 50E, that is, in the case in which the mobile radio station 51 is outside the service area of a wideband radio base station 52 and is receiving service using a narrowband downlink radio channel and then moves into the service area of a wideband radio base station 52.

Accompanying the movement of the mobile radio station 51, it becomes possible to receive the signal from the wideband radio base station 52 for the purpose of identifying the radio base station. At step ST71, the mobile radio station 51 interprets that it has moved to inside a service area of a wideband radio base station 52. At step ST72, the information interpreted at step ST71 is passed to the server 56, via the narrowband radio base station 53. By doing this, it is possible for the server to recognize that the mobile radio station 51 has moved to inside a service area of a wideband radio base station 52. At step ST73, the connection is switched so that it passes through the wideband radio base station 52 interpreted at step ST71, and the provision of service is continued. Even in the case in which the mobile radio station 51 is using the narrowband radio channel, it must always be waiting to receive the signal which is sent by a wideband radio base station 52. The reason for this is that, when the service area of a wideband radio base station 52 is entered, even if signal reception via the narrowband radio base station is good, there are cases in which handover is performed.

While in the above-noted embodiment, the example described is that in which at step ST71, when the mobile radio station 51 interprets that it has entered a service area of a wideband radio base station 52, a handover is performed immediately, it is also possible to add a step by which the user selects whether or not to perform a handover. The reason for this is that, as mentioned above, in the case in which the receiving condition of the signal via the narrowband radio base station 53 is not necessarily bad, for a service such as voice communication which does not require high-speed transmission, it is not necessary to perform handover. There are three places this step can be added, each having the following characteristics. First, if the above-noted step is added following step ST72, regardless of whether or not a handover is performed, the server 56 can recognize in which wideband radio base station 52 service area the mobile radio station 51 is located. Next, in the case in which the above-noted step is added following step ST71, when handover is not performed, because the mobile radio station 51 does not tell the server in which wideband radio base station 52 service area it is located, there is a reduction in the amount of traffic between the mobile radio station 51 and the server 56. Finally, if the above-noted step is added before step ST71, because it is not necessary for the mobile radio station 51 to interpret in which wideband radio base station 52 service area it is located, there is a reduction in power consumption. In this case, if the power supply to the receiving means for wideband information transmission is switched off, there is a further reduction in power consumption.

Next, the handover sequence diagram for the system of the thirty-sixth embodiment will be described, using FIG. 64. In the case in which the mobile radio station 51 moves as shown in FIG. 50E, the mobile radio station 51 becomes capable of receiving the signal 625 from a wideband radio base station 52 for the purpose of identifying the radio base station, and can make a judgment, based on that received signal, at to what wideband radio base station 52 service area it has moved into. At this time, as described above, the signal strength of the information data 624 signal received by the mobile radio station 51 is not necessarily bad. Therefore, whether or not a handover is performed depends on the wishes of the user. It is also possible to establish beforehand whether or not a handover is to be performed when entering the service area of a wideband radio base station 52. If the setting is made so that a handover is not performed, the mobile radio station 51 may switch the power supply to the receiver for the purpose of receiving the wideband information transmission to off. If a handover is not to be performed when the mobile radio station enters the service area of a wideband radio base station 52, reception of the information data signal 624 via the narrowband radio base station 52 is continued as is.

In the case of performing a handover, the mobile radio station 51 sends to the server 56 a handover request message 626 and a signal 627 for identifying the handover destination wideband radio base station 52. When the server 56 interprets the handover request message 626 and the signal 627, it sends a downlink radio channel circuit cutoff message 628 to the narrowband radio base station 52. After the circuit is cut off, the server 56 sends the information data 629 via the wideband radio base station 52 which was specified by the signal 627. By doing this, even in the case in which the service area changes because of movement of the user, it is possible for the user to continue receiving the service.

Figure 65B:
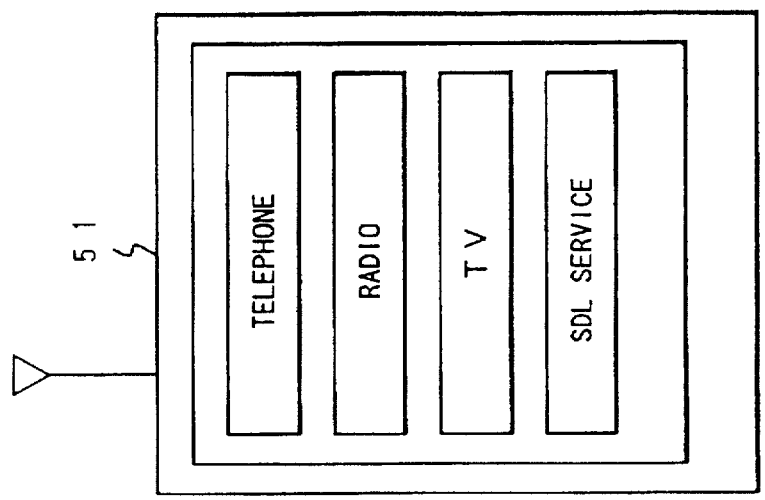
FIG. 65A and FIG. 65B are plan views of the mobile radio stations used in radio communication systems related to the thirty-seventh embodiment of the present invention.
Figure 65A:
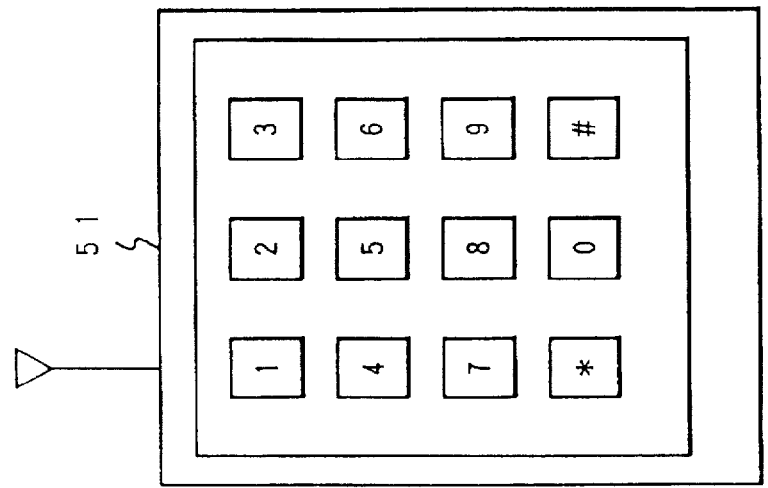

Thirty-seventh embodiment: A characteristic logical number is allocated to the server 56. When a plurality of servers exist in a network, a common number is allocated to all servers. When a user wishes to receive service, the server 56 is called. The methods of calling are the method of direct dialup by the user of the logical number (FIG. 65A) and the method of the user selecting an SDL service item which is displayed at the mobile radio station 51. The SDL service is a service provided using an SDL system. In the case of this method, a correspondence is established between SDL service items and logical numbers, so that when a user selects an SDL service item dialup is automatically performed. With either method, when the call is made to the server 56, the first thing done is the establishment of a communication circuit from the mobile radio station 51 to the narrowband radio base station 53.

Next, the narrowband radio base station 53 makes a connection to the server 56. In the case in which the network has only one server 56, a communication circuit is established from the narrowband radio base station 53 to the server 56. In the case in which the network has a plurality of servers 56, selection is made of the server to which the narrowband radio base station 53 is to be connected. There are four methods of making this selection.

The first method is that in which the narrrowband radio base station 53 recognizes beforehand which server 56 it is to be connected to, this server 56 always being selected. Normally, the connected server is a server neighboring the narrowband radio base station 53. The second method is that in which a server 56 having a light load is selected. In this method, the narrowband radio base station 53 monitors the load of the servers 56 and selects a server 56 having a light load. The third method is that in which the server 56 is selected which has a light network load. This method attempts to use a communication path on which there is little traffic as the path between the narrowband radio base station 53 and the server 56. The fourth method is that of combining at least two of the above three methods. One example of doing this is for the narrowband radio base station 53 to monitor the server 56 loads, and to select from servers 56 having a load lower than a given load the closest neighboring server 56 to the narrrowband radio base station 53. After the server 56 is selected by means an above-noted method, the communication circuit from the narrrowband radio base station 53 to the server 56 is established, this being used to establish a communication circuit from the mobile radio station 51 to the server 56.

Figure 66:
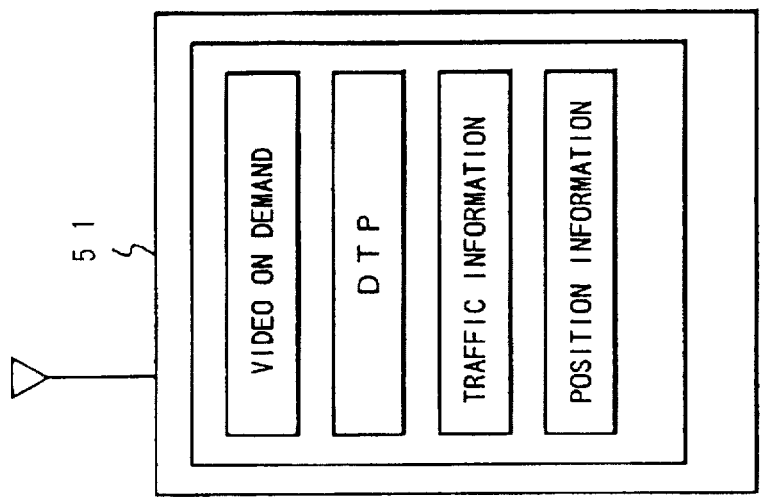
FIG. 66 is a plan view of a mobile radio station used in a system related to the thirty-eighth embodiment of the present invention.

Thirty-eighth embodiment: As shown in FIG. 66, a specific logical number is allocated to each service. The user make a call using the logical number of the desired service. The methods of calling are the method of direct dialup by the user of the logical number and the method of the user selecting a service item which is displayed at the mobile radio station 51. This method will be described as the system related to the thirty-eighth embodiment. In the case of this method, when the user selects the service, automatic dialup is performed with respect to the corresponding logical number. With either of the methods, when a call is made to the server 56, the first thing that happens is that a communication circuit is established from the mobile radio station 51 to the narrrowband radio base station 53.

Next, the narrowband radio base station 53 makes a connection to the server 56. In the case in which the network has only one server 56, a communication circuit is established from the narrowband radio base station 53 to the server 56. In the case in which the network has a plurality of servers 56, selection is made of the server to which the narrowband radio base station 53 is to be connected. Since the methods of selection are the same as for the thirty-ninth embodiment, they will not be included here. When the server 56 selection is performed, the communication circuit from the narrowband radio base station 53 to the server is established, this being used to establish a communication circuit from the mobile radio station 51 to the server 56.

Thirty-ninth embodiment: The mobile radio station 51 displays whether it is possible to communicate with a radio base station. Specifically, it displays both whether it can connect to a narrowband radio base station 53 and whether it can connect to a wideband radio base station 52. The method of display includes the method of displaying in step manner the signal strength each of the base stations (FIG. 67A) and the method of displaying a two-value state of communication possible or not possible (FIG. 67B). For the purpose of the above-noted display, the mobile radio station 51 has both a means of measuring the received field strength when receiving a signal transmitted from a wideband radio base station 52 and displaying the results of this measurement in a form which a human can recognize, and a means of measuring the received field strength when receiving a signal transmitted from a narrowband radio base station 53 and displaying the results of this measurement in a form which a human can recognize.

According to the thirty-ninth embodiment, it is possible to recognize what kind of service the user is receiving. That is, the user receives service via a narrowband downlink radio channel, and the user can recognize the condition in which it is not possible to receive service via a wideband downlink radio channel, the condition in which it is possible to receive service via a wideband downlink radio channel, and the like. Therefore, in the case, for example, in which the user is located in a wideband radio base station 52 service area, it is possible for the user to select, based on his or her wishes, whether to not receive service at this point, but to receive high-speed radio transmission service which uses a wideband downlink radio channel after moving into a wideband radio base station 52 service area, or to receive low-speed radio transmission service via a narrowband downlink radio channel at this point. The two steps related to the signal transmitted from the wideband radio base station 52 (when the mobile radio station 51 receives a first signal from a wideband radio base station 52 via a radio circuit, the step of measuring the receive field strength of the first signal, and the step of displaying the received field strength of the first signal in a form recognizable by a human being) and the two steps related to the signal transmitted from the narrowband radio base station 53 (when the mobile radio station 51 receives a second signal from a narrowband radio base station 53 via a radio circuit, the step of measuring the receive field strength of the second signal, and the step of displaying the received field strength of the second signal in a form recognizable by a human being) are each individual steps. Therefore, a method can be envisioned in which, in the case in which the fact that the user is not to receive high-speed transmission service via the wideband radio base station 52 is set beforehand, the two steps related to the signal transmitted from the wideband radio base station 52 are not performed. In this case, it is possible to reduce the power consumption of the mobile radio station 51.

As described above, according to the thirty-first to the thirty-ninth embodiments of the present invention, even in a system which included as a constituent element a mobile radio station not having a wideband uplink radio, such as in an SDL system, it is possible for the server to recognize to which wideband radio base station connection is possible, and to provide service. Even if, accompanying movement of a mobile radio station, it becomes necessary to perform a handover, it is possible for the server to recognize the destination wideband radio base station for the handover, thereby enabling continued provision of service.

Figure 68:
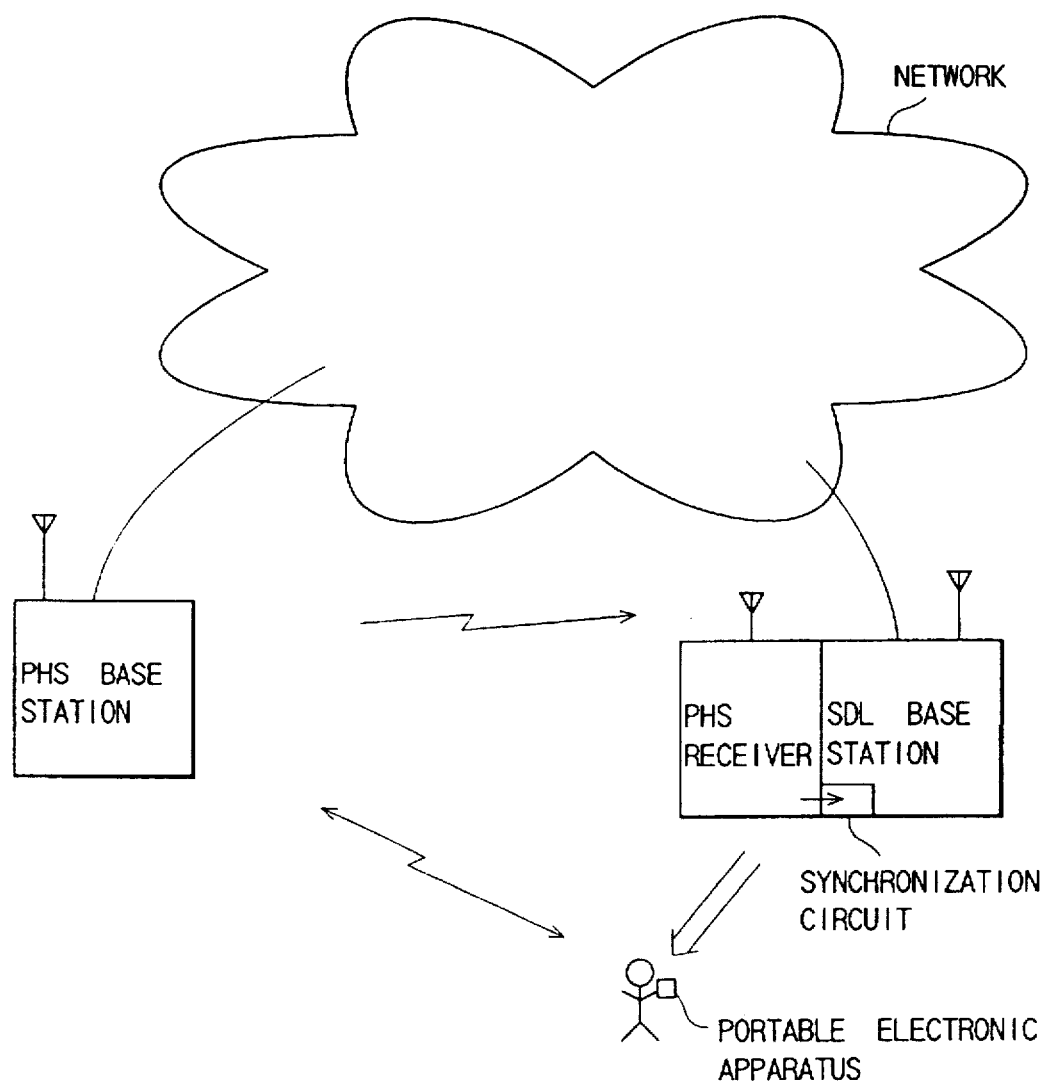
FIG. 68 is a drawing which shows the configuration of a radio communication system related to fortieth embodiment of the present invention.

FIG. 68 shows, in the same manner as FIG. 45, a radio communication system of the fortieth embodiment, this being formed by a PHS base station, a cable network, and an SDL-Net. It differs with respect to FIG. 45 in that fact that there is no PHS receiver provided in the SDL-Net base station, and also in that there is no reference oscillator in the network. As in FIG. 46, the SDL-Net base station exists within the PHS service area. For this reason, by inputting the signal received by the PHS receiver to a synchronization circuit, it is possible to establish synchronization between the PHS and the SDL-Net clock.

Figure 69:
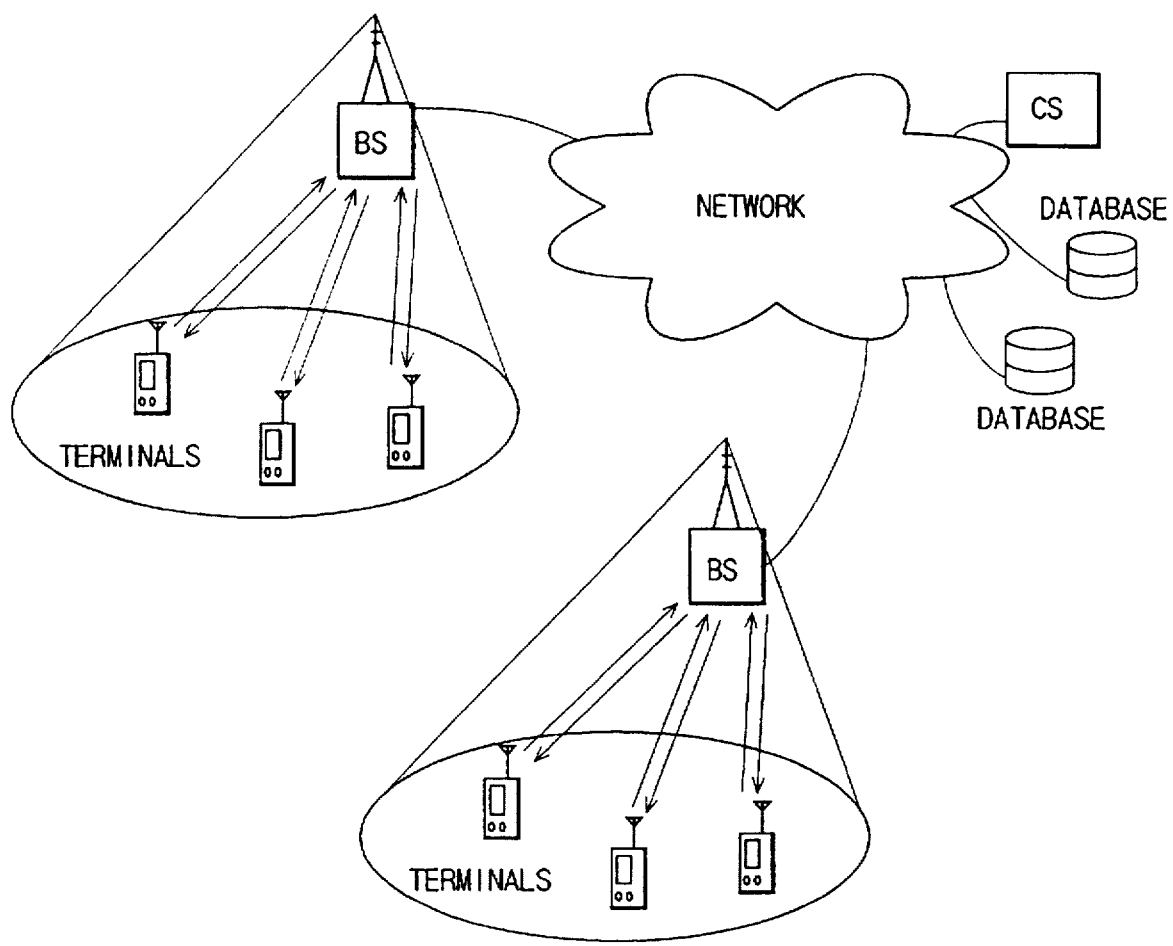
FIG. 69 is a drawing which shows the configuration of a radio communication system related to the forty-first embodiment of the present invention.

FIG. 69 shows the overall configuration of the forty-first embodiment, in which a radio communication system related to the present invention is applied. A plurality of base stations BS which have prescribed service areas and a plurality of databases and communication satellites CS are connected via a network.

What is claimed is:

1. A radio communication system including a base station, a plurality of terminals, an uplink established between the base station and each of the terminals for the purpose of radio transmission of prescribed information from a terminal to a base station, and a downlink established between each of the terminals and the base station for the purpose of radio transmission of prescribed data from a base station to a terminal, said radio communication system comprising:

a low-speed transmitting means, provided at said terminal, for transmitting a radio signal having a radio frequency in a relatively low frequency band at a relatively low transmission rate from said terminal to said base station via said uplink;

a low-speed receiving means, provided at said base station, for receiving a radio signal of a relatively low frequency sent at a low transmission rate from said terminal to said base station via said uplink;

a high-speed transmitting means, provided at said base station, for transmitting a radio signal having a radio frequency in a relatively high frequency band at a relatively high transmission rate from said base station to said terminal via said downlink; and a high-speed receiving means, provided at said terminal, for receiving a radio signal having a radio frequency in a relatively high frequency band at a relatively high transmission rate from said base station to said terminal via said downlink.

2. A radio communication system including a base station, a plurality of terminals, an uplink established between the base station and each of the terminals for the purpose of radio transmission of prescribed information from a terminal to a base station, and a downlink established between each of the terminals and the base station for the purpose of radio transmission of prescribed data from a base station to a terminal, said radio communication system comprising:

a low-speed transmitting means, provided at said terminal, for transmitting a radio signal having a radio frequency at a relatively low transmission rate from said terminal to said base station via said uplink;

a low-speed receiving means, provided at said base station, for receiving a radio of a signal sent at a relatively low transmission rate from said terminal to said base station via said uplink;

a high-speed transmitting means, provided at said base station, for transmitting a radio signal sent at a relatively high transmission rate from said base station to said terminal via said downlink; and a high-speed receiving means, provided at said terminal, for receiving a radio signal sent at a relatively high transmission rate from said base station to said terminal via said downlink;

wherein said high-speed transmitting means transmits a large amount of user-information data which is sent from said base station to said terminal via said downlink by means of a high-frequency-band radio signal, and wherein said low-speed transmitting means transmits a small amount of control data which is sent from said terminal to said base station via said uplink by means of a low-frequency-band radio signal.

3. A radio communication system including a base station, a plurality of terminals, an uplink established between the base station and each of the terminals for the purpose of radio transmission of prescribed information from a terminal to a base station, and a downlink established between each of the terminals and the base station for the purpose of radio transmission of prescribed data from a base station to a terminal, said radio communication system comprising:

a low-speed transmitting means, provided at said terminal, for transmitting a radio signal having a radio frequency at a relatively low transmission rate from said terminal to said base station via said uplink;

a low-speed receiving means, provided at said base station, for receiving a radio signal sent at a relatively low transmission rate from said terminal to said base station via said uplink;

a high-speed transmitting means, provided at said base station, for transmitting a radio signal sent at a relatively high transmission rate from said base station to said terminal via said downlink; and a high-speed receiving means, provided at said terminal, for receiving a radio signal sent at a relatively high transmission rate from said base station to said terminal via said downlink;

an optimum connection station interpreting means which receives a signal for the purpose of identifying a wideband radio base station, notification of which is made from said wideband radio base station via a radio line, and which interprets from this signal said wideband radio base station that is suitable for connection; and a service starting means which starts a prescribed service via a specific wideband radio base station which is judged to be suitable for connection with respect to said mobile base station.

4. A radio communication system according to claim 3, further comprising:

means which, when said mobile radio station receives said prescribed service via said specific wideband radio base station, receives a signal for the purpose of identifying said wideband radio base station, notification of which is given via a radio line from a wideband radio base station which is different from said specific wideband radio base station, and which interprets from this received signal to which specific wideband radio base station switching should be made;

means by which said mobile radio station notifies a server via a narrowband radio base station of said specific wideband radio base station which is suitable as a switching destination; and means by which said server switches a connection with respect to said mobile radio station via said specific wideband radio base station, which is judged to be suitable as a switching destination for connection, thereby providing said prescribed service.

5. A radio communication system including a base station, a plurality of terminals, an unlink established between the base station and each of the terminals for the purpose of radio transmission of prescribed information from a terminal to a base station, and a downlink established between each of the terminals and the base station for the purpose of radio transmission of prescribed data from a base station to a terminal, said radio communication system comprising:

a low-speed transmitting means, provided at said terminal, for transmitting a radio signal having a radio frequency at a relatively low transmission rate from said terminal to said base station via said uplink;

a low-speed receiving means, provided at said base station, for receiving a radio signal sent at a relatively low transmission rate from said terminal to said base station via said unlink;

a high-speed transmitting means, provided at said base station, for transmitting a radio signal sent at a relatively high transmission rate from said base station to said terminal via said downlink; and a high-speed receiving means, provided at said terminal, for receiving a radio signal sent at a relatively high transmission rate from said base station to said terminal via said downlink;

wherein a method of modulation of the radio signal which is sent via said uplink by means of said low-speed transmission means provided at said terminal is different from a method of modulation of the radio signal sent via said downlink by means of said high-speed transmission means provided at said base station.

6. A radio communication system, comprising:

a base station;

a plurality of terminals;

an uplink established between the base station and each of the terminals for the purpose of radio transmission of prescribed information from a terminal to a base station at a relatively low transmission rate;

a high-speed downlink established between each of the terminals and the base station for the purpose of radio transmission of prescribed information from a base station to a terminal in a relatively high-speed transmission;

a low-speed downlink established between each of the terminals and the base station for the purpose of radio transmission of prescribed information from a base station to a terminal at a transmission rate approximately the same as said uplink;

a first low-speed transmitting means, provided at said terminal, for transmitting to said base station a radio signal at a relatively low transmission rate in a relatively low-frequency band via said uplink;

a first low-speed receiving means, provided at said base station, for receiving a radio signal sent at a relatively low transmission rate from said terminal to said base station via said uplink;

a second low-speed transmitting means, provided at said base station, for transmitting to said terminal a radio signal at a relatively low transmission rate in a relatively low-frequency band via said low-speed downlink;

a second low-speed receiving means, provided at said terminal, for receiving a radio signal sent at a relatively low transmission rate in a relatively low-frequency band via said low-speed downlink;

a high-speed transmitting means, provided at said base station, for transmitting a radio signal sent at a relatively high transmission rate in a relatively high-frequency band from said base station to said terminal via said high-speed downlink; and a high-speed receiving means, provided at said terminal, for receiving a radio signal sent at a relatively high transmission rate in a relatively high-frequency band from said base station to said terminal via said high-speed downlink.

7. A radio communication system according to claim 6, wherein:

said high-speed transmitting means transmits a large amount of user information from said base station to said terminal via said high-speed downlink by means of a radio signal in a high-frequency band, said first low-speed transmitting means transmits a small amount of control information from said terminal to said base station via said uplink by means of a radio signal in a low-frequency band, and said second low-speed transmitting means transmits a small amount of control information and voice information from said base station to said terminal via said low-speed downlink by means of a radio signal in a low-frequency band.

8. A radio communication system according to claim 6, wherein a method of modulation of the radio signal which is sent via said uplink by means of said first low-speed transmitting means provided at said terminal is different from a method of modulation of the radio signal sent via said high-speed downlink by means of said high-speed transmitting means provided at said base station.

9. A radio communication system according to claim 6, wherein a method of modulation of the radio signal on the uplink having a narrow frequency band which transmits the radio signal from said terminal to said base station is different from a method of modulation of the radio signal on the downlink having a wide frequency band which transmits the radio signal from said base station to said terminal.

10. A radio communication system according to claim 6, wherein said unlink is a narrowband uplink and said low-speed downlink is a narrowband low-speed downlink, and said narrowband unlink and said narrowband low-speed downlink transmit and receive using the same antenna at both said base station and said terminal.

11. A radio communication system, comprising:

a base station;

a plurality of terminals;

an uplink established between the base station and each of the terminals for the purpose of radio transmission of prescribed information from a terminal to a base station at a relatively low transmission rate;

a high-speed downlink established between each of the terminals and the base station for the purpose of radio transmission of prescribed information from a base station to a terminal in a relatively high-speed transmission;

a low-speed downlink established between each of the terminals and the base station for the purpose of radio transmission of prescribed information from a base station to a terminal at a transmission rate approximately the same as said uplink;

a first low-speed transmitting means, provided at said terminal, for transmitting to said base station a radio signal at a relatively low transmission rate via said uplink;

a first low-speed receiving means, provided at said base station, for receiving a radio signal sent at a relatively low transmission rate from said terminal to said base station via said uplink;

a second low-speed transmitting means, provided at said base station, for transmitting to said terminal a radio signal at a relatively low transmission rate via said low-speed downlink;

a second low-speed receiving means, provided at said terminal, for receiving a radio signal sent at a relatively low transmission rate in a relatively low-frequency band via said low-speed downlink;

a high-speed transmitting means, provided at said base station, for transmitting a radio signal sent at a relatively high transmission rate from said base station to said terminal via said high-speed downlink; and a high-speed receiving means, provided at said terminal, for receiving a radio signal sent at a relatively high transmission rate from said base station to said terminal via said high-speed downlink;

wherein said terminal, as a mobile radio station, includes an optimum connection station interpreting means which receives a signal for the purpose of identifying a wideband radio base station, notification of which is made from said wideband radio base station via a radio line, and which interprets from this signal said wideband radio base station that is suitable for connection, and a service starting means which starts a prescribed service via a specific wideband radio base station which is judged to be suitable for connection with respect to said mobile base station.

12. A radio communication system according to claims 11, further comprising:

means which, when said mobile radio station receives said prescribed service via said specific wideband radio base station, receives a signal for the purpose of identifying said wideband radio base station, notification of which is given via a radio line from a wideband radio base station which is different from said specific wideband radio base station, and which interprets from this received signal to which specific wideband radio base station switching should be made;

means by which said mobile radio station notifies a server via a narrowband radio base station of said specific wideband radio base station which is suitable as a switching destination; and means by which said server switches a connection with respect to said mobile radio station via said specific wideband radio base station, which is judged to be suitable as a switching destination for connection, thereby providing said prescribed service.

13. A radio communication system including a base station, a plurality of terminals, an uplink established between the base station and each of the terminals for the purpose of radio transmission of prescribed information from a terminal to a base station, and a downlink established between each of the terminals and the base station for the purpose of radio transmission of prescribed data from a base station to a terminal, said radio communication system comprising:

a low-speed transmitting means, provided at said terminal, for transmitting a radio signal having a radio frequency at a relatively low transmission rate from said terminal to said base station via said uplink;

a low-speed receiving means, provided at said base station, for receiving a radio signal sent at a relatively low transmission rate from said terminal to said base station via said uplink;

a high-speed transmitting means, provided at said base station, for transmitting a radio signal sent at a relatively high transmission rate from said base station to said terminal via said downlink; and a high-speed receiving means, provided at said terminal, for receiving a radio signal sent at a relatively high transmission rate from said base station to said terminal via said downlink;

wherein said base station is connected, via a data bus, to a data server which stores and processes given data for said base station, based on control information which is input to said base station from said terminal via said unlink, wherein said data server is formed from at least a memory which serves as a database, a processor which serves as an information amount expanding server, and a control server having a storage means and a control means, said memory, said processor, and said control server operating in cooperation, wherein said base station supplies said terminal with prescribed information via said downlink in the form it is read out from said memory, said terminal performs transmission of a given processing operator and added information via said low-speed uplink for the purpose of meeting requirements, and wherein said data server processes said prescribed information, based on said processing operator and added information sent from said base station via said data bus, generates processed data and transmits the generated processed data to said terminal from said base station via said downlink.

\* \* \* \* \*